United States Patent
Ueno et al.

(10) Patent No.: US 11,167,208 B2
(45) Date of Patent: Nov. 9, 2021

(54) INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Atsushi Ueno, Kyoto (JP); Shota Shimada, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 51 days.

(21) Appl. No.: 16/749,245

(22) Filed: Jan. 22, 2020

(65) Prior Publication Data

US 2021/0060416 A1     Mar. 4, 2021

(30) Foreign Application Priority Data

Aug. 30, 2019   (JP) .............................. JP2019-157999

(51) Int. Cl.
*A63F 13/211*     (2014.01)
*A63F 13/212*     (2014.01)
(Continued)

(52) U.S. Cl.
CPC ............ *A63F 13/24* (2014.09); *A63F 13/211* (2014.09); *A63F 13/212* (2014.09);
(Continued)

(58) Field of Classification Search
CPC ..... A63F 13/211; A63F 12/212; A63F 13/218
See application file for complete search history.

(56) References Cited

U.S. PATENT DOCUMENTS

| | | |
|---|---|---|
| 5,342,273 A | 8/1994 | Plendl et al. |
| 6,072,467 A | 6/2000 | Walker |

(Continued)

FOREIGN PATENT DOCUMENTS

| | | |
|---|---|---|
| EP | 2 497 544 | 9/2012 |
| EP | 3 207 962 A1 | 8/2017 |

(Continued)

OTHER PUBLICATIONS

U.S. Appl. No. 16/749,104 to Kurata, et al., filed Jan. 22, 2020 (87 pages).

(Continued)

*Primary Examiner* — Jay Trent Liddle
(74) *Attorney, Agent, or Firm* — Nixon & Vanderhye P.C.

(57) ABSTRACT

A non-limiting example information processing system includes a first input apparatus including a strain sensor, a second input apparatus including a motion sensor, and an information processing apparatus. The strain sensor provides an output corresponding to a force applied to at least a portion of the first input apparatus. The motion sensor provides an output corresponding to a motion of the second input apparatus. The information processing apparatus includes a computer that executes obtaining strain data corresponding to the output of the strain sensor and motion data corresponding to the output of the motion sensor, and executing first control on an object disposed in a virtual space based on the strain data, and second control on the object based on the motion data, the second control being different from the first control.

21 Claims, 41 Drawing Sheets

(51) Int. Cl.
*A63F 13/218* (2014.01)
*A63F 13/24* (2014.01)
*A63F 13/23* (2014.01)
*A63F 13/285* (2014.01)
*G06F 3/01* (2006.01)
*G06F 3/03* (2006.01)

(52) U.S. Cl.
CPC ............ *A63F 13/218* (2014.09); *A63F 13/23* (2014.09); *A63F 13/285* (2014.09); *G06F 3/011* (2013.01); *G06F 3/03* (2013.01); *A63F 2300/105* (2013.01); *A63F 2300/1012* (2013.01); *A63F 2300/1025* (2013.01); *A63F 2300/1037* (2013.01); *A63F 2300/1043* (2013.01)

(56) References Cited

U.S. PATENT DOCUMENTS

| | | | |
|---|---|---|---|
| 6,932,747 | B2 | 8/2005 | Herman |
| 10,471,303 | B2 | 11/2019 | Kuroda et al. |
| 10,635,202 | B1* | 4/2020 | Nietfeld ............... A63F 13/214 |
| 10,751,613 | B1 | 8/2020 | Tamura et al. |
| 10,870,047 | B1 | 12/2020 | Kawamoto et al. |
| 10,881,909 | B2 | 1/2021 | Kuroda et al. |
| 10,918,898 | B1 | 2/2021 | Palacios |
| 2006/0260395 | A1 | 11/2006 | Feldman et al. |
| 2006/0262120 | A1 | 11/2006 | Rosenberg |
| 2008/0146336 | A1 | 6/2008 | Feldman et al. |
| 2008/0261696 | A1* | 10/2008 | Yamazaki ............... A63F 13/06 463/39 |
| 2009/0093305 | A1 | 4/2009 | Okamoto et al. |
| 2009/0094442 | A1 | 4/2009 | Okamoto et al. |
| 2010/0004061 | A1 | 1/2010 | Merril et al. |
| 2010/0009762 | A1 | 1/2010 | Takeda et al. |
| 2010/0137063 | A1 | 6/2010 | Shirakawa et al. |
| 2010/0169110 | A1 | 7/2010 | Sawano et al. |
| 2010/0245236 | A1 | 9/2010 | Takayama |
| 2010/0304868 | A1 | 12/2010 | Zalewski |
| 2011/0069003 | A1* | 3/2011 | Konishi ............... G06F 3/0334 345/156 |
| 2011/0077088 | A1 | 3/2011 | Hayashi et al. |
| 2012/0108341 | A1* | 5/2012 | Yamazaki ............... A63F 13/212 463/39 |
| 2012/0129653 | A1 | 5/2012 | Shalev et al. |
| 2012/0209563 | A1* | 8/2012 | Takeda ............... A63F 13/46 702/159 |
| 2012/0229372 | A1* | 9/2012 | Hayashi ............... A63F 13/5255 345/156 |
| 2012/0229382 | A1* | 9/2012 | Matsunaga ............... A63F 13/211 345/158 |
| 2012/0229448 | A1* | 9/2012 | Matsunaga ............... A63F 13/428 345/419 |
| 2012/0229510 | A1* | 9/2012 | Hayashi ............... A63F 13/214 345/633 |
| 2012/0229512 | A1* | 9/2012 | Hayashi ............... G06T 3/20 345/649 |
| 2012/0231881 | A1* | 9/2012 | Matsunaga ............... A63F 13/26 463/31 |
| 2012/0231882 | A1 | 9/2012 | Hayashi et al. |
| 2012/0231883 | A1* | 9/2012 | Hayashi ............... G06F 3/011 463/31 |
| 2013/0027295 | A1 | 1/2013 | Kuriya et al. |
| 2013/0157817 | A1 | 6/2013 | Green |
| 2013/0201115 | A1 | 8/2013 | Heubel |
| 2013/0252735 | A1* | 9/2013 | Yamazaki ............... A63F 13/245 463/36 |
| 2014/0031124 | A1* | 1/2014 | Yamazaki ............... A63F 13/212 463/36 |
| 2014/0244722 | A1 | 8/2014 | Hayashi |
| 2015/0119122 | A1* | 4/2015 | Holme ............... A63F 13/212 463/7 |
| 2017/0216670 | A1 | 8/2017 | Kuroda et al. |
| 2017/0319954 | A1* | 11/2017 | Goslin ............... A63F 13/218 |
| 2019/0290999 | A1* | 9/2019 | Bradner ............... A63F 13/211 |
| 2019/0314721 | A1* | 10/2019 | Nakayama ............... A63F 13/235 |
| 2020/0225768 | A1* | 7/2020 | Nietfeld ............... A63F 13/211 |
| 2020/0398156 | A1* | 12/2020 | Tamura ............... A63F 13/218 |
| 2021/0060413 | A1* | 3/2021 | Kurata ............... A63F 13/211 |
| 2021/0060423 | A1 | 3/2021 | Kitahara et al. |
| 2021/0060436 | A1 | 3/2021 | Kawamoto et al. |

FOREIGN PATENT DOCUMENTS

| | | |
|---|---|---|
| JP | 2008-049117 | 3/2008 |
| JP | 2008-113719 | 5/2008 |
| JP | 2012-239776 | 12/2012 |
| JP | 2013-027458 | 2/2013 |
| WO | 2016/059943 | 4/2016 |

OTHER PUBLICATIONS

Office Action dated Aug. 28, 2020 issued in JP2020-067260 (5 pgs.).
Office Action dated Mar. 30, 2021 issued in U.S. Appl. No. 16/749,104 (11 pages).
Office Action for JP2019-157998, dated Dec. 23, 2019, 4 pages.
Office Action for JP2019-157999, dated Dec. 23, 2019, 7 pages.
Extended European Search Report dated Dec. 21, 2020 issued in European Application No. 20184818.1 (8 pgs.).
Extended European Search Report issued in Application No. 20184534.4 dated Sep. 21, 2020 (10 pages).

* cited by examiner

FIG. 14
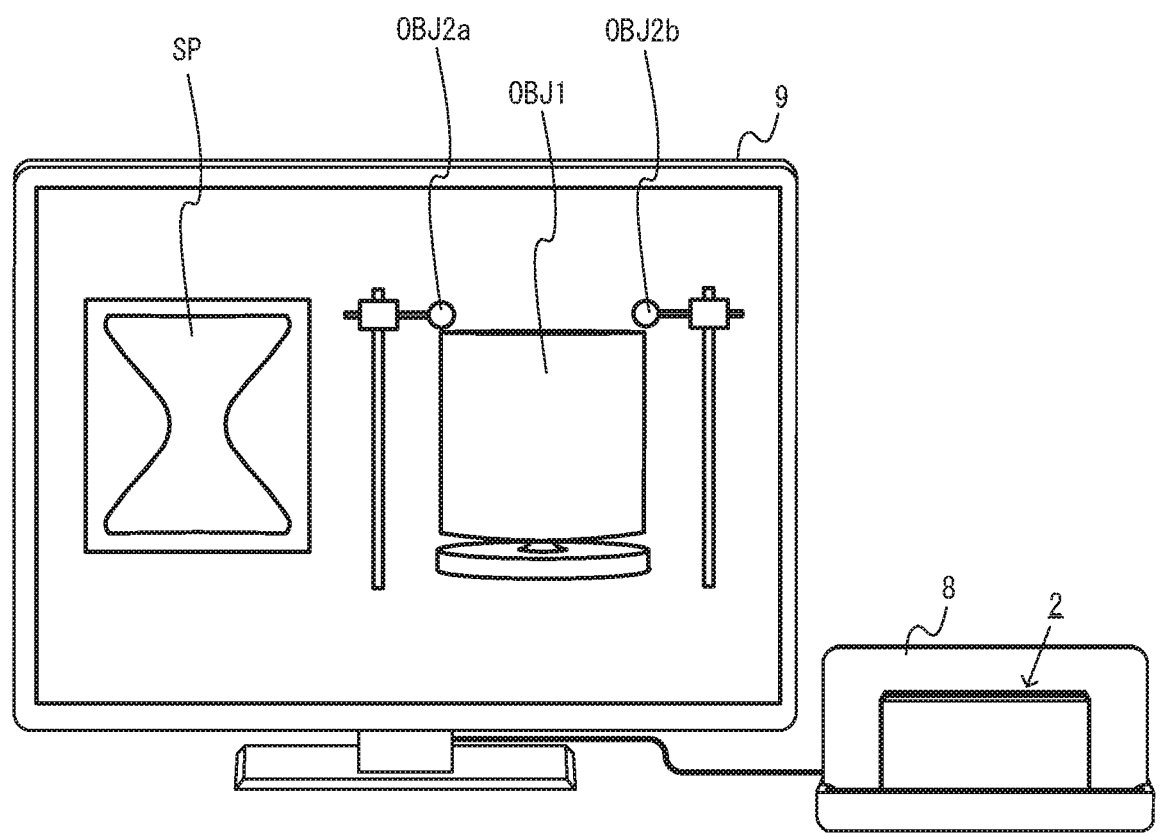
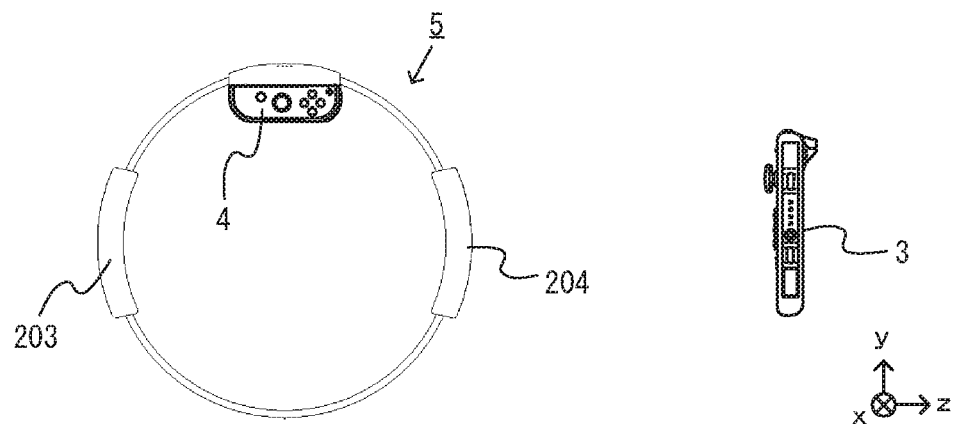

FIG. 15
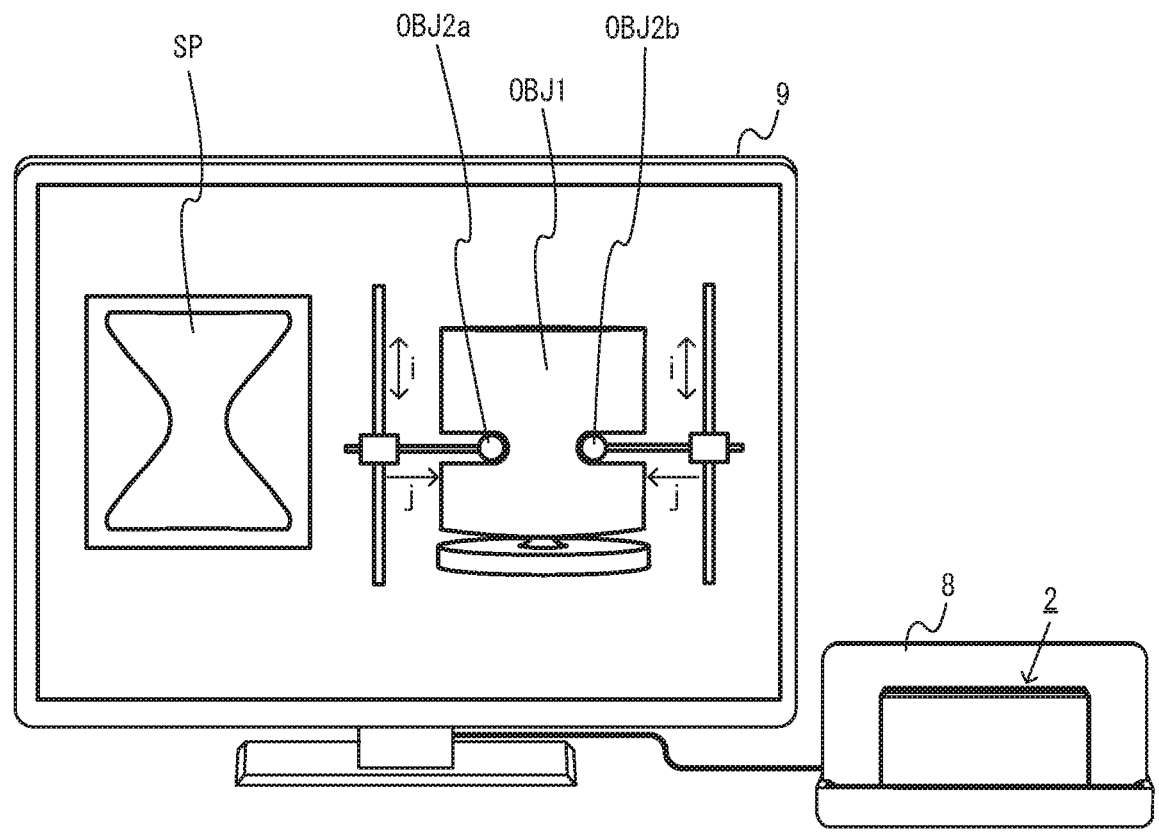
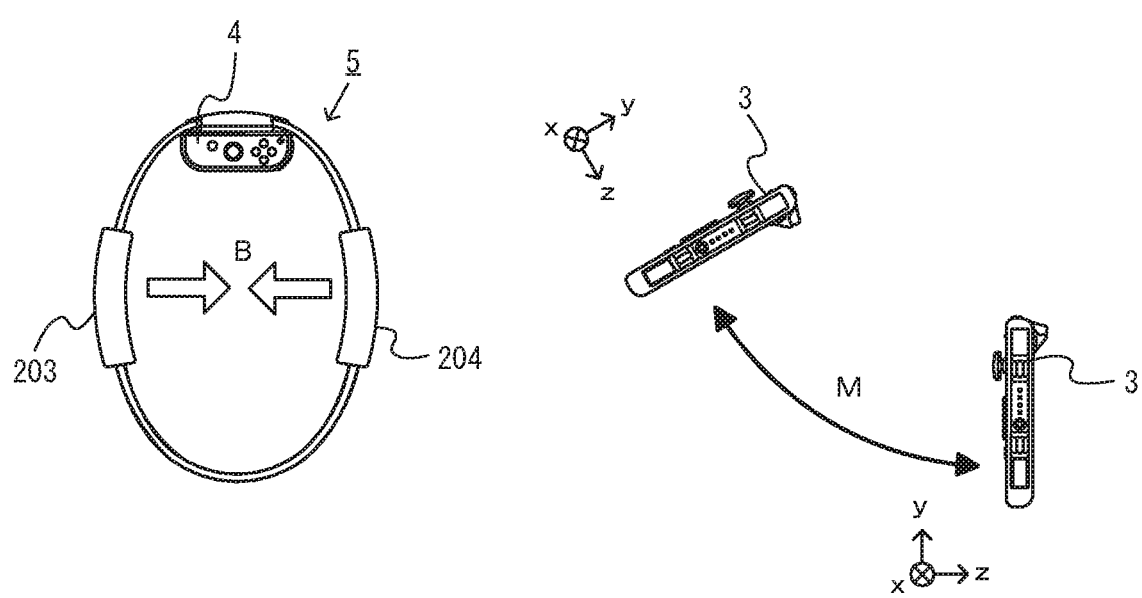

FIG. 21
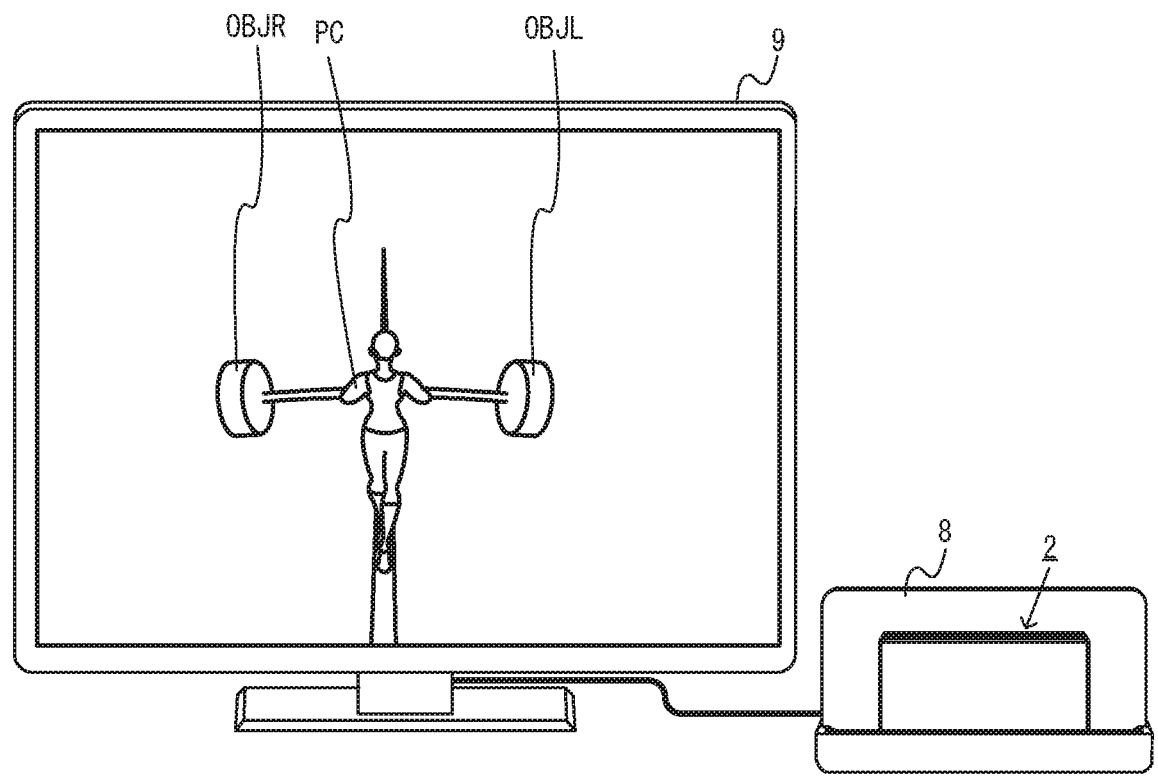
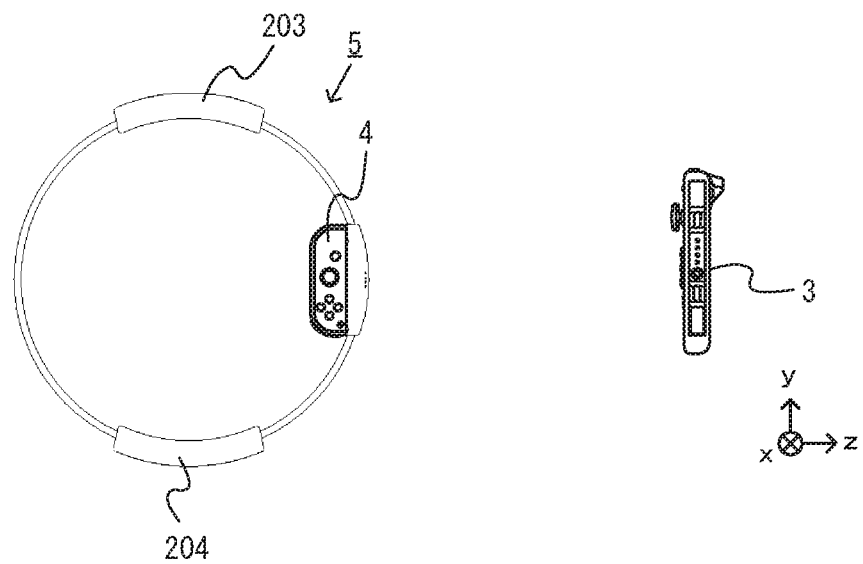

FIG. 22
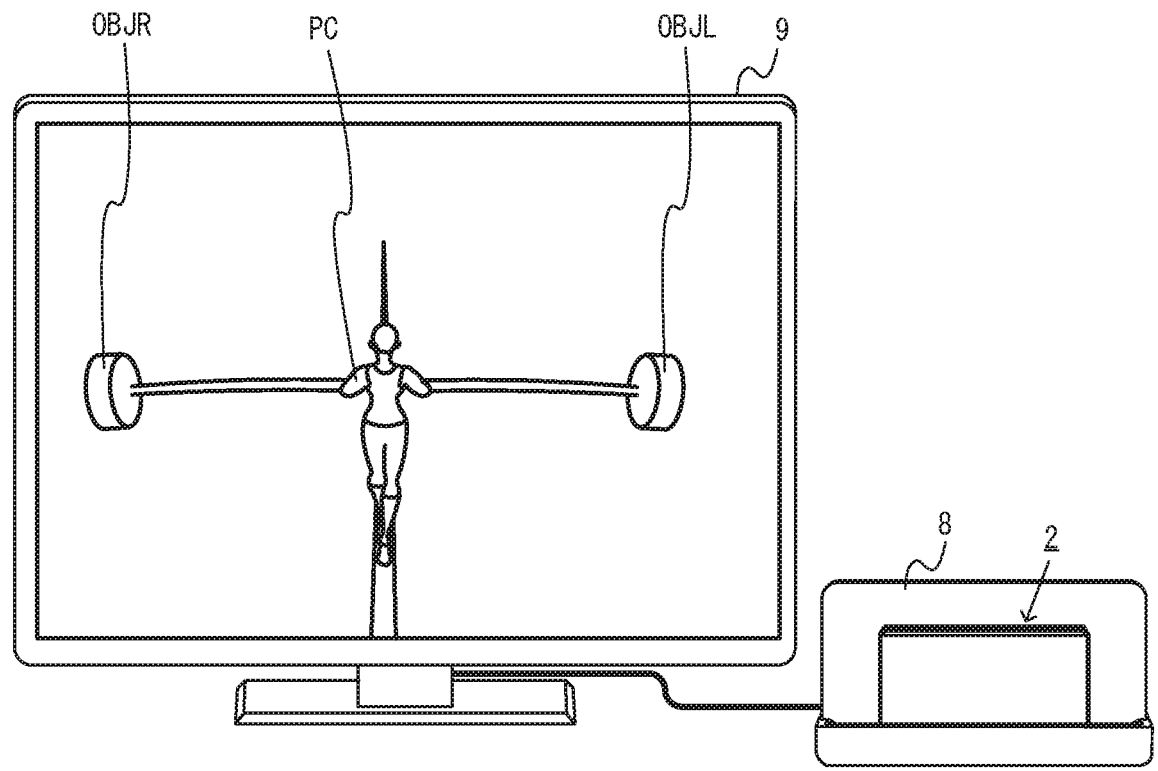
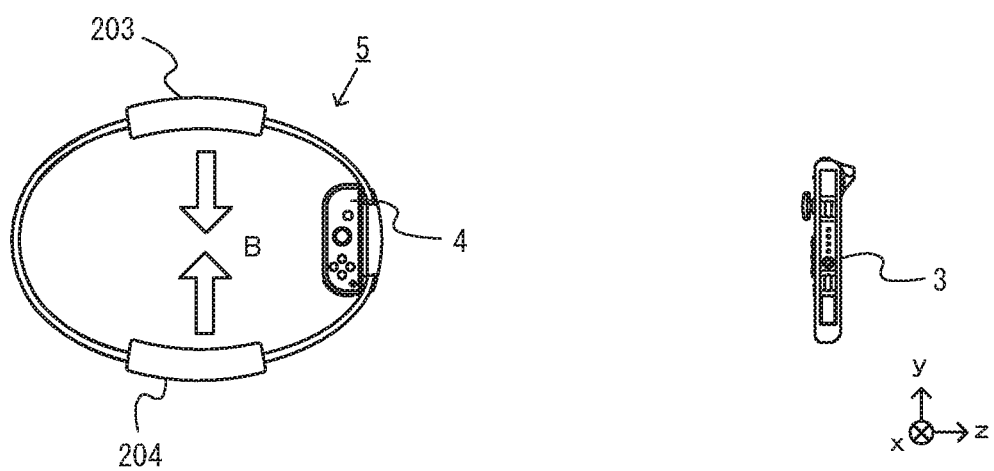

FIG. 23
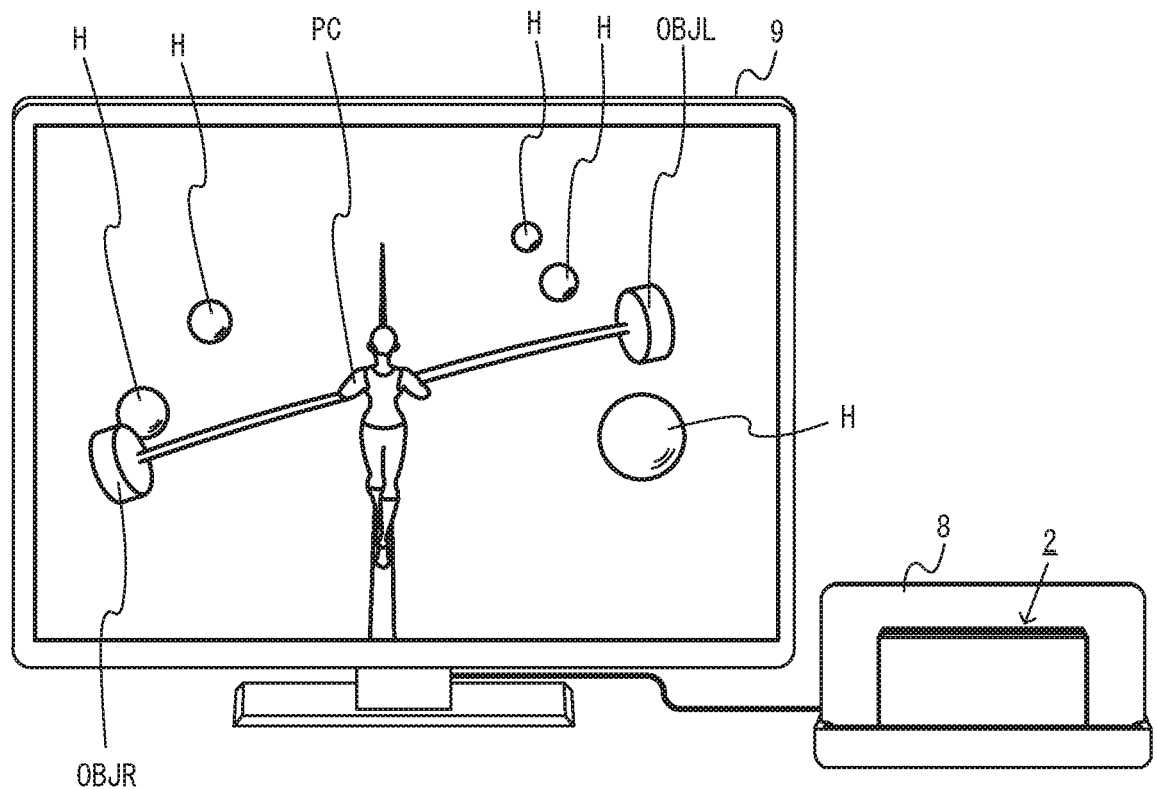
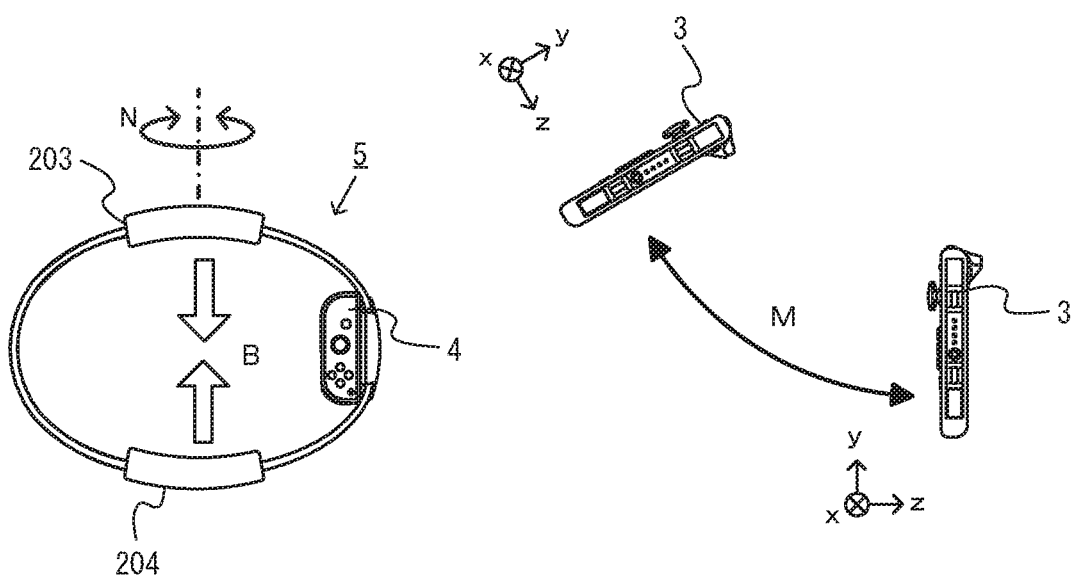

F I G. 2 5
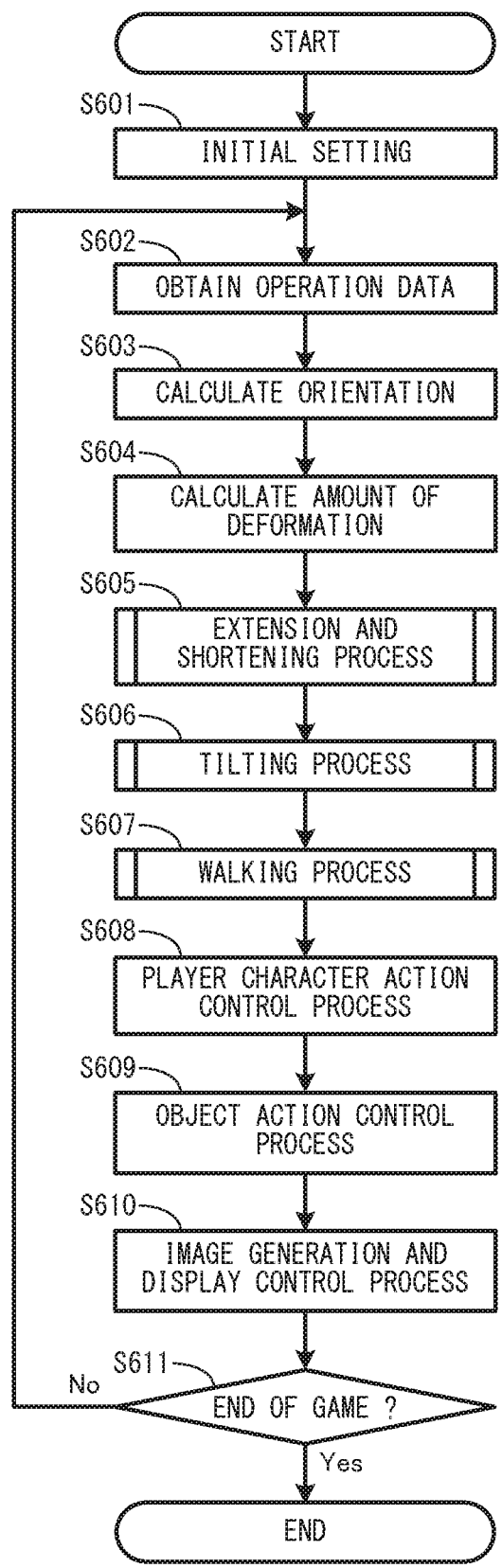

FIG. 30
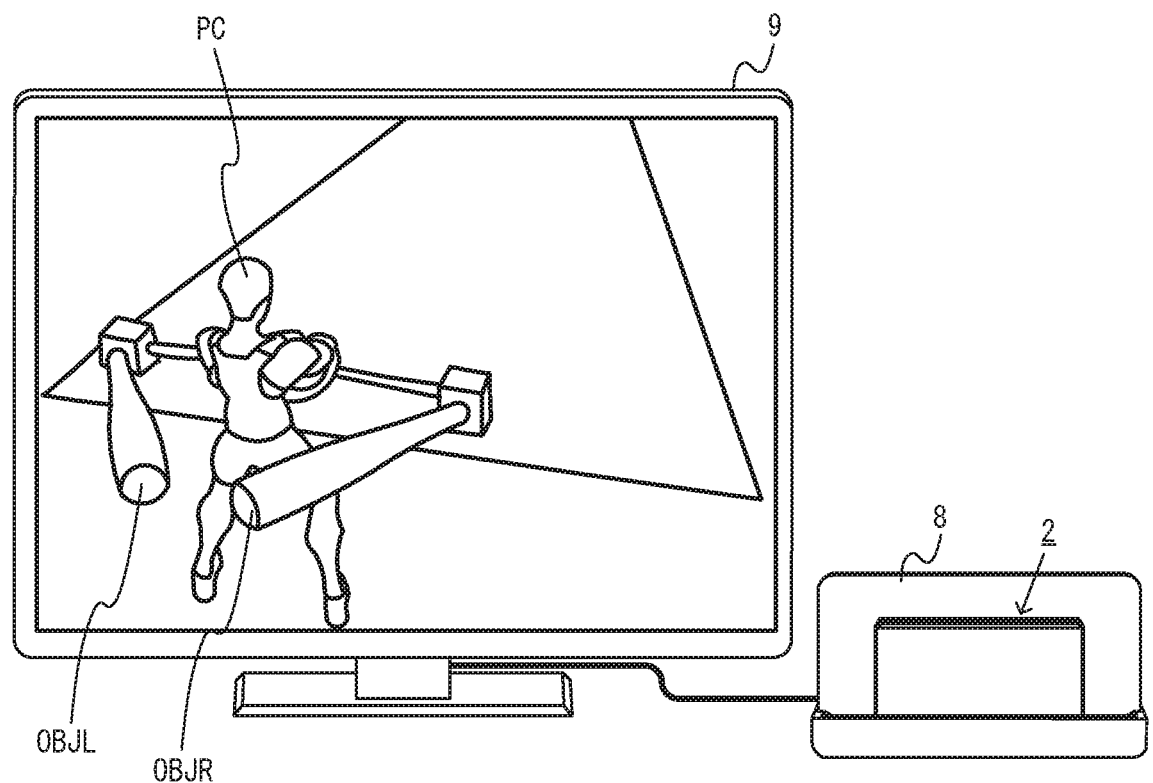
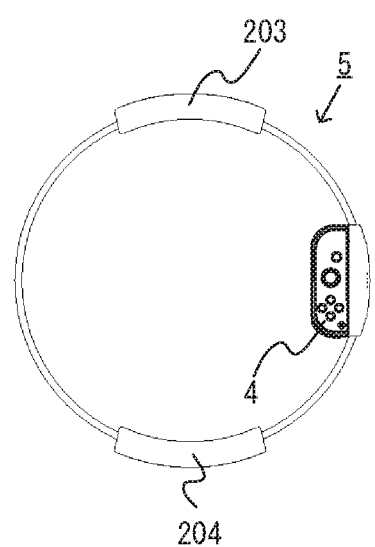

FIG. 31
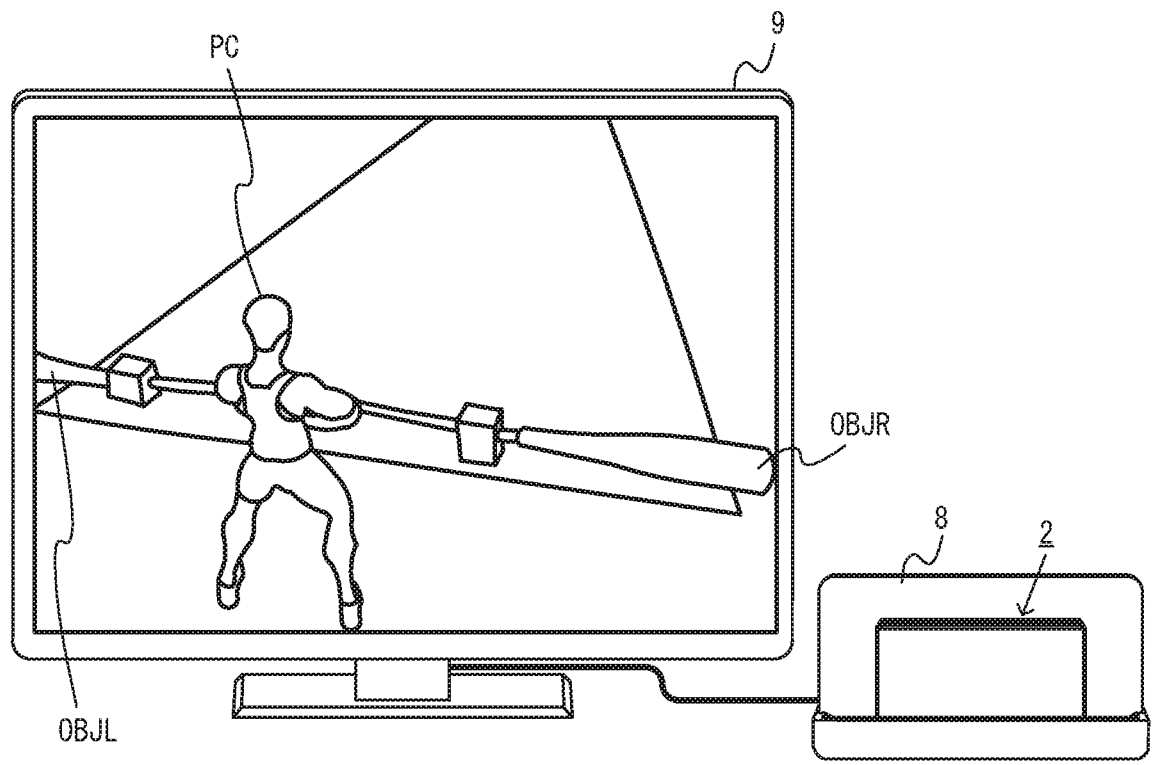
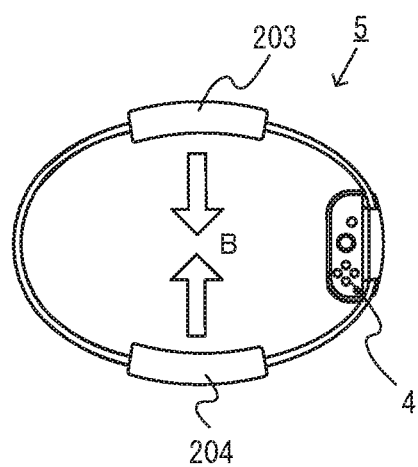

FIG. 32
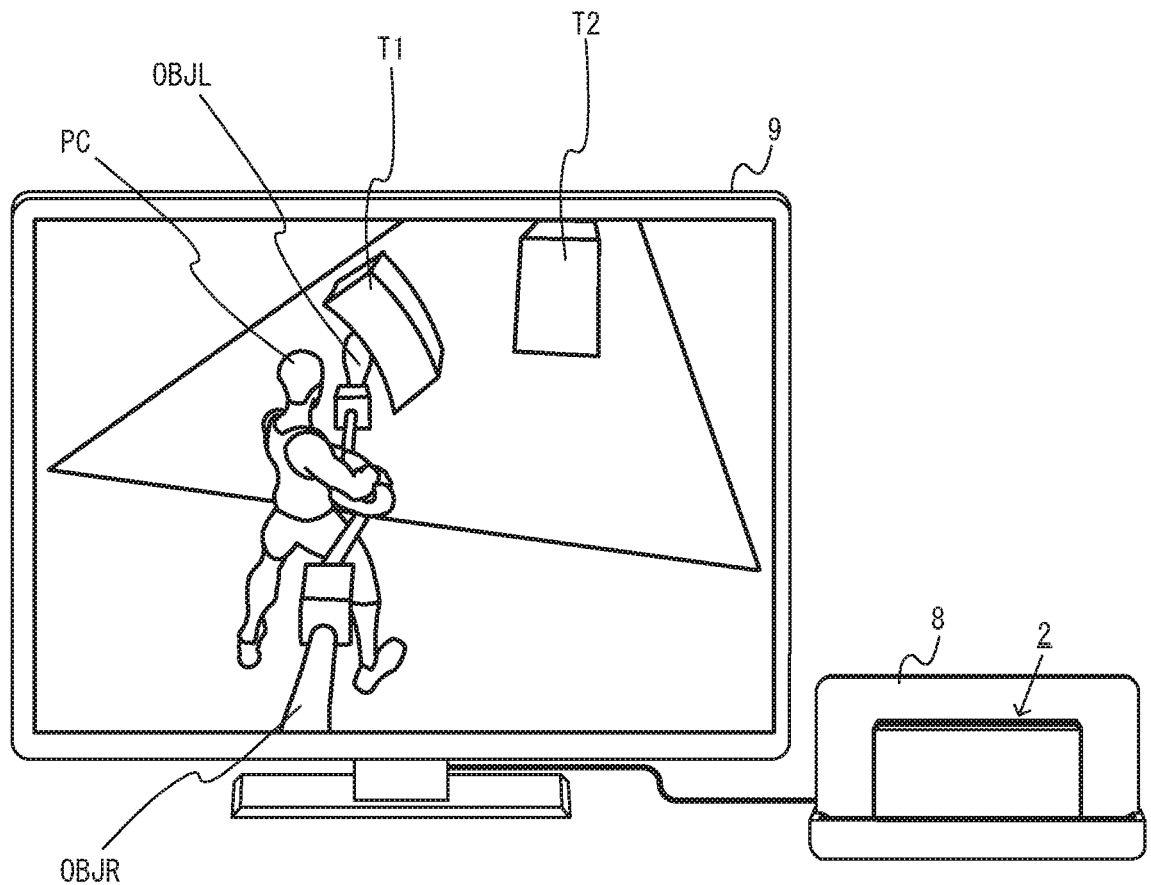
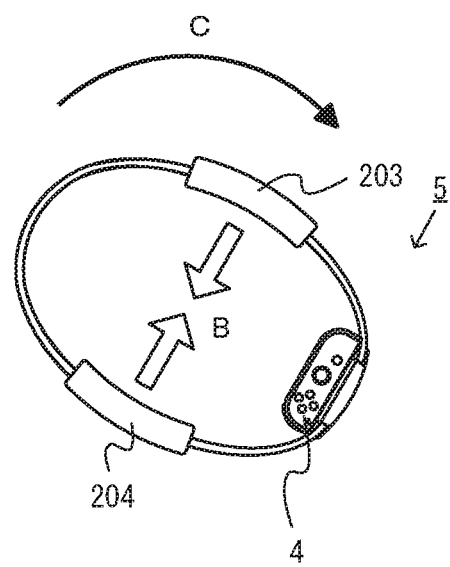

FIG. 38
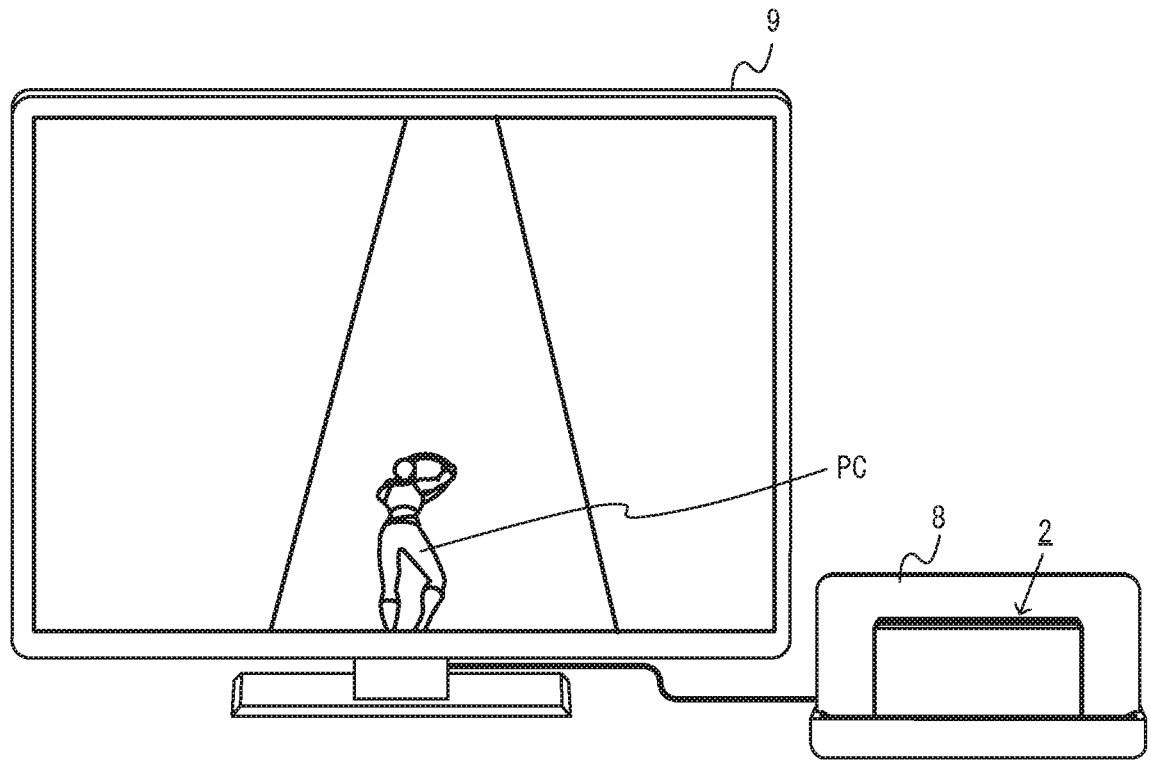
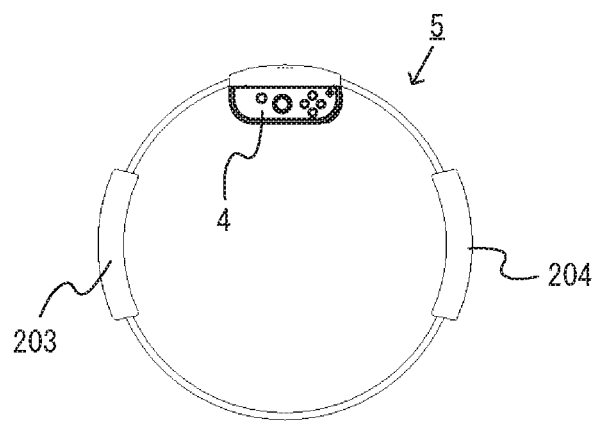

FIG. 39
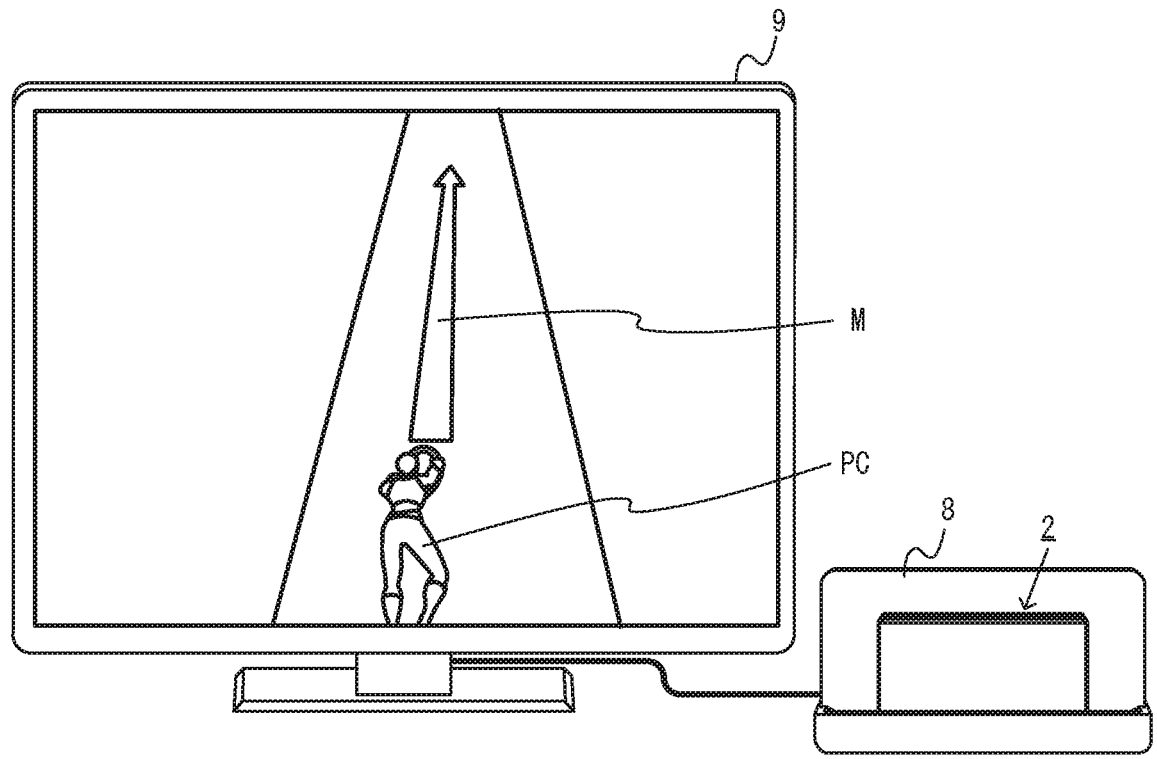
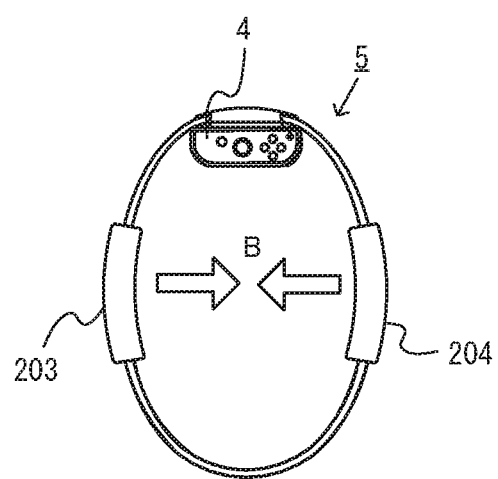

FIG. 40
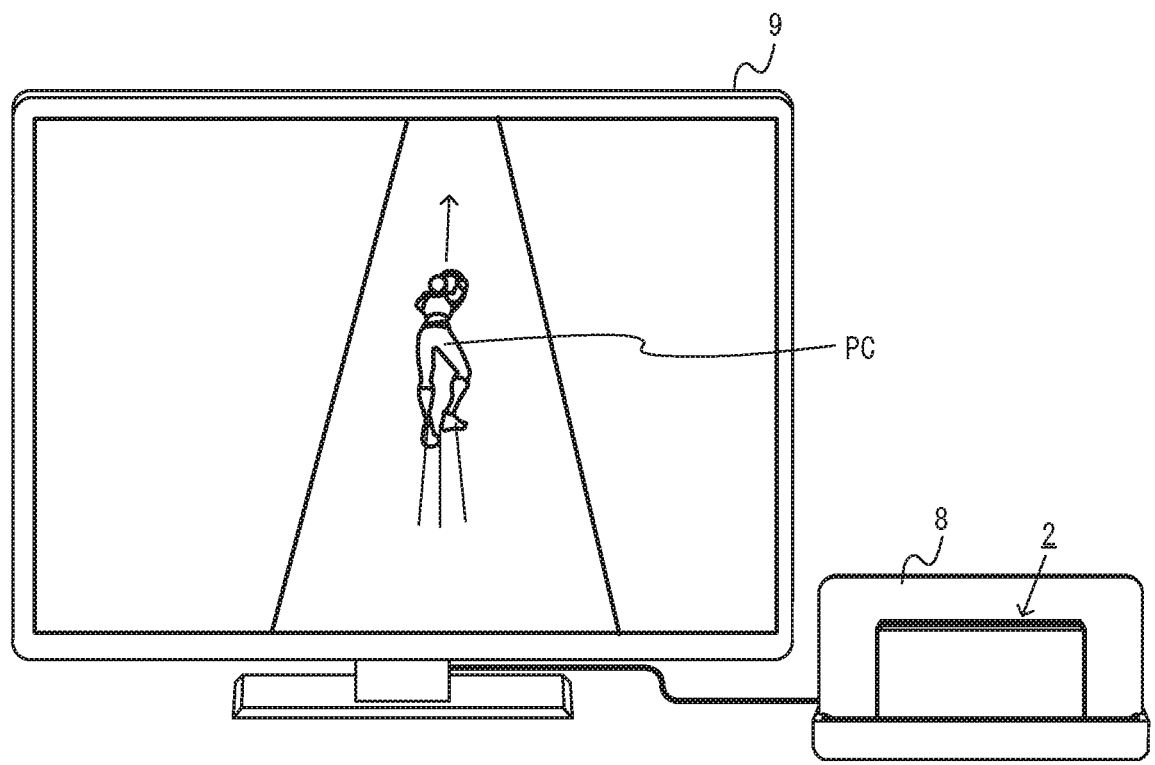
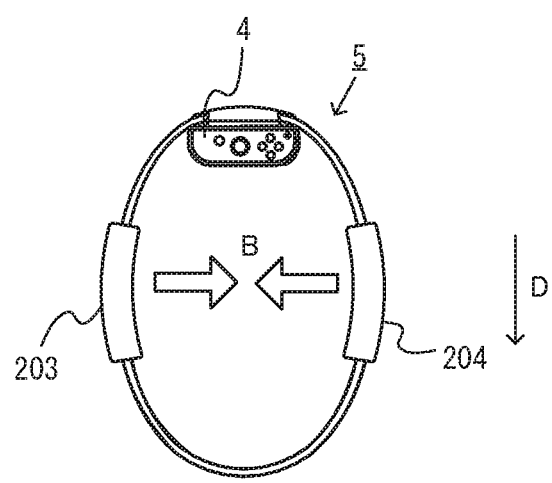

INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

CROSS REFERENCE TO RELATED APPLICATION

The disclosure of Japanese Patent Application No. 2019-157999, filed Aug. 30, 2019, is incorporated herein by reference.

FIELD

The technology disclosed herein relates to information processing systems, storage media storing information processing programs, information processing apparatuses, and information processing methods for causing an object to perform an action according to a user's operation.

BACKGROUND AND SUMMARY

Conventionally, an input apparatus has been disclosed that is held by a user and allows a game process to be executed using an output of the input apparatus.

However, in a game using the above input apparatus, an input method that is performed by a user (hereinafter referred to as a "user input method") may be limited.

With the above in mind, it is an object of this non-limiting example to provide an information processing system, storage medium storing an information processing program, information processing apparatus, and information processing method that can increase the variety of user input methods.

To achieve the above, this non-limiting example has the following features, for example. It should be understood that the scope of the present technology is defined only by the appended claims. To the extent of any inconsistency or conflict in disclosure between the description and the claims appended hereto, the claims shall prevail.

A non-limiting example configuration of an information processing system according to this non-limiting example includes a first input apparatus including a strain sensor, a second input apparatus including a motion sensor and different from the first input apparatus, and an information processing apparatus. The strain sensor provides an output corresponding to a force applied to at least a portion of the first input apparatus, the motion sensor provides an output corresponding to a motion of the second input apparatus. The information processing apparatus includes a computer that executes obtaining strain data corresponding to the output of the strain sensor and motion data corresponding to the output of the motion sensor, and executing first control on an object disposed in a virtual space based on the strain data, and second control on the object based on the motion data, the second control being different from the first control.

With the above configuration, the first control is executed on an object disposed in a virtual space based on the strain data corresponding to the output of the strain sensor of the first input apparatus, and the second control is executed on the object based on the motion data corresponding to the output of the motion sensor of the second input apparatus. The variety of user input methods using both of the first input apparatus and the second input apparatus can be increased.

The motion sensor may include an angular velocity sensor and/or an acceleration sensor.

With the above configuration, the motion of the second input apparatus can be easily calculated using an angular velocity and/or acceleration occurring on the second input apparatus.

The first input apparatus may further include a holding portion. The strain sensor may output the strain data corresponding to a force applied to the holding portion of the first input apparatus.

With the above configuration, the first control can be executed on the object based on a force applied to the holding portion of the first input apparatus.

The first input apparatus may be at least partially elastically deformable in response to an external force applied thereto. The strain sensor may provide an output corresponding to deformation of the first input apparatus. The first control may be executed based on deformation of the first input apparatus indicated by the strain data, and the second control is executed based on the motion data while the deformation of the first input apparatus is detected based on the strain data.

With the above configuration, the execution of the second control based on the motion data can be controlled according to an operation of deforming the first input apparatus.

The second control may be executed in different ways between when the force applied to the first input apparatus satisfies a predetermined condition and when the force applied to the first input apparatus does not satisfy the predetermined condition.

With the above configuration, the second control is executed in different ways, depending on whether or not a force satisfying a predetermined condition is applied to the first input apparatus. Therefore, the variety of user input methods can be further increased.

The second control may be performed so that the object is moved based on the motion data when the force applied to the first input apparatus satisfies the predetermined condition, and the object may not be moved, irrespective of the motion data having been obtained, when the force applied to the first input apparatus does not satisfy the predetermined condition.

With the above configuration, the action of the object is changed, depending on whether or not the force applied to the first input apparatus satisfies a predetermined condition. Therefore, the variety of user input methods can be further increased.

The second input apparatus may be attached to a user's body. The motion sensor may output the motion data corresponding to a motion of the second input apparatus caused by the user's stamping-foot action. A process of moving the object in the virtual space based on the motion data corresponding to a motion of the second input apparatus caused by the user's stamping-foot action, may be executed as the second control.

With the above configuration, the movement control of the object can be executed based on the user's stamping-foot action.

The first input apparatus may further include a motion sensor which outputs motion data corresponding to a motion of the first input apparatus. A process of changing an orientation of the object based on the motion data output from the first input apparatus, may be executed as third control. An in-game merit may be given to a user when the object has a predetermined orientation at a predetermined location in the virtual space.

With the above configuration, the third control can be executed on the object based on the motion of the first input apparatus. Therefore, the variety of user input methods can be further increased.

A deformation process of deforming the object based on the strain data, may be executed as the first control. A process of changing a way of deforming the object based on the motion data output from the second input apparatus, may be executed as the second control.

With the above configuration, the process of deforming the object while changing the way of deforming the object, using both of the first and second input apparatuses, can be executed.

A process of moving the object in a first direction based on the strain data, may be executed as the first control. A process of moving the object in a second direction different from the first direction, based on the motion data, may be executed as the second control.

With the above configuration, the process of moving the object in the second direction while moving the object in the first direction, using both of the first and second input apparatuses, can be executed.

The first input apparatus may further include a holding portion. The second input apparatus may be attached to a portion of a user's body. The strain sensor may output the strain data corresponding to a force applied to the holding portion of the first input apparatus. The motion sensor may output the motion data corresponding to a motion of the portion of the user's body to which the second input apparatus is attached.

With the above configuration, an operation can be performed based on a force applied by the user to the holding portion of the first input apparatus, and a motion of a portion of the user's body.

A shape of a target object disposed in the virtual space may be changed based on a positional relationship between the object and the target object.

With the above configuration, a shape of a target object can be changed by controlling the location of the object.

A process of moving the object along an outer periphery of the target object, based on the motion data, may be executed as the second control. A process of moving the object in a direction including at least a directional component toward inside of the target object, based on the strain data, may be executed as the first control. A process of changing the shape of the target object may be executed based on the positional relationship between the object and the target object.

With the above configuration, the target object can be easily deformed by allowing the second control of moving the object along the target object, and the first control of moving the object in a direction including a directional component toward the inside of the target object.

A process of continuing to move the object in the first direction, based on the amount of a force applied to the holding portion of the first input apparatus indicated by the strain data, may be executed as the first control.

With the above configuration, the control of moving the object in the first direction based on a force applied to the first input apparatus, can be executed.

The executing the first control and the second control may include assessing the shape of the target object at the end of a predetermined time limit.

With the above configuration, the user is allowed to easily recognize a game in which the shape of the target object is changed.

The first control may be executed when the strain data indicates that the amount of the force applied to the first input apparatus is greater than a first threshold, and the first control may be executed when the strain data does not indicate that the amount of the force applied to the first input apparatus is greater than the first threshold, and indicates that the amount of the force applied to the first input apparatus is greater than a second threshold smaller than the first threshold after the amount of the force applied to the first input apparatus has exceeded the first threshold.

With the above configuration, the control can be continued even when the force applied to the first input apparatus is reduced after the operation of applying the force.

The first control may be executed on the object, based on the amount of a force applied to the first input apparatus at a timing that a motion occurs on the motion sensor of the second input apparatus.

With the above configuration, control can be executed based on a time-series relationship between a motion occurring on the motion sensor of the second input apparatus and a force applied to the first input apparatus.

The first control may be executed, based on the amount of a force having been applied to the first input apparatus during a period of time from a timing that a motion occurs on the motion sensor of the second input apparatus to a predetermined time before, when the amount of a force applied to the first input apparatus at the timing that a motion occurs on the motion sensor of the second input apparatus is smaller than the amount of deformation of the first input apparatus having occurred during the period of time from the timing that a motion occurs on the motion sensor of the second input apparatus to the predetermined time before.

With the above configuration, the control can be continued, taking into account the case where the force applied to the first input apparatus is reduced at a timing that a motion occurs on the motion sensor of the second input apparatus.

The executing the first control and the second control may also include displaying an image indicating the amount of deformation of the first input apparatus while the first input apparatus is deformed.

With the above configuration, the amount of deformation of the first input apparatus can be presented to the user.

This non-limiting example may be carried out in the forms of a storage medium storing an information processing program, information processing apparatus, and information processing method.

According to this non-limiting example, the variety of user input methods can be increased.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 14 is a diagram showing a first non-limiting example of a game image displayed on a stationary monitor 9 according to the user's operation in the first non-limiting example game, FIG. 15 is a diagram showing a second non-limiting example of a game image displayed on the stationary monitor 9 according to the user's operation in the first non-limiting example game, FIG. 21 is a diagram showing a first non-limiting example of a game image displayed on the stationary monitor 9 according to the user's operation in the second non-limiting example game, FIG. 22 is a diagram showing a second non-limiting example of a game image displayed on the stationary monitor 9 according to the user's operation in the second non-limiting example game, FIG. 23 is a diagram showing a third non-limiting example of a game image displayed on the stationary monitor 9 according to the user's operation in the second non-limiting example game, FIG. 25 is a flowchart showing a non-limiting example of an information process that is executed by the game system 1 in the second non-limiting example game, FIG. 30 is a diagram showing a first non-limiting example of a game image displayed on the stationary monitor 9 according to the user's operation in the third non-limiting example game, FIG. 31 is a diagram showing a second non-limiting example of a game image displayed on the stationary monitor 9 according to the user's operation in the third non-limiting example game, FIG. 32 is a diagram showing a third non-limiting example of a game image displayed on the stationary monitor 9 according to the user's operation in the third non-limiting example game, FIG. 38 is a diagram showing a first non-limiting example of a game image displayed on the stationary monitor 9 according to the user's operation in the fourth non-limiting example game, FIG. 39 is a diagram showing a second non-limiting example of a game image displayed on the stationary monitor 9 according to the user's operation in the fourth non-limiting example game, FIG. 40 is a diagram showing a third non-limiting example of a game image displayed on the stationary monitor 9 according to the user's operation in the fourth non-limiting example game.

DETAILED DESCRIPTION OF NON-LIMITING EXAMPLE EMBODIMENTS

Figure 1:
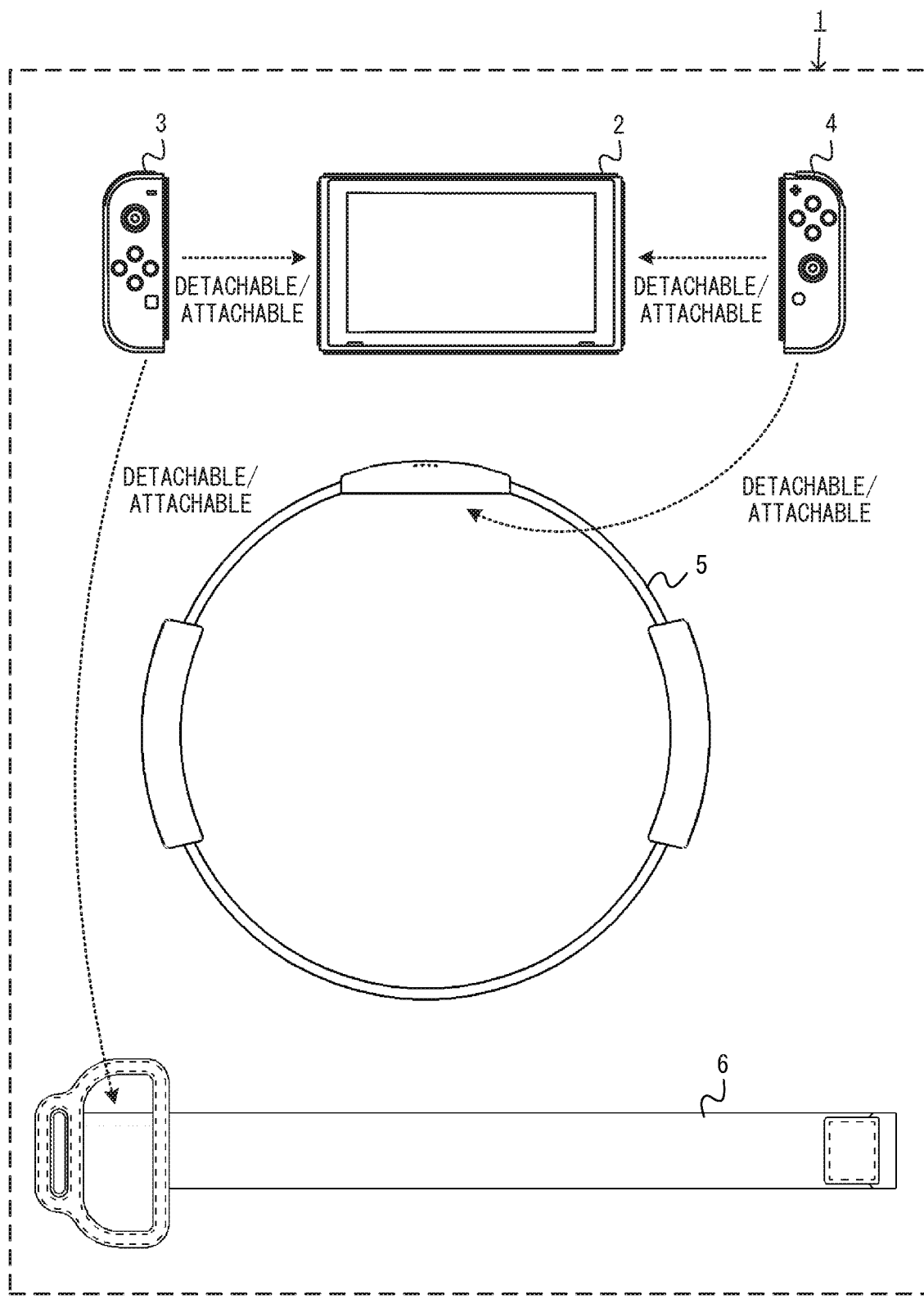
FIG. 1 is a diagram showing a non-limiting example of apparatuses included in a game system 1.

An information processing system according to this non-limiting example will now be described. The information processing system of this non-limiting example employs a game system 1 in a non-limiting example. FIG. 1 is a diagram showing a non-limiting example of apparatuses included in the game system 1. As shown in FIG. 1, the game system 1 includes a main body apparatus 2, a left controller 3 and a right controller 4, a ring-shaped extension apparatus 5, and a belt-shaped extension apparatus 6.

The main body apparatus 2 is a non-limiting example of an information processing apparatus, and functions as a game device main body in this non-limiting example. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus."

The ring-shaped extension apparatus 5 is a non-limiting example of an extension apparatus that is used with the right controller 4. The ring-shaped extension apparatus 5 is used with the right controller 4 attached thereto. The belt-shaped extension apparatus 6 is a non-limiting example of an extension apparatus that is used with the left controller 3. The belt-shaped extension apparatus 6 is used with the left controller 3 attached thereto. Thus, in this non-limiting example, the user can use the controllers 3 and 4 while they are attached to the respective extension apparatuses (see FIG. 12). Note that the ring-shaped extension apparatus 5 is not limited for use with the right controller 4, but the left controller 3 may be attachable thereto. The belt-shaped extension apparatus 6 is not limited for use with the left controller 3, but the right controller 4 may be attachable thereto. Note that as described below, the ring-shaped extension apparatus 5 and the belt-shaped extension apparatus 6 function as an extension apparatus capable of extending or changing the respective functions or use forms of the right controller 4 and the left controller 3, and may each be simply called a "peripheral apparatus."

Figure 2:
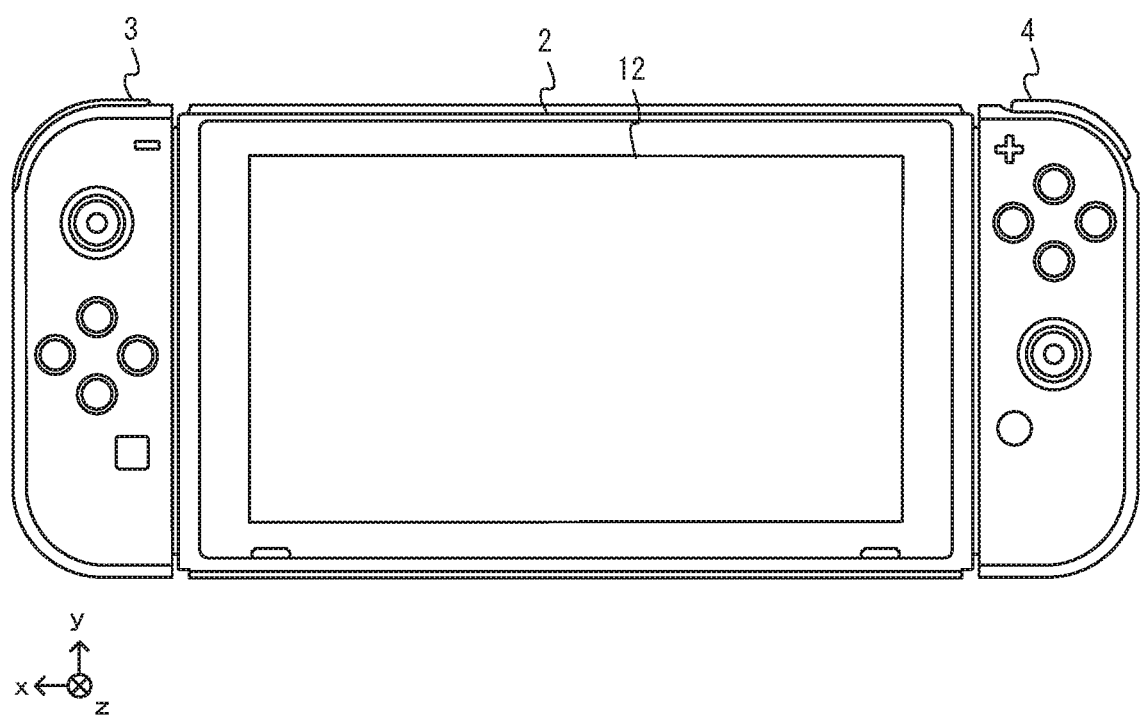
FIG. 2 is a diagram showing a non-limiting example of a state where a left controller 3 and a right controller 4 are attached to a main body apparatus 2.

FIG. 2 is a diagram showing a non-limiting example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
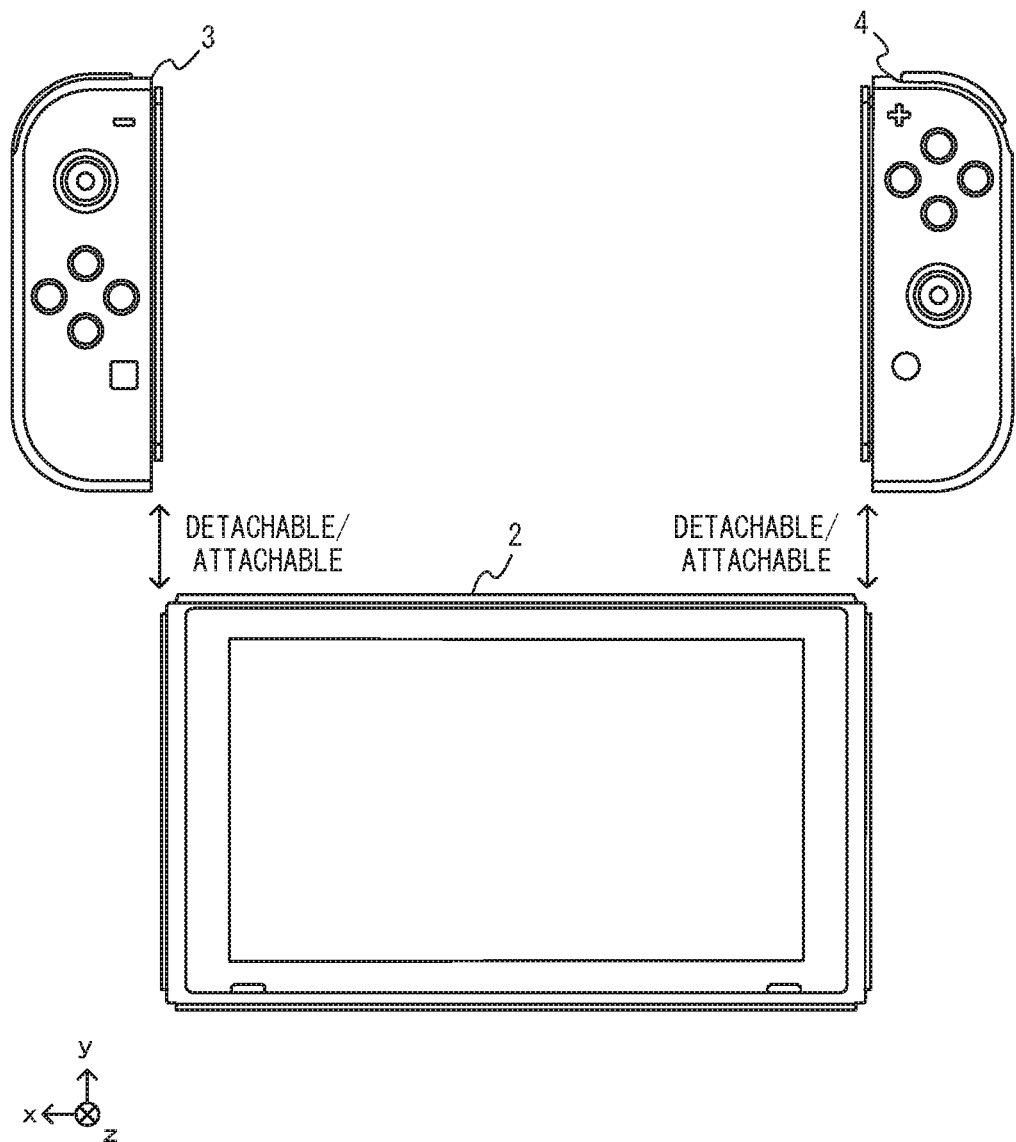
FIG. 3 is a diagram showing a non-limiting example of a state where each of the left controller 3 and the right controller 4 are detached from the main body apparatus 2.

FIG. 3 is a diagram showing a non-limiting example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller."

Figure 4:
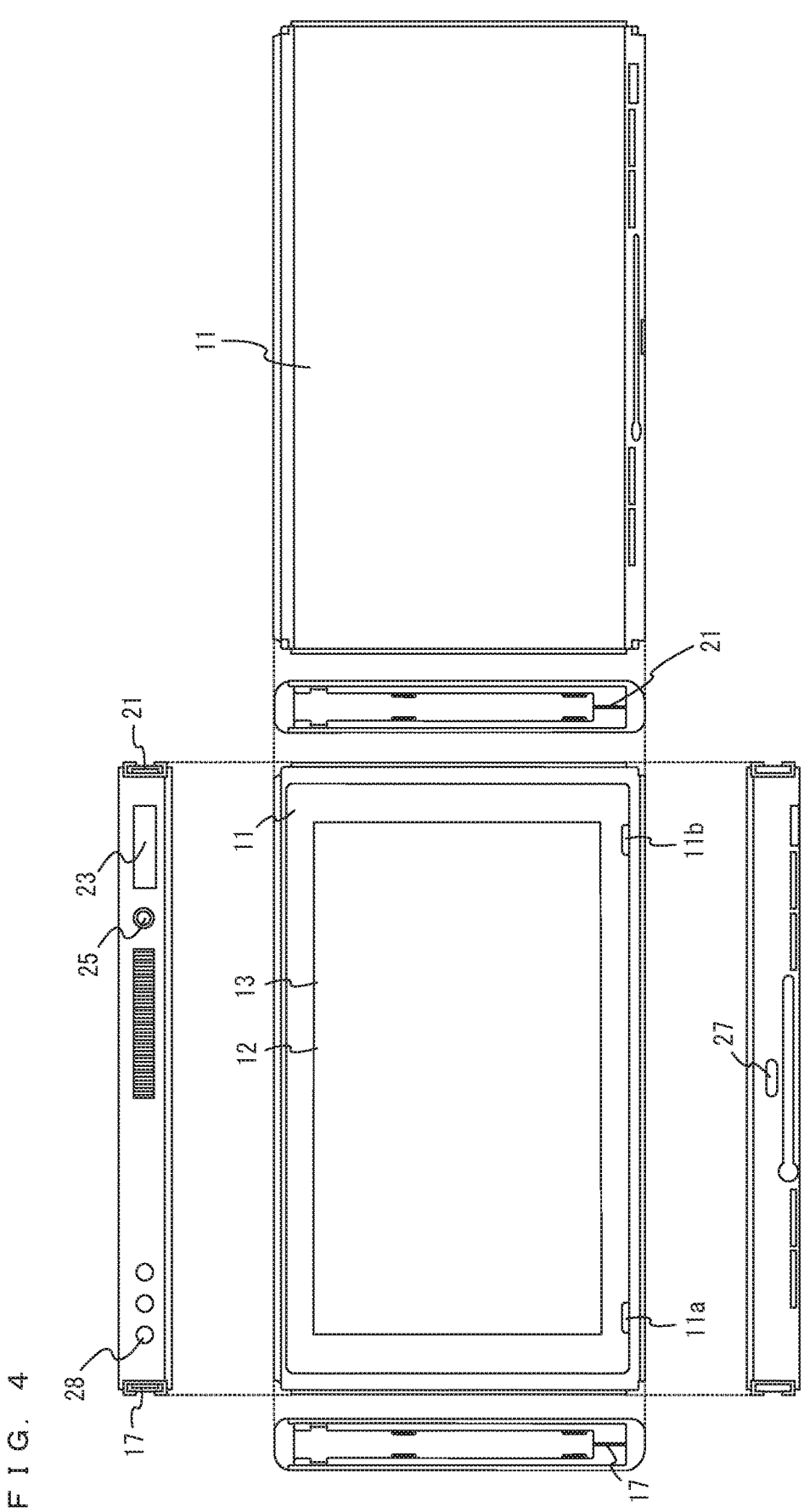
FIG. 4 is six orthogonal views showing a non-limiting example of the main body apparatus 2.

FIG. 4 is six orthogonal views showing a non-limiting example of the main body apparatus 2. As shown in FIG. 4, the main body apparatus 2 includes an approximately plate-shaped housing 11. In this non-limiting example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 4, the main body apparatus 2 includes the display 12, which is provided on the main surface of the housing 11. The display 12 displays an image generated by the main body apparatus 2. In this non-limiting example, the display 12 is a liquid crystal display device (LCD). The display 12, however, may be a display device of any type.

In addition, the main body apparatus 2 includes a touch panel 13 on the screen of the display 12. In this non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 shown in FIG. 7) inside the housing 11. As shown in FIG. 4, speaker holes 11a and 11b are formed in the main surface of the housing 11. The speaker 88 outputs sounds through the speaker holes 11a and 11 b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In this non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in this non-limiting example, the cradle has the function of charging the unified apparatus or the main body apparatus 2 alone, being placed thereon. The cradle also functions as a hub device (specifically, a USB hub).

Figure 5:
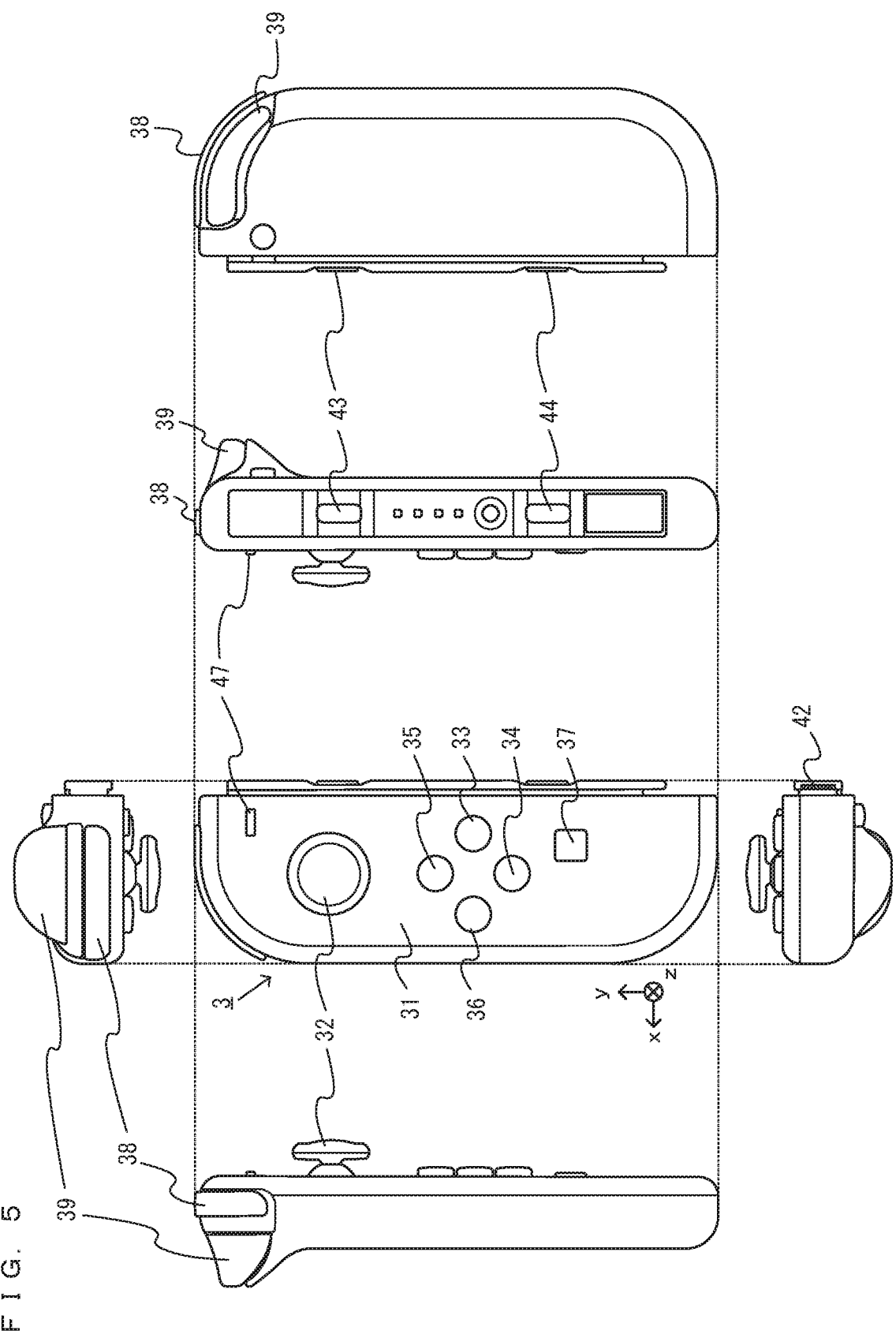
FIG. 5 is six orthogonal views showing a non-limiting example of the left controller 3.

FIG. 5 is six orthogonal views showing a non-limiting example of the left controller 3. As shown in FIG. 5, the left controller 3 includes a housing 31. In this non-limiting example, the housing 31 has a vertically long shape, e.g., is shaped to be long in an up-down direction (i.e., a y-axis direction shown in FIGS. 2 and 5). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 5, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in this non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 6:
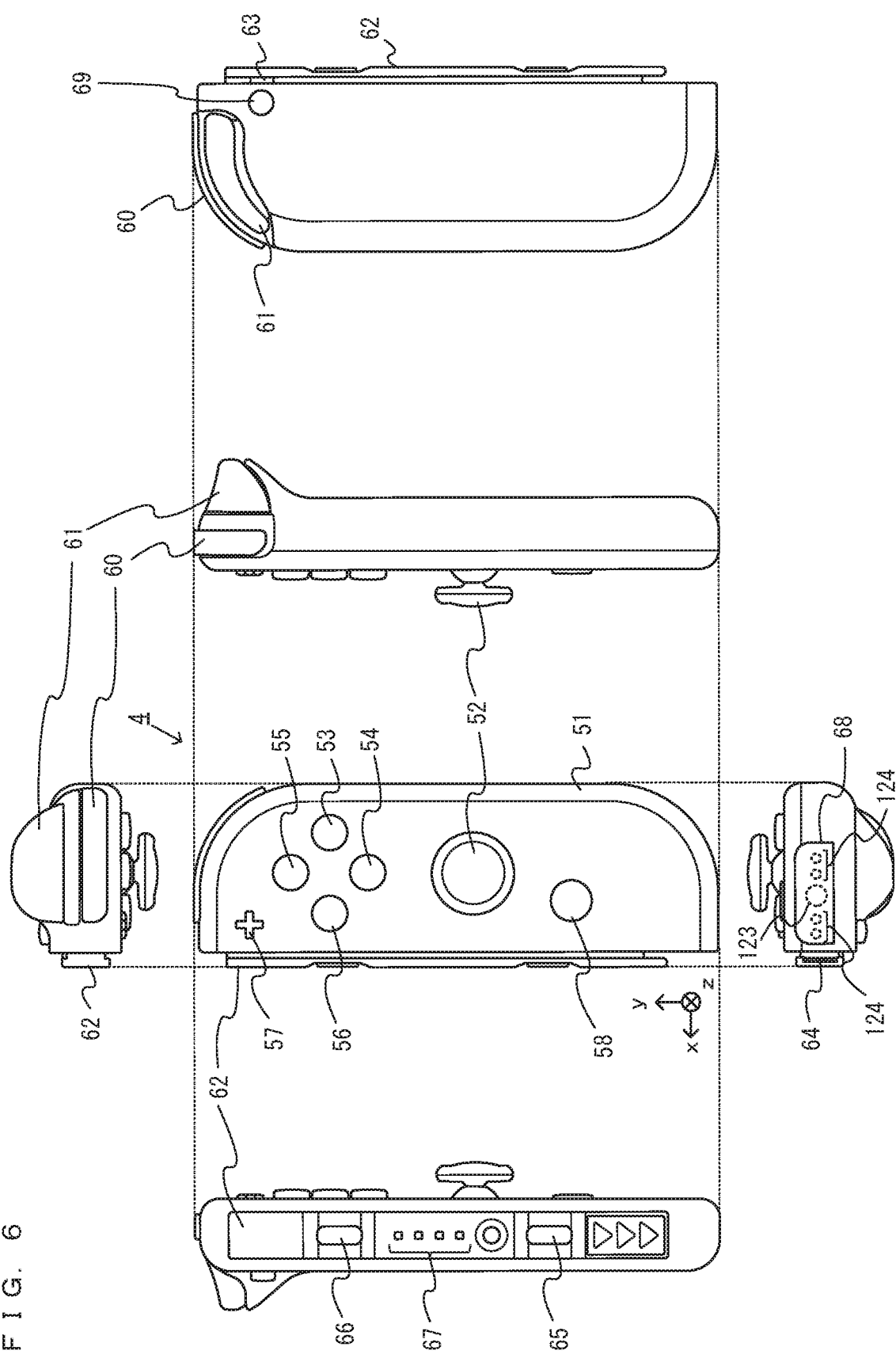
FIG. 6 is six orthogonal views showing a non-limiting example of the right controller 4.

FIG. 6 is six orthogonal views showing a non-limiting example of the right controller 4. As shown in FIG. 6, the right controller 4 includes a housing 51. In this non-limiting example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In this non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 6) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 6) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in this non-limiting example, the infrared image capturing section 123 itself includes a filter member for inhibiting the transmission of light of a wavelength other than light sensed by the camera (infrared light in this non-limiting example). In another non-limiting example, the window portion 68 may have the function of a filter.

Further, the right controller 4 includes a terminal 64 for allowing the right controller 4 to perform wired communication with the main body apparatus 2.

Figure 7:
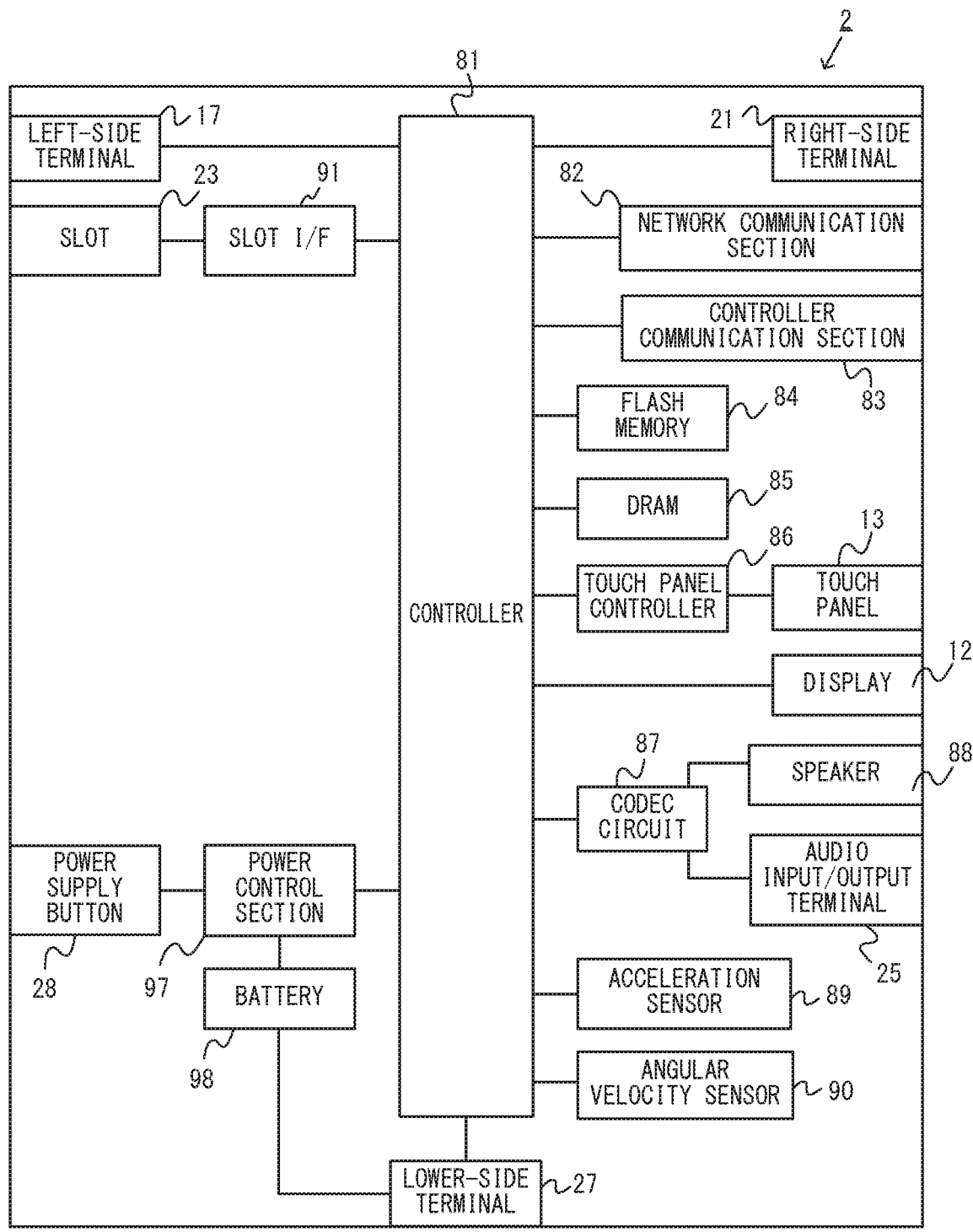
FIG. 7 is a block diagram showing a non-limiting example of an internal configuration of the main body apparatus 2.

FIG. 7 is a block diagram showing a non-limiting example of an internal configuration of the main body apparatus 2. The main body apparatus 2 includes components 81 to 91, 97, and 98 shown in FIG. 7 in addition to the components shown in FIG. 4. Some of the components 81 to 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In this non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication," in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In this non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in this non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. In a non-limiting example, a first user can provide an input to the main body apparatus 2 using a first set of left and right controllers 3 and 4, and at the same time, a second user can provide an input to the main body apparatus 2 using a second set of left and right controllers 3 and 4.

The main body apparatus 2 includes a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

Further, the main body apparatus 2 includes an acceleration sensor 89. In this non-limiting example, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In this non-limiting example, the angular velocity sensor 90 detects angular velocities about predetermined three axes (e.g., the x-, y-, and z-axes shown in FIG. 2). It should be noted that the angular velocity sensor 90 may detect an angular velocity about one axis or angular velocities about two axes.

The acceleration sensor 89 and the angular velocity sensor 90 are connected to the processor 81. The detection results of the acceleration sensor 89 and the angular velocity sensor 90 are output to the processor 81. Based on the detection results of the acceleration sensor 89 and the angular velocity sensor 90, the processor 81 can calculate information about a motion and/or orientation of the main body apparatus 2.

The main body apparatus 2 includes a power control section 97 and a battery 98. The power control section 97 is connected to the battery 98 and the processor 81. Further, although not shown, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 8:
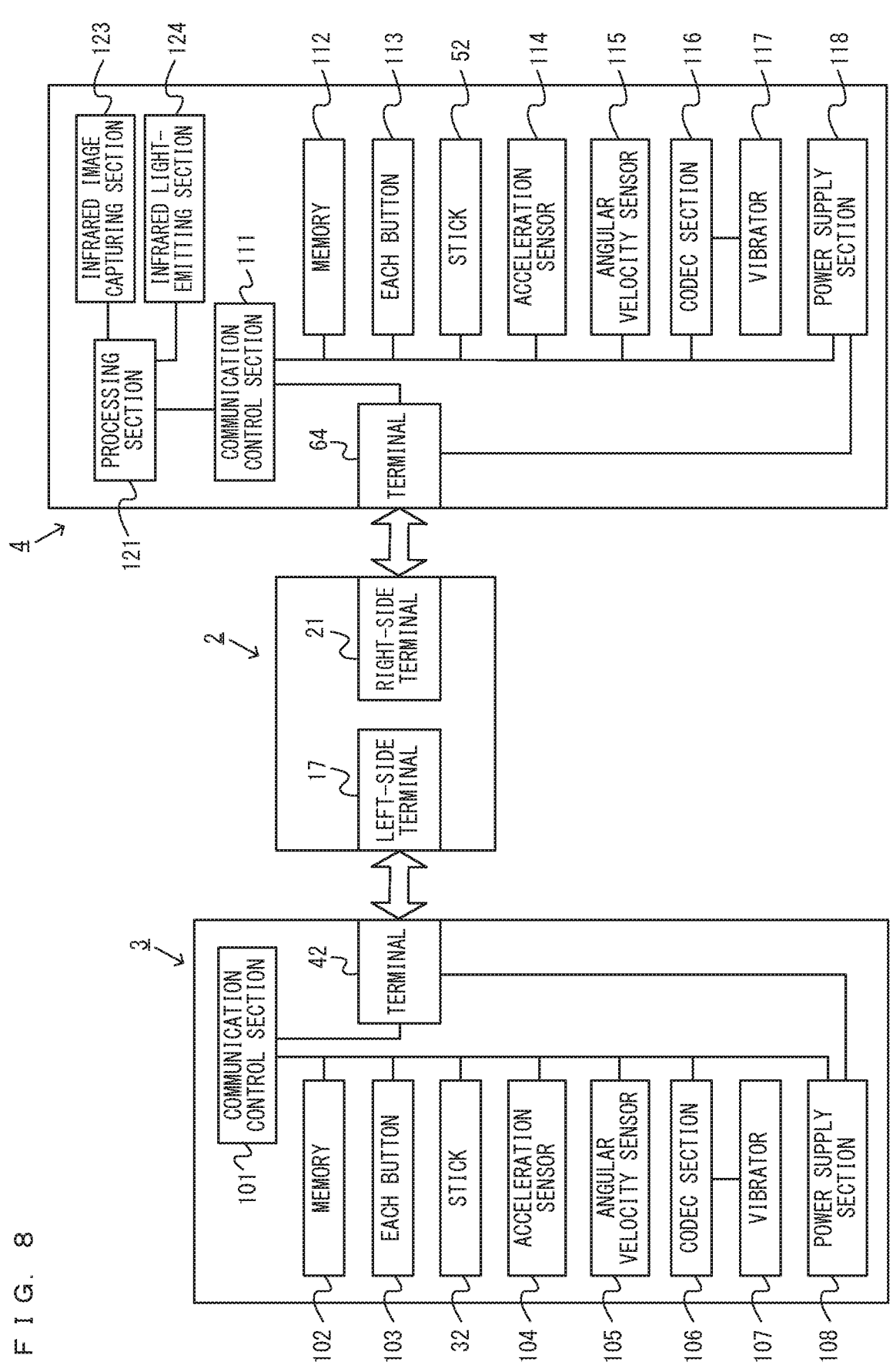
FIG. 8 is a block diagram showing examples of internal configurations of the main body apparatus 2, the left controller 3, and the right controller 4.

FIG. 8 is a block diagram showing examples of the internal configurations of the main body apparatus 2, the left controller 3, and the right controller 4. It should be noted that the details of the internal configuration of the main body apparatus 2 are shown in FIG. 7 and therefore are omitted in FIG. 8.

The left controller 3 includes a communication control section 101, which communicates with the main body apparatus 2. As shown in FIG. 8, a communication control section 101 is connected to components including the terminal 42. In this non-limiting example, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 8) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In this non-limiting example, the acceleration sensor 104 detects the magnitudes of accelerations along predetermined three axial (e.g., xyz axes shown in FIG. 5) directions. It should be noted that the acceleration sensor 104 may detect an acceleration along one axial direction or accelerations along two axial directions. In this non-limiting example, an angular velocity sensor 105 detects angular velocities about predetermined three axes (e.g., the xyz axes shown in FIG. 5). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing. Note that the inertial sensor (e.g., the acceleration sensor 104 and the angular velocity sensor 105) included in the left controller 3 corresponds to a non-limiting example of a motion sensor of a second input apparatus.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In this non-limiting example, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In this non-limiting example, a vibration control signal transmitted from the main body apparatus 2 to the left controller 3 may be a digital signal representing the frequency and the amplitude every unit of time. In another non-limiting example, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In this non-limiting example, the power supply section 108 includes a battery and a power control circuit. Although not shown in FIG. 8, the power control circuit is connected to the battery and also connected to components of the left controller 3 (specifically, components that receive power supplied from the battery).

As shown in FIG. 8, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3. It should be noted that the inertial sensors (e.g., the acceleration sensor 114 and the angular velocity sensor 115) correspond to a non-limiting example of a motion sensor of a first input apparatus.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in this non-limiting example, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in this non-limiting example, the infrared image capturing section 123 including an infrared camera is used. In another non-limiting example, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the infrared image capturing section 123 and the infrared light-emitting section 124.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

Figure 9:
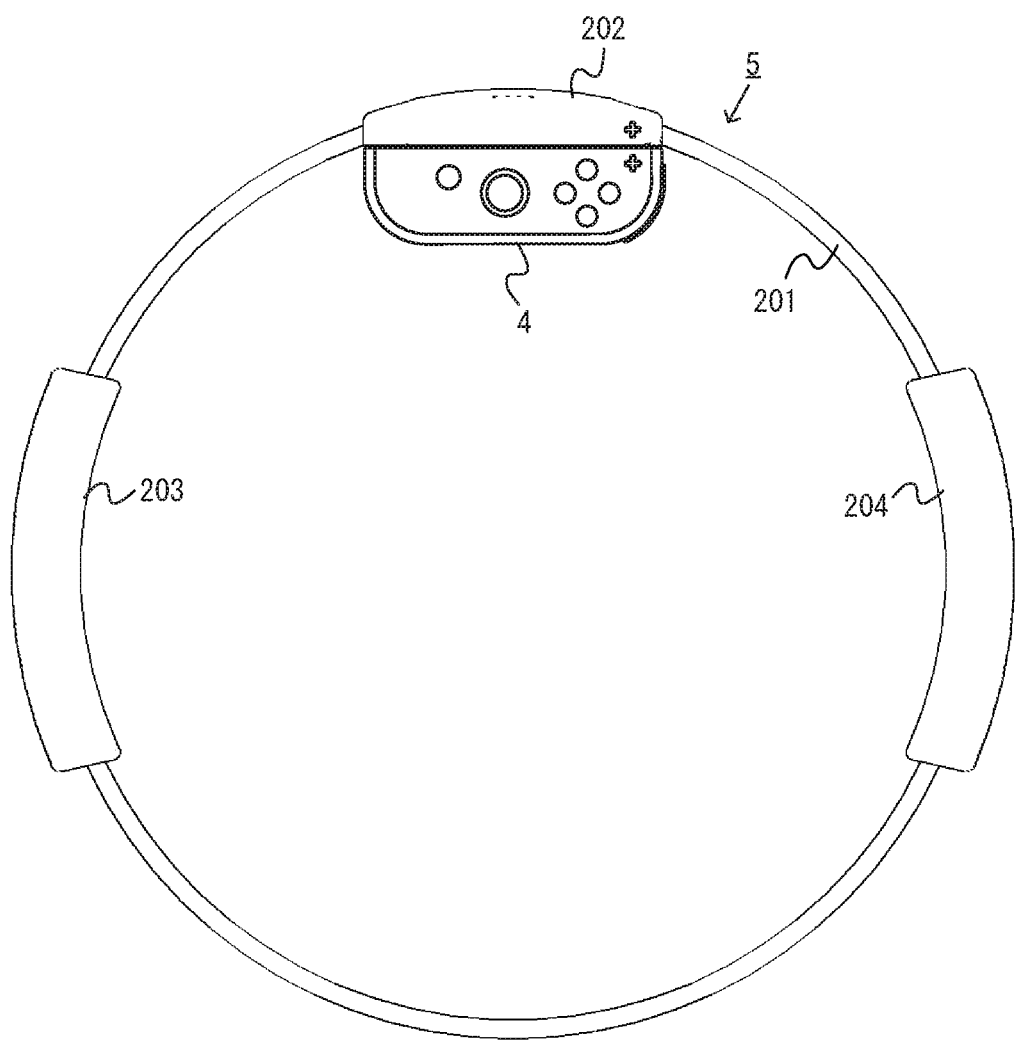
FIG. 9 is a diagram showing a non-limiting example of a ring-shaped extension apparatus.

FIG. 9 is a diagram showing a non-limiting example of a ring-shaped extension apparatus. It should be noted that FIG. 9 shows the ring-shaped extension apparatus 5 with the right controller 4 attached thereof. In this non-limiting example, the ring-shaped extension apparatus 5 is an extension apparatus to which the right controller 4 can be attached. Although the details will be described later, the user performs a novel operation of applying a force to, and deforming, the ring-shaped extension apparatus 5 in this non-limiting example. The user can operate the ring-shaped extension apparatus 5 by performing a fitness exercise operation using the ring-shaped extension apparatus 5 as if the user were doing an exercise, for example. It should be noted that the ring-shaped extension apparatus 5 corresponds to a non-limiting example of the first input apparatus.

As shown in FIG. 9, the ring-shaped extension apparatus 5 includes a ring-shaped portion 201 and a main portion 202. The ring-shaped portion 201 has a ring shape. Note that in this non-limiting example, the ring-shaped portion 201 includes an elastic member and a base portion to be described below, which together form a ring shape. In this non-limiting example, the ring-shaped portion 201 has a circular ring shape. Note that in other non-limiting examples, the ring-shaped portion 201 may be of any suitable shape, e.g., an elliptical ring shape.

The main portion 202 is provided on the ring-shaped portion 201. The main portion 202 has a rail portion (not shown). The rail portion is a non-limiting example of an attachment portion to which the right controller 4 can be attached. In this non-limiting example, the rail portion is slidably engaged with a slider 62 (see FIG. 6) of the right controller 4. When the slider 62 is inserted into a rail member in a predetermined linear direction (i.e., a slide direction), the rail member is engaged with the slider 62 while the slider 62 is allowed to be slid in the linear direction relative to the rail member. Note that the rail portion is similar to that of the main body apparatus 2 in that the rail portion can be slidably engaged with the slider of the controller. Therefore, the rail portion may have a structure similar to that of the rail portion of the main body apparatus 2.

In this non-limiting example, the right controller 4 includes a latch portion 63 (see FIG. 6). The latch portion 63 is provided so as to protrude sideways (i.e., the z-axis positive direction shown in FIG. 6) from the slider 62. While the latch portion 63 is allowed to move into the slider 62, the latch portion 63 is urged (e.g., by means of a spring) into the position described above in which the latch portion 63 is protruding sideways. The rail portion is provided with a notch. In a state where the slider 62 is inserted to the far end of the rail portion, the latch portion 63 snaps into the notch. With the slider 62 inserted to the far end of the rail portion 211, the latch portion 63 snaps into the notch 219. As the latch portion 63 engages with the notch while the rail portion is in engagement with the slider 62, the right controller 4 is attached to the main portion 202.

Note that the right controller 4 includes the release button 69 that can be pressed (see FIG. 6). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 9, the ring-shaped extension apparatus 5 has grip covers 203 and 204. The grip covers 203 and 204 are parts that are held by the user. In this non-limiting example, the grip covers 203 and 204 are removable from the ring-shaped portion 201. In this non-limiting example, the left grip cover 203 is provided on the left grip portion near the left end of the ring-shaped portion 201, and the right grip cover 204 is provided on the right grip portion near the right end of the ring-shaped portion 201. Note that there is no limitation on the number of grip portions, and the grip portions may be provided at three or more locations, or at only one location, depending on the operation method or methods contemplated. Depending on the content of the game (or the content of the fitness exercise operation to be performed by the user in the game), only a particular one or particular ones of a plurality of grip portions may be held by one hand or both hands.

Figure 10:
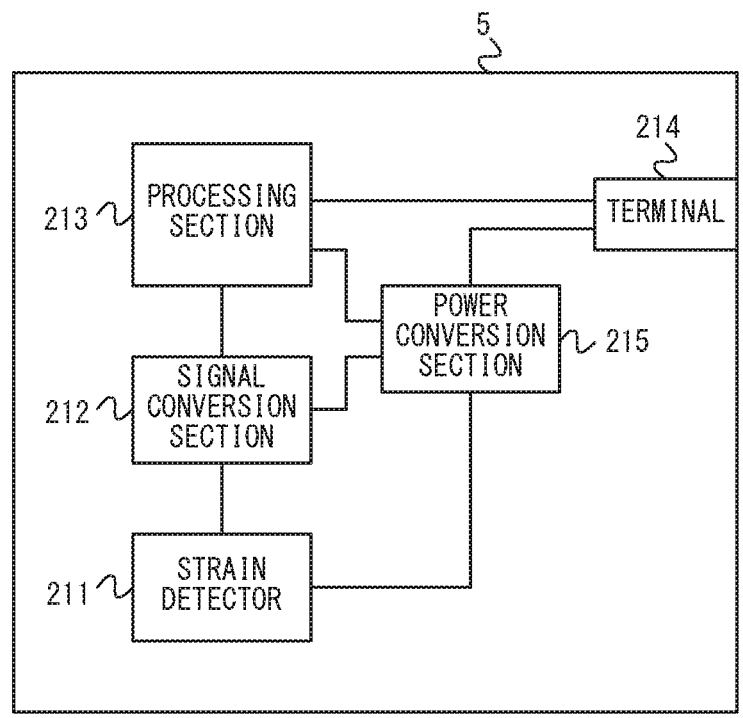
FIG. 10 is a block diagram showing a non-limiting electrical coupling relationship between components included in the ring-shaped extension apparatus 5.

FIG. 10 is a block diagram showing a non-limiting electrical connection relationship between components included in the ring-shaped extension apparatus 5. As shown in FIG. 10, the ring-shaped extension apparatus 5 includes a strain detector 211. The strain detector 211 is a non-limiting example of a detector that detects when the ring-shaped portion 201 is deformed. In this non-limiting example, the strain detector 211 includes a strain gauge. The strain detector 211 outputs a signal indicating a strain of a base portion that depends on a deformation of an elastic member to be described below (in other words, a signal indicating the magnitude and direction of deformation of the elastic member).

Here, in this non-limiting example, the ring-shaped portion 201 has an elastically deformable elastic portion and a base portion. The base portion holds opposite end portions of the elastic member so that the base portion and the elastic member together form a ring. Note that the base portion is provided inside the main portion 202, and therefore, is not shown in FIG. 9. The base portion is formed of a material having a stiffness higher than that of the elastic member. For example, the elastic member is formed of a resin (specifically, a fiber reinforced plastic (FRP)), and the base portion is formed of a metal. The strain gauge, which is provided on the base portion, detects a strain of the base portion. When the ring-shaped portion 201 is deformed from a steady state thereof, a strain occurs in the base portion due to the deformation. The strain of the base portion is detected by the strain gauge. Based on the detected strain, a direction (i.e., a direction in which the two grip covers 203 and 204 move toward each other or away from each other) and amount of deformation of the ring-shaped portion 201 can be calculated. As used herein, the "steady state" with respect to the ring-shaped portion 201, in which the elastic member is shaped into a ring so that the base portion and the elastic member together form a ring, indicates that a force that could deform the ring shape of the elastic member is not applied externally (e.g., from the user) to the ring-shaped portion 201 with the base portion holding the opposite end portions of the elastic member. As used herein, the term "deformed state" with respect to the ring-shaped portion 201 indicates a state that the ring-shaped portion 201 is deformed from the steady state when a force is externally applied thereto. The strain gauge detects a strain that occurs when the ring-shaped portion 201 is deformed from the ring shape, where the initial value is the strain value of the ring shape.

Note that in another non-limiting example, the strain detector 211 includes any suitable sensor that can detect when the ring-shaped portion 201 is deformed from the steady state, instead of the strain gauge. For example, the detector 211 may include a pressure sensor that can detect an applied pressure when the ring-shaped portion 201 is deformed, or a flex sensor that can detect the amount of bending of the ring-shaped portion 201.

The ring-shaped extension apparatus 5 includes a signal conversion section 212. In this non-limiting example, the signal conversion section 212 includes an amplifier and an A/D converter. The signal conversion section 212 is electrically connected to the strain detector 211, and amplifies an output signal from the strain detector 211 by the amplifier and performs an A/D conversion by the A/D converter. The signal conversion section 212 outputs a digital signal indicating a strain value detected by the strain detector 211. Note that in another non-limiting example, the signal conversion section 212 may not include an A/D converter, and a processing section 213 to be described below may include an A/D converter.

The ring-shaped extension apparatus 5 includes a processing section 213. The processing section 213 is a processing circuit including a processor and a memory, and is, for example, a microcontroller unit (MCU). The processing section 213 is electrically connected to the signal conversion section 212, and receives an output signal from the signal conversion section 212. The ring-shaped extension apparatus 5 includes a terminal 214. The terminal 214 is electrically connected to the processing section 213. When the right controller 4 is attached to the ring-shaped extension apparatus 5, the processing section 213 sends information (in other words, ring operation data to be described below) indicating a strain value indicated by an output signal from the signal conversion section 212 to the right controller 4 via the terminal 214.

The ring-shaped extension apparatus 5 includes a power conversion section 215. The power conversion section 215 is electrically connected to the above elements 211-214. The power conversion section 215 supplies external power received via the terminal 214 (i.e., power supplied from the right controller 4) to the elements 211-214. The power conversion section 215 may, for example, adjust the voltage of the received power before supplying the power to the elements 211-214.

Note that the "data regarding the detection result of the strain detector" that is transmitted by the ring-shaped extension apparatus 5 to another device may be data representing the detection result (in this non-limiting example, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the amount of deformation of the elastic member based on the strain value, which is the detection result, and the "data regarding the detection result of the strain detector" may be data that represents the amount of deformation.

Note that in other non-limiting examples, the ring-shaped extension apparatus 5 may include a battery and may operate by using power from the battery. The battery of the ring-shaped extension apparatus 5 may be a rechargeable battery that can be charged by power supplied from the right controller 4.

Figure 11:
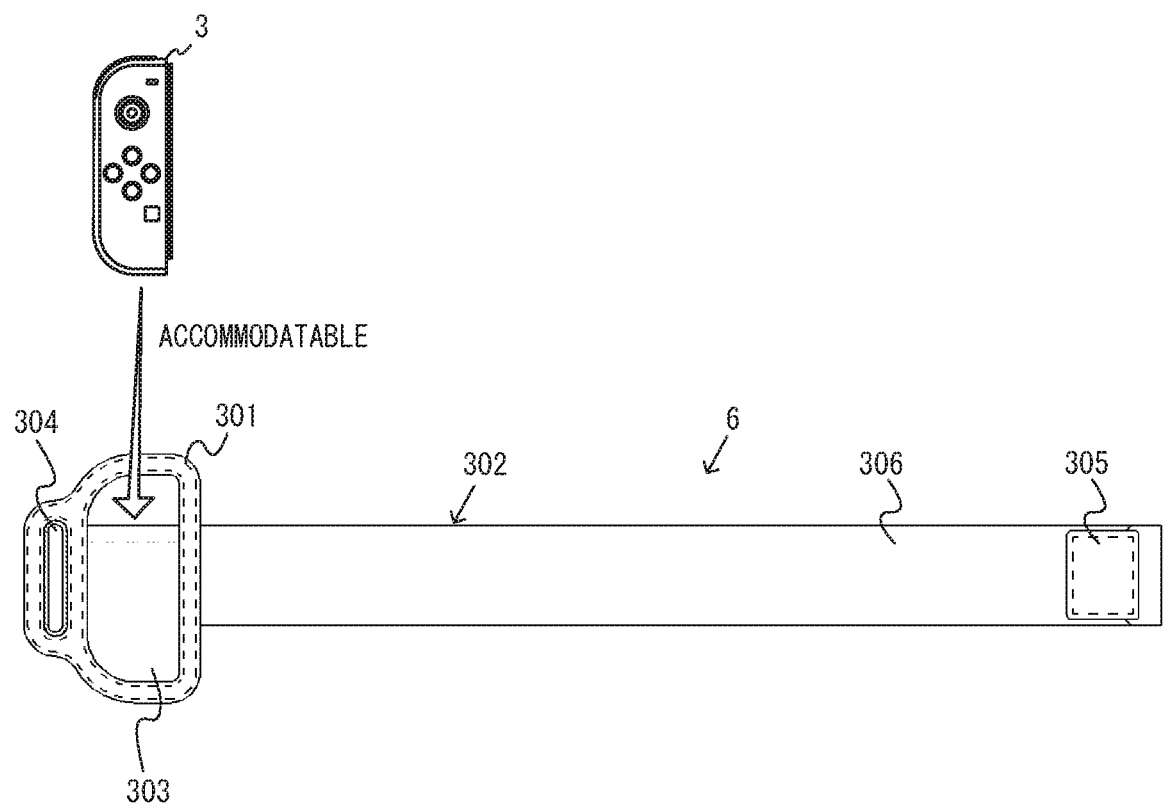
FIG. 11 is a diagram showing a non-limiting example of a belt-shaped extension apparatus 6.

FIG. 11 is a diagram showing a non-limiting example of a belt-shaped extension apparatus. The belt-shaped extension apparatus 6 is fastened to a leg of the user with the left controller 3 attached to the belt-shaped extension apparatus 6 (see FIG. 12). As shown in FIG. 11, the belt-shaped extension apparatus 6 includes an accommodating portion 301 and a belt portion 302. The accommodating portion 301 has a flat shape and is capable of accommodating the left controller 3 therein. Specifically, the accommodating portion 301 includes a pocket portion 303. The pocket portion 303 is formed in a bag shape that is sized so that the left controller 3 can be accommodated therein. In this non-limiting example, as the left controller 3 is accommodated in the accommodating portion 301, the left controller 3 is attached to the belt-shaped extension apparatus 6. Note that in other non-limiting examples, there is no limitation on the configuration for attaching the left controller 3 to the belt-shaped extension apparatus 6. Note that the belt-shaped extension apparatus 6 corresponds to a non-limiting example of the second input apparatus.

The accommodating portion 301 includes a through hole 304 on one side of the pocket portion 303. The belt portion 302 is provided on one side of the pocket portion 303 of the accommodating portion 301, i.e., on the opposite side from the through hole 304 with respect to the pocket portion 303. The belt portion 302 has a band shape, and one end thereof is secured to the accommodating portion 301. In this non-limiting example, the belt portion 302 is made of a flexible material (e.g., a woven rubber).

A first touch fastener 305 and a second touch fastener 306 are provided on the surface of the belt portion 302 on the same side as the pocket portion 303 is provided on the accommodating portion 301. The first touch fastener 305 is provided near the end portion of the belt portion 302 that is on the opposite side from the other end portion that is secured to the accommodating portion 301. The second touch fastener 306 is provided on the same surface as the first touch fastener 305 and on the side that is closer to the accommodating portion 301 than the first touch fastener 305. The first touch fastener 305 and the second touch fastener 306 can be attached to and detached from each other. For example, the first touch fastener 305 may be a hook-surface touch fastener, and the second touch fastener 306 is a loop-surface touch fastener.

When fastening the belt-shaped extension apparatus 6, the user passes the belt portion 302 through the through hole 304 with the belt portion 302 wound around a leg, and the user fastens together the first touch fastener 305 and the second touch fastener 306. Thus, the user can fasten the belt-shaped extension apparatus 6, with the left controller 3 attached thereto, to a leg (see FIG. 12).

Figure 12:
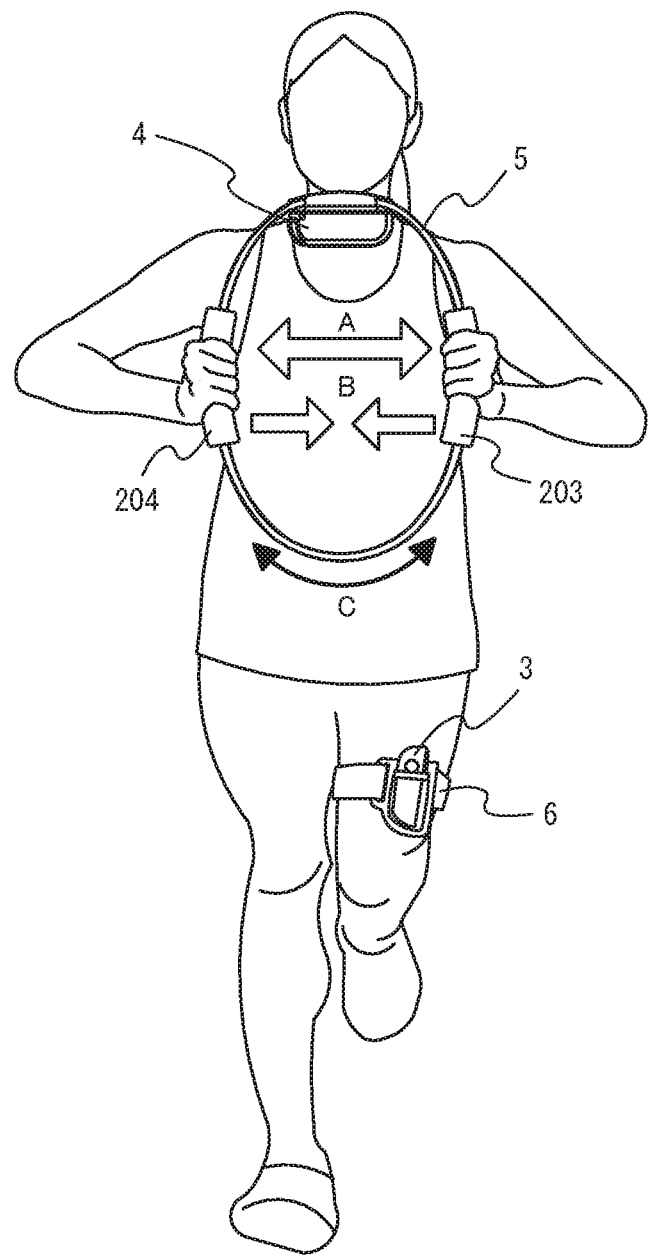
FIG. 12 is a diagram showing how a user uses the ring-shaped extension apparatus 5 and the belt-shaped extension apparatus 6.

FIG. 12 is a diagram showing how the user uses the ring-shaped extension apparatus 5 and the belt-shaped extension apparatus 6. As shown in FIG. 12, the user can play a game using the two extension apparatuses 5 and 6 in addition to the game apparatus (i.e., the main body apparatus 2 and the controllers 3 and 4). For example, the user can use a set of the ring-shaped extension apparatus 5 and the belt-shaped extension apparatus 6.

For example, as shown in FIG. 12, the user holds, with both hands, the ring-shaped extension apparatus 5 with the right controller 4 attached thereto, and fastens, to a leg, the belt-shaped extension apparatus 6 with the left controller attached thereto. In this case, the user can play a game by performing an operation on the ring-shaped extension apparatus 5 (e.g., an operation of bending the ring-shaped extension apparatus 5 and an operation of moving the ring-shaped extension apparatus 5), and an operation of moving the leg to which the belt-shaped extension apparatus 6 is fastened.

Note that FIG. 12 illustrates the user's action of bending the ring-shaped extension apparatus 5 while holding the grip covers 203 and 204. By performing such an action, the user can perform a fitness exercise action for exercising both arms as a gaming operation. Note that the user can perform various actions on the ring-shaped extension apparatus 5 to perform gaming operations. For example, the user holds one of the grip covers with both hands, and performs an action of bending the ring-shaped extension apparatus 5 with the other grip cover in contact with the abdomen. By this action, the user can perform a fitness exercise action for exercising arm muscles and abdominal muscles as a gaming operation. The user can also perform an action of bending the ring-shaped extension apparatus 5 with the ring-shaped extension apparatus 5 between both legs, particularly the grip covers 203 and 204 being in contact with both inner thighs. By this action, the user can perform a fitness exercise action of exercising leg muscles as a gaming operation.

Where the game process is executed on the main body apparatus 2, the right controller 4 receives the ring operation data from the ring-shaped extension apparatus 5. The ring operation data includes information that represents the strain value. Specifically, the processing section 213 of the ring-shaped extension apparatus 5 transmits the ring operation data to the right controller 4 through the terminal 214. For example, the processing section 213 repeatedly transmits the ring operation data at the rate of once per a predetermined amount of time.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that in the state that the right controller is attached to the ring-shaped extension apparatus 5, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

On the other hand, where the game process is executed on the main body apparatus 2, the communication control section 101 of the left controller 3 transmits the left controller operation data including information obtained from the input sections included in the left controller 3 (specifically, the buttons 103, the analog stick 32 and the sensors 104 and 105) to the main body apparatus 2. When the left controller 3 is attached to the belt-shaped extension apparatus 6, the communication from the left controller 3 to the main body apparatus 2 is done by wireless communication.

(First Non-Limiting Example Game)

Figure 13:
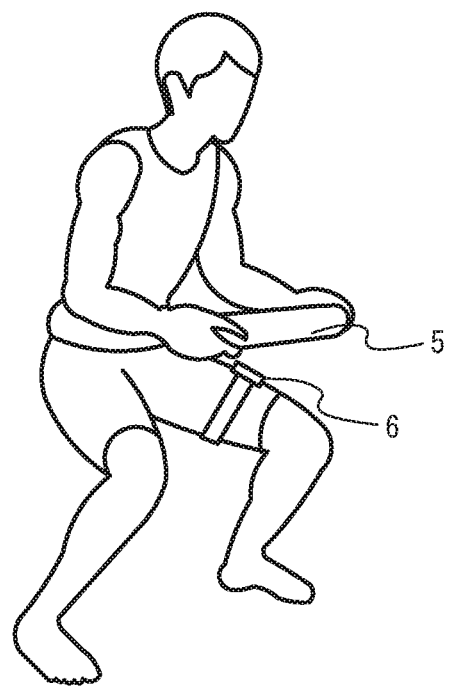
FIG. 13 is a diagram showing a non-limiting example of how, in a first non-limiting example game, the user operates the ring-shaped extension apparatus 5.

Next, before describing a specific process in a first non-limiting example game performed by the main body apparatus 2, the first non-limiting example game performed in the main body apparatus 2 will be outlined with reference to FIGS. 13-15. Note that FIG. 13 is a diagram showing a non-limiting example of how, in the first non-limiting example game, the user operates the ring-shaped extension apparatus 5. FIG. 14 is a diagram showing a first non-limiting example of a game image displayed on the stationary monitor 9 according to the user's operation in the first non-limiting example game. FIG. 15 is a diagram showing a second non-limiting example of a game image displayed on the stationary monitor 9 according to the user's operation in the first non-limiting example game.

As shown in FIG. 13, in the first non-limiting example game, while holding both of the grip covers 203 and 204 of the ring-shaped extension apparatus 5 with both hands, the user performs an operation of deforming the ring-shaped extension apparatus 5 with both hands so that the two grip covers 203 and 204 of the ring-shaped extension apparatus 5 move toward each other, and an operation of moving both knees so that the knees are bent and extended. By such an operation of bending and extending the knees, the belt-shaped extension apparatus 6 fastened to the user's left thigh is also moved. Here, when the user bends and extends both knees while deforming the ring-shaped extension apparatus 5 so that the two grip covers 203 and 204 move toward each other, the user performs a gaming operation of performing an action of moving the ring-shaped extension apparatus 5 vertically, i.e., upward and downward while applying a force to the ring-shaped extension apparatus 5 held with both hands.

As described above, in the game system 1 of this non-limiting example, the left controller 3 and the right controller 4 are removable from the main body apparatus 2. In addition, as shown in FIGS. 14 and 15, when the main body apparatus 2 alone is attached to the cradle 8, an image (and sound) can be output from the stationary monitor 9. The game system 1 will now be described, assuming the situation that the left controller 3 and the right controller 4 are removed from the main body apparatus 2, the main body apparatus 2 alone is attached to the cradle 8, and an image (and sound) is output from the stationary monitor 9 connected to the cradle 8. In a non-limiting example, the user performs a gaming operation using the right controller 4 attached to the ring-shaped extension apparatus 5 and the left controller attached to the belt-shaped extension apparatus 6. In a non-limiting example of a game process in the first non-limiting example game, used is a process of causing movement objects OBJ2a and OBJ2b displayed on the stationary monitor 9 to move vertically and horizontally according to the user's operation so that a target object OBJ1 rotating in the virtual game space is deformed. Although in a non-limiting example shown in FIGS. 14 and 15, the target object OBJ1 is a cylindrical object, the target object OBJ1 may be a rotating object having other shapes or a non-rotating object having other shapes.

For example, in FIG. 14, the target object OBJ1 is disposed in the virtual game space. A pair of the movement objects OBJ2a and OBJ2b are disposed on the left and right sides of the target object OBJ1. By moving the movement objects OBJ2a and OBJ2b into the rotating target object OBJ1 with the movement objects OBJ2a and OBJ2b kept in contact with the target object OBJ1 as if the movement objects OBJ2a and OBJ2b were pushed into the target object OBJ1, the target object OBJ1 can be deformed in any suitable form. The movement objects OBJ2a and OBJ2b can be moved vertically along the surface of the target object OBJ1 according to the user's operation of bending and extending the knees. In addition, the movement objects OBJ2a and OBJ2b can be moved from the surface to inside of the target object OBJ1, depending on the amount of deformation of the ring-shaped portion 201 of the ring-shaped extension apparatus 5, as if the movement objects OBJ2a and OBJ2b were pushed into the target object OBJ1. When as shown in FIG. 14 the ring-shaped portion 201 of the ring-shaped extension apparatus 5 is in the steady state, i.e., is not deformed, and the user is extending the knees (the left controller 3 is in an upright position, i.e., the negative y-axis direction of the left controller 3 points in the vertically downward direction), the movement objects OBJ2a and OBJ2b are located along an outer peripheral side surface at a top portion of the target object OBJ1. Note that the movement objects OBJ2a and OBJ2b correspond to a non-limiting example of an object disposed in a virtual space. The direction in which the movement objects OBJ2a and OBJ2b are moved vertically along the surface of the target object OBJ1 corresponds to a non-limiting example of a second direction in which an object is moved. The direction in which the movement objects OBJ2a and OBJ2b are moved from the surface to inside of the target object OBJ1 as if the movement objects OBJ2a and OBJ2b were pushed into the target object OBJ1 corresponds to a non-limiting example of a first direction in which an object is moved.

Meanwhile, as shown in FIG. 15, when an operation of deforming the ring-shaped portion 201 from the steady state so that the grip covers 203 and 204 move toward each other (a pressing operation for deformation in a B direction shown in FIG. 15) is performed, a pair of the movement objects OBJ2a and OBJ2b are each moved into the target object OBJ1, depending on the amount of deformation, as if the movement objects OBJ2a and OBJ2b were pushed into the target object OBJ1. Specifically, the movement object OBJ2a disposed along the outer peripheral side surface on the left side of the target object OBJ1, is moved rightward (a j-direction shown in FIG. 15) into the target object OBJ1 in a movement amount corresponding to the amount of deformation as if the movement object OBJ2a were pushed into the target object OBJ1. The movement object OBJ2b disposed along the outer peripheral side surface on the right side of the target object OBJ1, is moved into the target object OBJ1 leftward (a j-direction shown in FIG. 15) in a movement amount corresponding to the amount of deformation as if the movement object OBJ2b were pushed into the target object OBJ1. By a pair of the movement objects OBJ2a and OBJ2b being thus moved from the outer peripheral side surface to inside of the target object OBJ1 as if the movement objects OBJ2a and OBJ2b were pushed into the target object OBJ1, the target object OBJ1 is deformed as if the outer peripheral side surface were cut or carved. Specifically, the target object OBJ1 is deformed by portions thereof in contact with a pair of the movement objects OBJ2a and OBJ2b being cut in a cut amount corresponding to the amount of deformation of the ring-shaped extension apparatus 5. Note that the target object OBJ1 may be a hard object that can be cut by the movement objects OBJ2a and OBJ2b, or a fluid (e.g. a plastic fluid) or elastic solid that can be dented by the movement objects OBJ2a and OBJ2b. In the latter case, when the movement objects OBJ2a and OBJ2b are moved from the outer surface to inside of the target object OBJ1 as if the movement objects OBJ2a and OBJ2b were pushed into the target object OBJ1, the target object OBJ1 may be deformed so that the target object OBJ1 is dented at the pressed portions, and a part of the dented portion is displaced upward and downward. In that case, the target object OBJ1 is deformed as if the target object OBJ1 were pressed by the movement objects OBJ2a and OBJ2b.

Such a pressing operation of deforming the ring-shaped extension apparatus 5 is detected based on a strain detected by the strain gauge provided in the ring-shaped extension apparatus 5. When the ring-shaped portion 201 of the ring-shaped extension apparatus 5 is deformed from the steady state, a strain of the base portion is detected by the strain gauge. Based on the detected strain, a direction in which the ring-shaped portion 201 is deformed (i.e., a direction in which the two grip covers 203 and 204 move away from each other or toward each other) and the amount of deformation can be calculated. If the direction in which the ring-shaped portion 201 is deformed is the direction in which the two grip covers 203 and 204 move toward each other, a pair of the movement objects OBJ2a and OBJ2b are moved rightward and leftward, depending on the calculated amount of deformation, to cut a portion of the target object OBJ1, so that the target object OBJ1 can be deformed. Note that when the pressing operation is removed, a pair of the movement objects OBJ2a and OBJ2b end the action of cutting the target object OBJ1, and are disposed at the locations where the movement objects OBJ2a and OBJ2b are in contact with the outer peripheral side surface of the target object OBJ1. Note that the amount in which the movement objects OBJ2a and OBJ2b cut the target object OBJ1 may be calculated so that the cut amount at an inner portion of the target object OBJ1 is greater than the cut amount at an outer portion of the target object OBJ1.

When the user performs an action of bending and extending the knees, the belt-shaped extension apparatus 6 fastened to the user's left thigh is also moved. For example, the left controller 3 attached to the belt-shaped extension apparatus 6 fastened to the front portion of the user's left thigh, is moved according to the user's action of bending and extending the knees so that the left controller 3 is swayed around an axis extending in the lateral horizontal direction of the user perpendicular to the gravitational direction (vertically downward direction) in the real space, between an upright state (the longitudinal direction of the left controller 3 points in the vertically downward direction) and an elevation angle state (the longitudinal direction of the left controller 3 is closer to the front-back horizontal direction of the user than in the upright state) (a sway in an M direction in FIG. 15, also referred to as a "front-back sway"). In a non-limiting example, in the case where the left controller 3 is attached to the belt-shaped extension apparatus 6 so that the negative y-axis direction of the left controller 3 points in the vertically downward direction of the real space (i.e., the positive y-axis direction of the left controller 3 points in the vertically upward direction in the real space) when the user is standing still with their left foot on a floor, the body of the left controller 3 is moved to rotate around an axis extending in the user's lateral horizontal direction (the x-axis direction of the left controller 3) according to the user's bending of the knees so that the left controller 3 is transitioned from the upright state in which the negative y-axis direction of the left controller 3 points in the vertically downward direction to the elevation angle state in which the negative y-axis direction of the left controller 3 is closer to the horizontal direction than in the upright state.

In order to calculate a bending angle of the user's action of bending and extending the knees, an angle of the user's thigh (e.g., the left thigh) with reference to the gravitational acceleration may be calculated. The angle of the user's thigh may be calculated using at least one of an angular velocity and acceleration occurring on the left controller 3 using any suitable technique. In a non-limiting example, the calculation may be performed using both an angular velocity and acceleration occurring on the left controller 3. In a first non-limiting example, by adding up angular velocities around the x-axis direction occurring on the left controller 3, the orientation of the left controller 3 with reference to the gravitational acceleration, i.e., the bending angle of the user's action of bending and extending the knees, can be calculated. In a second non-limiting example, by detecting the direction of the gravitational acceleration acting on the left controller 3, and calculating an angle difference between the longitudinal direction (y-axis direction) of the left controller 3 and the direction of the gravitational acceleration, the bending angle of the user's action of bending and extending the knees can be calculated.

As shown in FIG. 15, when the user performs an action of bending and extending the knees with the belt-shaped extension apparatus 6 fastened to the front portion of the left thigh, a pair of the movement objects OBJ2a and OBJ2b are moved vertically (an i-direction shown in FIG. 15) according to the bending angle of the knee. Specifically, when the user's knee is fully extended (the longitudinal direction of the left controller 3 is in an upright position), the movement objects OBJ2a and OBJ2b are disposed at locations where the movement objects OBJ2a and OBJ2b are in contact with uppermost positions on the outer peripheral side surface of the target object OBJ1. As the bending angle of the user's knee becomes gradually greater, the movement objects OBJ2a and OBJ2b move downward along the outer peripheral side surface of the target object OBJ1. Here, the movement objects OBJ2a and OBJ2b are maintained at locations where the movement objects OBJ2a and OBJ2b are in contact with the outer peripheral side surface of the target object OBJ1, and therefore, even when the movement objects OBJ2a and OBJ2b are being moved vertically according to the bending angle of the knee, the movement objects OBJ2a and OBJ2b are kept in contact with the outer peripheral side surface of the target object OBJ1. In other words, even when a portion of the outer peripheral side surface of the target object OBJ1 is being cut, the movement objects OBJ2a and OBJ2b are moved along the shape of the outer peripheral side surface that is being cut.

Thus, the vertical locations of a pair of the movement objects OBJ2a and OBJ2b can be controlled according to the bending angle of the knees in the user's action of bending and extending the knees. Therefore, by adjusting the amount of deformation by a pressing operation performed on the ring-shaped extension apparatus 5 while adjusting the vertical locations of the movement objects OBJ2a and OBJ2b, the user can cut the outer peripheral side surface of the target object OBJ1 at any suitable locations in any suitable amounts, and thereby deform the target object OBJ1. In a first non-limiting example game, a sample image SP that is a goal of deformation of the target object OBJ1 is displayed, and game points are calculated based on a similarity between the deformed target object OBJ1 and the sample image SP.

Note that the user's operation of bending and extending the knees may be determined using an output of the right controller 4 or other input apparatuses in addition to an output of a motion sensor included in the left controller 3 (the belt-shaped extension apparatus 6).

In the first non-limiting example game, in a non-limiting example, when an operation of vertically moving the movement objects OBJ2a and OBJ2b is performed simultaneously with a pressing operation for deforming the ring-shaped extension apparatus 5 to deform the target object OBJ1, the operation of deforming the target object OBJ1 may be continued while the movement objects OBJ2a and OBJ2b are being moved vertically. Alternatively, in another non-limiting example, when an operation of vertically moving the movement objects OBJ2a and OBJ2b is performed simultaneously with a pressing operation for deforming the ring-shaped extension apparatus 5 to deform the target object OBJ1, one of these operations may be performed with higher priority. For example, when an operation of vertically moving the movement objects OBJ2a and OBJ2b is performed simultaneously with a pressing operation for deforming the ring-shaped extension apparatus 5 to deform the target object OBJ1, the operation of deforming the target object OBJ1 may be temporarily stopped, and the vertical movement of the movement objects OBJ2a and OBJ2b may be performed with higher priority, and after the vertical movement, when the operation of pressing the ring-shaped extension apparatus 5 is temporarily removed and is resumed, the operation of deforming the target object OBJ1 may be resumed.

Figure 16:
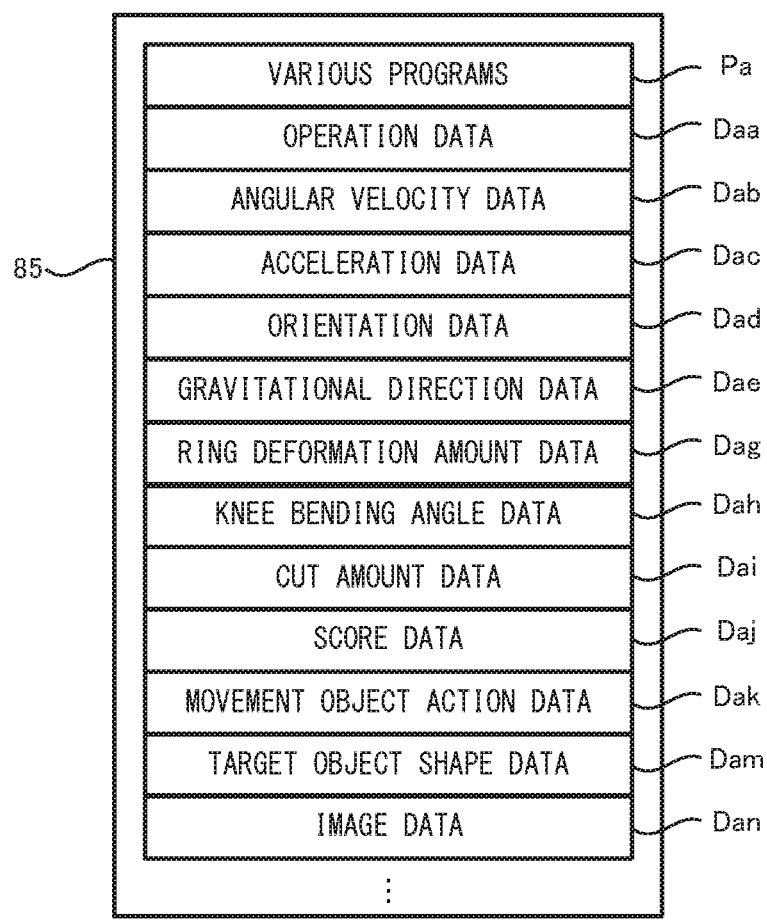
FIG. 16 is a diagram showing a non-limiting example of a data area contained in a DRAM 85 of the main body apparatus 2 in the first non-limiting example game.

Next, a non-limiting example of a specific process that is executed by the game system 1 in the first non-limiting example game will be described with reference to FIGS. 16-19. FIG. 16 is a diagram showing a non-limiting example of a data area contained in the DRAM 85 of the main body apparatus 2 in the first non-limiting example game. Note that in addition to the data of FIG. 16, the DRAM 85 also stores data that is used in other processes, which will not be described in detail.

In the first non-limiting example game, various programs Pa that are executed in the game system 1 are stored in a program storage area of the DRAM 85. In this non-limiting example, the programs Pa include a communication program for performing wireless communication with the right controller 4, an application program (e.g., a game program) for performing information processing based on data obtained from the right controller 4, etc. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

In the first non-limiting example game, various kinds of data that are used in processes such as a communication process and an information process that are executed in the game system 1 are stored in a data storage area of the DRAM 85. In this non-limiting example, the DRAM 85 stores operation data Daa, angular velocity data Dab, acceleration data Dac, orientation data Dad, gravitational direction data Dae, ring deformation amount data Dag, knee bending angle data Dah, cut amount data Dai, score data Daj, movement object action data Dak, target object shape data Dam, and image data Dan, etc.

The operation data Daa is obtained from each of the left controller 3 and the right controller 4 as appropriate. As described above, the operation data transmitted from the left controller 3 and the right controller 4 includes information about an input from each input section (specifically, each button, an analog stick, or each sensor) (specifically, information about an operation, and the result of detection by each sensor), and a strain value indicating a state of deformation of the ring-shaped portion 201 of the ring-shaped extension apparatus 5. In this non-limiting example, operation data is transmitted from each of the left controller 3 and the right controller 4 at predetermined time intervals through wireless communication. The received operation data is used to update the operation data Daa as appropriate. Note that the operation data Daa may be updated for each frame that is the cycle of a process executed in the game system 1, or may be updated each time operation data is received through the wireless communication.

The angular velocity data Dab indicates the history of angular velocities occurring on each of the left controller 3 and the right controller 4 that have been obtained during a period of time from the current time to a predetermined time before. The angular velocities are included in the operation data obtained from the left controller 3 and the right controller 4. For example, the angular velocity data Dab includes the history of data indicating angular velocities about the x-, y-, and z-axes occurring on each of the left controller 3 and the right controller 4, etc.

The acceleration data Dac indicates the history of accelerations occurring on each of the left controller 3 and the right controller 4 that have been obtained during a period of time from the current time to a predetermined time before. The accelerations are included in the operation data obtained from the left controller 3 and the right controller 4. For example, the acceleration data Dac includes the history of data indicating accelerations in the x-, y-, and z-axis directions occurring on each of the left controller 3 and the right controller 4, etc.

The orientation data Dad indicates an orientation of each of the left controller 3 and the right controller 4 in the real space. In a non-limiting example, the orientation data Dad indicates the x-, y-, and z-axis directions (e.g., angles with respect to X, Y, and Z axes in the real space) of the left controller 3 and the right controller 4 in the real space.

The gravitational direction data Dae indicates the direction of a gravitational acceleration acting on each of the left controller 3 and the right controller 4.

The ring deformation amount data Dag indicates the direction and amount of deformation of the ring-shaped extension apparatus 5.

The knee bending angle data Dah indicates the bending angle of the knee that the user bends and extends.

The cut amount data Dai indicates the amount of the target object OBJ1 that is cut for deformation.

The score data Daj indicates a current game score.

The movement object action data Dak indicates the locations, states, orientations, actions, etc., of the movement objects OBJ2a and OBJ2b disposed in the virtual game space. The target object shape data Dam indicates the shape of the target object OBJ1.

The image data Dan is for displaying an image (e.g., an image of the target object OBJ1, images of the movement objects OBJ2a and OBJ2b, a field image, a background image, etc.) on a display screen.

Figure 17:
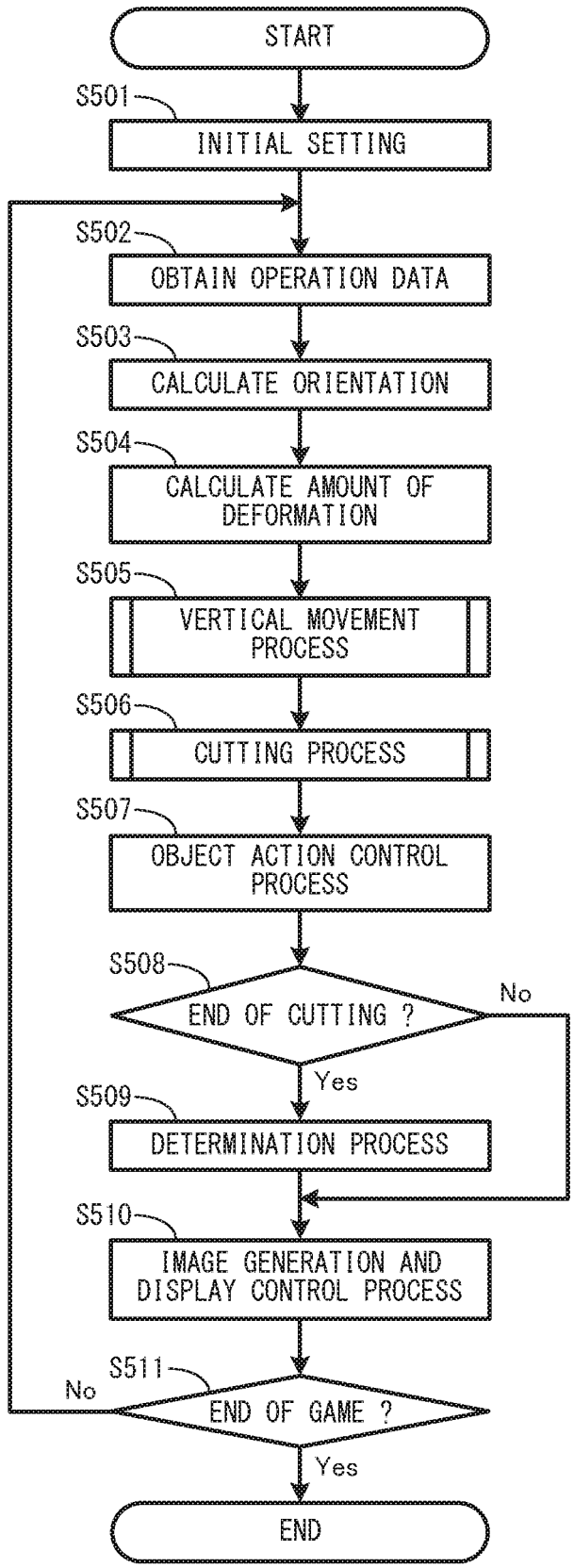
FIG. 17 is a flowchart showing a non-limiting example of an information process that is executed by the game system 1 in the first non-limiting example game.
Figure 18:
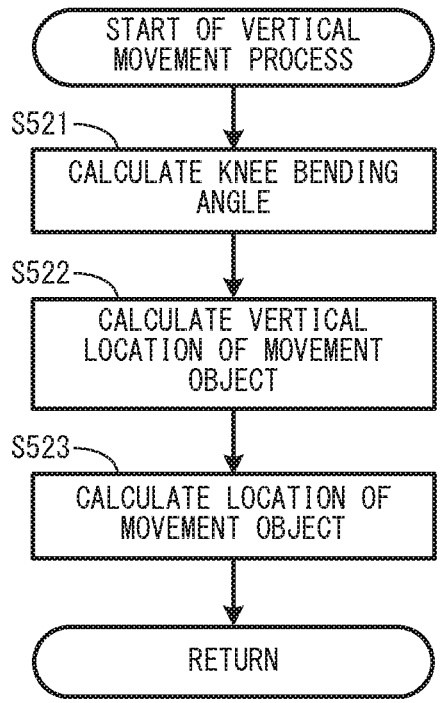
FIG. 18 is a subroutine showing a specific non-limiting example of a vertical movement process performed in step S505 shown in FIG. 17.
Figure 19:
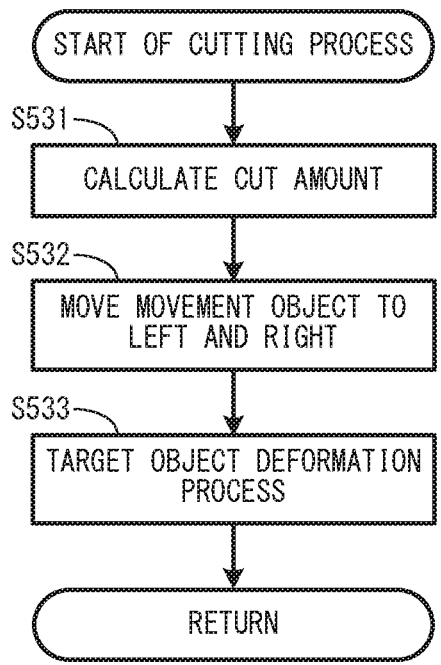
FIG. 19 is a subroutine of a specific non-limiting example of a cutting process performed in step S506 shown in FIG. 17.

Next, a specific non-limiting example of an information process in the first non-limiting example game will be described with reference to FIGS. 17-19. FIG. 17 is a flowchart showing a non-limiting example of an information process that is executed by the game system 1. FIG. 18 is a subroutine showing a specific non-limiting example of a vertical movement process that is performed in step S505 shown in FIG. 17. FIG. 19 is a subroutine of a specific non-limiting example of a cutting process that is performed in step S506 shown in FIG. 17. In the first non-limiting example game, a series of processes shown in FIGS. 17-19 are performed by the processor 81 executing a communication program and a predetermined application program (game program) included in the programs Pa. The information process of FIGS. 17-19 is started with any suitable timing.

Note that the steps in the flowchart of FIGS. 17-19, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 17-19 may be executed by a plurality of information processing apparatuses including the main body apparatus 2 cooperating with each other.

In FIG. 17 the processor 81 performs initial setting for the information process (step S501), and proceeds to the next step. For example, in the initial setting, the processor 81 initializes parameters for performing processes to be described below. For example, the processor 81 initially disposes, in the virtual game space, objects (including the target object OBJ1, and the movement objects OBJ2a and OBJ2b) to generate an initial state of the virtual game space, and updates the movement object action data Dak with the locations, directions, and orientations, etc., of the movement objects OBJ2a and OBJ2b. The processor 81 also updates the target object shape data Dam with the initial shape of the target object OBJ1. The processor 81 also sets the sample image SP indicating a goal of the following game.

Next, the processor 81 obtains operation data from each of the left controller 3 and the right controller 4 and updates the operation data Daa (step S502), and proceeds to the next step. Note that the processor 81 stores data indicating an angular velocity occurring on each of the left controller 3 and the right controller 4, which is included in the operation data obtained from each of the left controller 3 and the right controller 4 in step S502, into the angular velocity data Dab. The processor 81 also stores data indicating an acceleration occurring on each of the left controller 3 and the right controller 4, which is included in the operation data obtained from each of the left controller 3 and the right controller 4 in step S502, into the acceleration data Dac.

Next, the processor 81 calculates the orientation of the left controller 3 (step S503), and proceeds to the next step. For example, the processor 81 obtains the angular velocities about the x-, y-, and z-axes of the left controller 3 using angular velocity data stored in the angular velocity data Dab. Thereafter, the processor 81 turns the x-, y-, and z-axes with reference to the gravitational acceleration direction of the orientation of the left controller 3 indicated by the orientation data Dad, based on the respective angular velocities obtained, and stores the directions of the turned x-, y-, and z-axes with reference to the gravitational acceleration direction, as most recent data indicating the orientation of the left controller 3, into the orientation data Dad. The processor 81 also calculates the direction of the gravitational acceleration acting on the left controller 3 using acceleration data stored in the acceleration data Dac, and stores the calculated direction into the gravitational direction data Dae. Note that the gravitational acceleration may be extracted using any suitable technique. For example, an acceleration component averagely occurring on the left controller 3 may be calculated and extracted as the gravitational acceleration. The processor 81 may also corrects, as appropriate, the most recent orientation of the left controller 3 indicated by the orientation data Dad using the direction of the gravitational acceleration occurring on the left controller 3 indicated by the gravitational direction data Dae.

Next, the processor 81 calculates the amount of deformation of the ring-shaped extension apparatus 5 (step S504), and proceeds to the next step. For example, the processor 81 calculates the amount and direction of deformation of the ring-shaped portion 201 of the ring-shaped extension apparatus 5 using a strain value indicated by the operation data Daa, and updates the ring deformation amount data Dag with the calculation result.

Next, the processor 81 performs a vertical movement process (step S505), and proceeds to step S506. The vertical movement process performed in step S505 will be described with reference to FIG. 18. Note that second control is a process that is executed on an object based on motion data, and in a non-limiting example, corresponds to the vertical movement process performed the processor 81.

In FIG. 18, the processor 81 calculates a knee bending angle (step S521), and proceeds to the next step. For example, the processor 81 calculates the knee bending angle using the orientation of the left controller 3 calculated in step S503, and updates the knee bending angle data Dah with the calculated knee bending angle. In a non-limiting example, the processor 81 calculates an angle difference between the gravitational acceleration direction and the negative y-axis direction using the orientation of the left controller 3 with reference to the gravitational acceleration indicated by the gravitational direction data Dae, and sets the angle difference as the knee bending angle.

Next, the processor 81 calculates a vertical location of the movement objects corresponding to the knee bending angle calculated in step S521 (step S522), and proceeds to the next step. For example, the processor 81 calculates the vertical location of the movement objects so that the vertical location of the movement objects is an uppermost location of the target object OBJ1 when the knee bending angle is zero degrees, and the vertical location of the movement object becomes gradually closer to a lowermost location of the target object OBJ1 as the bending angle of the user's knee increases.

Next, the processor 81 calculates the location of each of the movement objects OBJ2*a* and OBJ2*b* (step S523), and ends the process of the subroutine. For example, the processor 81 calculates locations on both left and right sides where the movement objects OBJ2*a* and OBJ2*b* are in contact with the outer peripheral side surface of the target object OBJ1 at the vertical locations calculated in step S521, and updates the movement object action data Dak with the locations.

Referring back to FIG. 17, after the vertical movement process in step S505, the processor 81 performs a cutting process (step S506), and proceeds to step S507. The cutting process performed in step S506 will now be described with reference to FIG. 19. Note that first control corresponds to a process that is executed on an object based on strain data, and in a non-limiting example, corresponds to the cutting process performed by the processor 81.

In FIG. 19, the processor 81 calculates a cut amount (step S531), and proceeds to the next step. For example, the processor 81 calculates the cut amount in which the target object OBJ1 is cut by the movement objects OBJ2*a* and OBJ2*b*, based on the amount of deformation calculated in step S504, and updates the cut amount data Dai with the cut amount. In a non-limiting example, the cut amount calculated by the processor 81 increases with an increase in the amount of deformation. Note that the calculated cut amount may increase relatively as the locations of the movement objects OBJ2*a* and OBJ2*b* calculated in step S523 is closer to the center axis of the target object OBJ1. Note that the above technique of deforming the target object OBJ1 is merely illustrative, and the target object OBJ1 may be deformed using other techniques. For example, in the case where the target object OBJ1 is formed of a plastic fluid or an elastic solid, the target object OBJ1 may be deformed by a physical simulation between the target object OBJ1 and the movement objects OBJ2*a* and OBJ2*b*, which are a hard object, using a more complex expression.

Next, the processor 81 moves the movement objects OBJ2*a* and OBJ2*b* rightward and leftward, depending on the cut amount (step S532), and proceeds to the next step. For example, the processor 81 moves the locations of the movement objects OBJ2*a* and OBJ2*b* rightward and leftward toward the center axis of the target object OBJ1 by an amount corresponding to the cut amount, and updates the movement object action data Dak with the locations of the movement objects OBJ2*a* and OBJ2*b* after the movement.

Next, the processor 81 performs a process of deforming the target object OBJ1 (step S533), and ends the process of the subroutine. For example, the processor 81 calculates a shape of the target object OBJ1 that is obtained after a portion of the outer peripheral side surface of the target object OBJ1 indicated by the target object shape data Dam has been cut by the movement objects OBJ2*a* and OBJ2*b* being moved to the locations calculated in step S532 as if the movement objects OBJ2*a* and OBJ2*b* were pushed into the target object OBJ1, and updates the target object shape data Dam with the calculated shape.

Referring back to FIG. 17, after the cutting process in step S506, the processor 81 performs an action control process on the objects (the movement objects OBJ2*a* and OBJ2*b*, etc.), and proceeds to the next step. For example, the processor 81 disposes the movement objects OBJ2*a* and OBJ2*b* in the virtual game space based on the locations, states, orientations, actions, etc., of the movement objects OBJ2*a* and OBJ2*b* indicated by the movement object action data Dak.

Next, the processor 81 determines whether or not to end the process of cutting the target object OBJ1 and thereby changing the shape of the target object OBJ1 (step S508). The condition for ending the cutting process in step S508 is, for example, that a predetermined time limit for changing the shape of the target object OBJ1 has passed, that the user has performed an operation of ending changing of the shape of the target object OBJ1, etc. If the processor 81 determines to end the cutting process, the processor 81 proceeds to step S509. Otherwise, i.e., if the processor 81 does not determine to end the cutting process, the processor 81 proceeds to step S510.

In step S509, the processor 81 performs a determination process, and proceeds to step S510. For example, the processor 81 calculates game points based on a similarity between the shape of the target object OBJ1 indicated by the target object shape data Dam and a shape that is a goal of the game (e.g., the shape of an image displayed as the sample image SP), and updates the score data Daj with the game points.

In step S510, the processor 81 performs an image generation and display control process, and proceeds to the next step. For example, the processor 81 disposes the target object OBJ1 having a shape indicated by the target object shape data Dam in the virtual game space where the movement objects OBJ2*a* and OBJ2*b* are disposed. The processor 81 also disposes a virtual camera in the virtual game space, generates a virtual game space image as viewed from the virtual camera, and outputs the virtual game space image to the stationary monitor 9. The processor 81 also disposes the sample image SP set in step S501 as an appropriate portion of the virtual game space image, and outputs the resultant image to the stationary monitor 9. The processor 81 also causes an image indicating a game score indicated by the score data Daj to overlay an appropriate portion of the virtual game space image, and outputs the resultant image to the stationary monitor 9.

Next, the processor 81 determines whether or not to end the game process (step S511). The condition for ending the game process in step S511 is, for example, that the condition for ending the game process is satisfied, that the user has performed an operation of ending the game process, etc. If the processor 81 does not determine to end the game process, the processor 81 returns to step S502, and repeats the process. If the processor 81 determines to end the game process, the processor 81 ends the process of the flowchart. Thereafter, steps S502-S511 are repeatedly executed until the processor 81 determines, in step S511, to end the game process.

Thus, in the first non-limiting example game, control is performed so that the movement objects OBJ2*a* and OBJ2*b* cuts and deforms the target object OBJ1 according to a pressing operation of deforming the ring-shaped extension apparatus 5, and control is performed so that the movement objects OBJ2*a* and OBJ2*b* are moved vertically according to the motion of the belt-shaped extension apparatus 6 caused by the user bending and extending the knees. Therefore, the variety of user inputs using both the ring-shaped extension apparatus 5 and the belt-shaped extension apparatus 6 can be increased.

(Second Non-Limiting Example Game)

Figure 20:
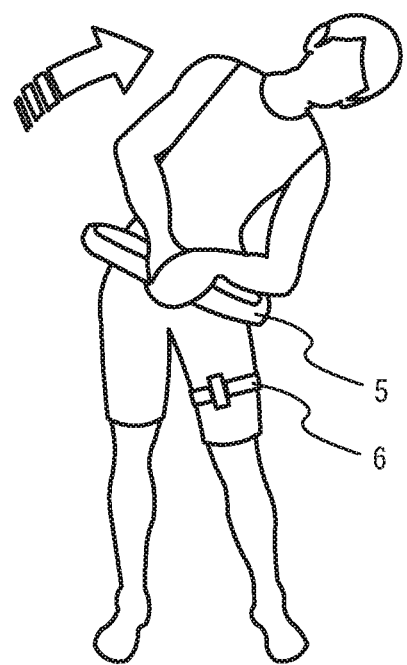
FIG. 20 is a diagram showing a non-limiting example of how, in the second non-limiting example game, the user operates the ring-shaped extension apparatus 5.

Next, before describing a specific process in a second non-limiting example game performed by the main body apparatus 2, the second non-limiting example game performed in the main body apparatus 2 will be outlined with reference to FIGS. 20-23. Note that FIG. 20 is a diagram showing a non-limiting example of how, in the second non-limiting example game, the user operates the ring-shaped extension apparatus 5. FIG. 21 is a diagram showing a first non-limiting example of a game image displayed on the stationary monitor 9 according to the user's operation in the second non-limiting example game. FIG. 22 is a diagram showing a second non-limiting example of a game image displayed on the stationary monitor 9 according to the user's operation in the second non-limiting example game. FIG. 23 is a diagram showing a third non-limiting example of a game image displayed on the stationary monitor 9 according to the user's operation in the second non-limiting example game.

As shown in FIG. 20, in the second non-limiting example game, the user holds one (e.g., the grip cover 203) of the grip covers of the ring-shaped extension apparatus 5, and places the other grip cover (e.g., the grip cover 204) in contact with the user's abdomen. Then, the user performs an operation with the ring-shaped extension apparatus 5 sandwiched between both hands and the abdomen. Specifically, the user performs an operation of tilting the ring-shaped extension apparatus 5 to the left and right while deforming the ring-shaped extension apparatus 5 so that the grip covers 203 and 204 move toward each other in the ring-shaped extension apparatus 5 sandwiched between both hands and the abdomen. Here, in order to tilt the ring-shaped extension apparatus 5 to the left and right with the ring-shaped extension apparatus 5 sandwiched between both hands and the abdomen of the user, the user tilts the upper body to the left and right. Therefore, in the second non-limiting example game, the user is required to perform a gaming operation of tilting the entire body to the left and right while exerting a force so that both hands move toward the abdomen. In the second non-limiting example game, the user also performs an operation of stamping the feet with the belt-shaped extension apparatus 6 fastened to the user's thigh. Specifically, in the second non-limiting example game, while the user is performing an operation of deforming the ring-shaped extension apparatus 5 and an operation of tilting the ring-shaped extension apparatus 5 to the left and right, the user is also performing an action of stamping the feet so that the belt-shaped extension apparatus 6 fastened to the user's thigh is moved.

As described above, in the game system 1 of this non-limiting example, the left controller 3 and the right controller 4 are removable from the main body apparatus 2. In addition, as shown in FIGS. 21-23, when the main body apparatus 2 alone is attached to the cradle 8, an image (and sound) can be output from the stationary monitor 9. The game system 1 will now be described, assuming the situation that the left controller 3 and the right controller 4 are removed from the main body apparatus 2, the main body apparatus 2 alone is attached to the cradle 8, and an image (and sound) is output from the stationary monitor 9 connected to the cradle 8. In a non-limiting example, the user performs a gaming operation using the right controller 4 attached to the ring-shaped extension apparatus 5 and the left controller 3 attached to the belt-shaped extension apparatus 6. In a non-limiting example of a game process in the second non-limiting example game, a process is used in which a player character PC displayed on the stationary monitor 9 walks and moves in the virtual game space, maintaining balance using a balance pole having objects OBJL and OBJR at left and right ends thereof, according to the user's operation. Note that the player character PC corresponds to another example of an object disposed in the virtual space.

For example, in FIG. 21, the player character PC is disposed in the virtual game space. The player character PC stands still, holding the center of the balance pole having the object OBJL at the left end and the object OBJR at the right end. The balance pole can be changed to a shortened state in which the length between the object OBJL at the left end and the object OBJR at the right end is short, and an extended state in which the length between the object OBJL at the left end and the object OBJR at the right end is long. When the ring-shaped portion 201 of the ring-shaped extension apparatus 5 is in the steady state, i.e., is not deformed, as shown in FIG. 21, the balance pole is in the shortened state. Note that the player character PC, when having the balance pole in the extended state, is in an action mode in which the player character PC is allowed to walk and move according to the user's stamping-foot operation, and when having the balance pole in the shortened state, is in an action mode in which the player character PC is not allowed to walk or move even when the user performs a stamping-foot operation. The example of FIG. 21 shows a state in which the user is standing still (the left controller 3 is in a vertical position, i.e., the negative y-axis direction of the left controller 3 points in the vertically downward direction), and is not performing a stamping-foot operation or an operation of tilting the body to the left and right.

Meanwhile, when the user performs an operation of deforming the ring-shaped portion 201 of the ring-shaped extension apparatus 5 from the steady state to at least a predetermined state so that the grip covers 203 and 204 move toward each other as shown in FIG. 22 (a pressing operation for deformation in a B direction shown in FIG. 22), the balance pole is changed to the extended state in which the length between the object OBJL at the left end and the object OBJR at the right end is long, and the player character PC is put into an action mode in which the player character PC is allowed to walk. Such a pressing operation is detected based on a strain detected by the strain gauge provided in the ring-shaped extension apparatus 5. When the ring-shaped portion 201 of the ring-shaped extension apparatus 5 is deformed from the steady state, a strain of the base portion is detected by the strain gauge. Based on the detected strain, a direction in which the ring-shaped portion 201 is deformed (i.e., a direction in which the two grip covers 203 and 204 move away from each other or toward each other) and the amount of deformation can be calculated. If the direction in which the ring-shaped portion 201 is deformed is the direction in which the two grip covers 203 and 204 move toward each other, and the amount of deformation is greater than or equal to a preset threshold, it is determined that a pressing operation for changing the left and right objects OBJL and OBJR to the extended state has been performed. Note that when the pressing operation is removed, the balance pole is changed to the shortened state, and the player character PC is put into an action mode in which the player character PC is not allowed to walk. Note that the example of FIG. 22 shows a state in which the user is standing still (the left controller 3 is in the vertical position, i.e., the negative y-axis direction of the left controller 3 points in the vertically downward direction), and is not performing a stamping-foot operation or an operation of tilting the body to the left and right. Note that whether or not an operation of pressing the ring-shaped extension apparatus 5 has been performed may be determined by methods other than the method of determining whether or not the calculated amount of deformation is greater than or equal to a preset threshold. For example, the presence or absence of the pressing operation may be determined simply based on whether or not a strain has been detected by the strain sensor of the ring-shaped extension apparatus 5, irrespective of the threshold.

When the user performs a stamping-foot action as shown in FIG. 23, the belt-shaped extension apparatus 6 fastened to the user's left thigh is also moved. For example, the left controller 3 attached to the belt-shaped extension apparatus 6 fastened to the front portion of the user's left thigh, is moved according to the user's stamping-foot action so that the left controller 3 is swayed around an axis extending in the lateral horizontal direction of the user perpendicular to the gravitational direction (vertically downward direction) in the real space, between an upright state (the longitudinal direction of the left controller 3 points in the vertically downward direction) and an elevation angle state (the longitudinal direction of the left controller 3 is closer to the front-back horizontal direction of the user than in the upright state) (a sway in an M direction in FIG. 23). In a non-limiting example, in the case where the left controller 3 is attached to the belt-shaped extension apparatus 6 so that the negative y-axis direction of the left controller 3 points in the vertically downward direction of the real space (i.e., the positive y-axis direction of the left controller 3 points in the vertically upward direction in the real space) when the user is standing still with their left foot on a floor, the body of the left controller 3 is moved to rotate around an axis extending in the user's lateral horizontal direction (the x-axis direction of the left controller 3) according to the user's action of raising the left thigh so that the left controller 3 is transitioned from the upright state in which the negative y-axis direction of the left controller 3 points in the vertically downward direction to the elevation angle state in which the negative y-axis direction of the left controller 3 is closer to the horizontal direction than in the upright state.

A method for detecting when the user starts to move (i.e., starts a stamping-foot operation) from a rest state, using the left controller 3 attached to the belt-shaped extension apparatus 6, will be described. In a non-limiting example, if it is determined that the value of an acceleration occurring on the left controller 3 in the vertically upward direction of the real space excluding the gravitational acceleration is greater than or equal to a predetermined threshold, i.e., it is determined that the left controller 3 is accelerated in the vertically upward direction of the real space, or if it is determined that a change in an angle by which the left controller 3 performs the above sway action is greater than or equal to a predetermined threshold, it can be determined that the user has started a stamping-foot action. After the user has started a stamping-foot action, if it is determined that a change in the angle or acceleration of the left controller 3 during a predetermined period of time is smaller than or equal to a predetermined threshold, or if it is determined that an angular velocity change amount or average angular velocity value of the left controller 3 during a predetermined period of time is smaller than or equal to a predetermined threshold, it can be determined that the user has stopped a stamping-foot action.

In order to calculate intervals during the user's stamping-foot action (stamping-foot intervals, i.e., intervals at which the user's left thigh with the belt-shaped extension apparatus 6 fastened thereto is moved up and down), it is necessary to detect the user's action of moving a thigh (e.g. the left thigh) up and down. The determination of upward and downward movements of a thigh for detecting the user's action of moving a thigh up and down may be performed using any suitable technique using at least one of an angular velocity and acceleration occurring on the left controller 3. In a non-limiting example, the determination may be performed using both an angular velocity and acceleration occurring on the left controller 3. Specifically, maximum and minimum values of an angle around the x-axis direction of the left controller 3 during a predetermined period of time (the angle increases with an increase in the knee bending angle) are obtained, and if the time at which the maximum value was obtained is more recent than the time at which the minimum value was obtained, and the acceleration in the vertically downward direction of the left controller 3 is smaller than or equal to a predetermined threshold, i.e., the left controller 3 is being accelerated in the vertically upward direction of the real space, it can be determined that the current state is a thigh raising state. Maximum and minimum values of an angle around the x-axis direction of the left controller 3 during a predetermined period of time are obtained, and if the time at which the minimum value was obtained is more recent than the time at which the maximum value was obtained, and the acceleration in the vertically downward direction of the left controller 3 is greater than or equal to a predetermined threshold, i.e., the left controller 3 is being accelerated in the vertically downward direction of the real space, it can be determined that the current state is a thigh lowering state.

As described above, when it is determined that the user is performing a stamping-foot action, and therefore, the player character PC is in the action mode that the player character PC is allowed to move, the player character PC is displayed that is walking and moving in the virtual game space with an action and velocity corresponding to the user's stamping-foot action. For example, based on the result of the determination of the user's stamping-foot action or the determination of the user's action of moving the thigh up and down, the action of the player character PC may be controlled to change the movement velocity of the player character PC so that the user and the player character PC perform the same motion. Specifically, based on the result of the determination of the user's action of moving the thigh up and down, the player character PC's action of walking or running is controlled so that the player character PC raises the left leg synchronously with the user's action of raising the left leg, and raises the right leg simultaneously with the user's action of raising the right leg, and therefore, unnaturalness (deviation) with respect to the user's operation can be reduced.

When the user performs an operation of tilting the ring-shaped extension apparatus 5 to the left and right (a roll operation of turning the ring-shaped extension apparatus 5 in an N direction shown in FIG. 23) while performing the pressing operation as shown in FIG. 23, the player character PC performs an action of tilting the balance pole in the extended state in a direction corresponding to the roll operation. As used herein, an operation of tilting the ring-shaped extension apparatus 5 to the left refers to an operation of rolling the ring-shaped extension apparatus 5 so that the circular-ring axis of the ring-shaped portion 201 of the ring-shaped extension apparatus 5 is turned around the front-back direction of the user (e.g., around the y-axis direction of the right controller 4) to be tilted to the left while a pressing operation is performed on the ring-shaped portion 201 of the ring-shaped extension apparatus 5 with the circular-ring axis of the ring-shaped portion 201 of the ring-shaped extension apparatus 5 pointing in the vertically downward direction (i.e., in a state in which the ring-shaped portion 201 is in a horizontal position) in the real space.

When a roll operation of tilting the ring-shaped extension apparatus 5 to the left while the pressing operation is being performed, the player character PC tilts the balance pole in the extended state to the left (i.e., a state in which the object OBJL at the left end is lowered and the object OBJR at the right end is raised with respect to the equilibrium state).

When a roll operation of tilting the ring-shaped extension apparatus 5 to the left and right is thus performed, an angular velocity around the front-back direction of the user (e.g., around the y-axis direction of the right controller 4) occurs on the right controller 4 attached to the ring-shaped extension apparatus 5, and the direction of the gravitational acceleration acting on the right controller 4 is changed. Therefore, the operation direction and operation angle, etc., of a roll operation of tilting the ring-shaped extension apparatus 5 to the left and right can be calculated using an acceleration detected by the acceleration sensor 114 of the right controller 4 and/or an angular velocity detected by the angular velocity sensor 115 of the right controller 4. In the second non-limiting example game, when a roll operation of tilting the ring-shaped extension apparatus 5 to the left and right is performed while the pressing operation is being performed, an action of tilting the balance pole in the operation direction by the operation angle is performed. Actually, a roll operation of tilting the ring-shaped extension apparatus 5 to the left and right may be a combination of a roll operation, pitch operation, and yaw operation on the ring-shaped extension apparatus 5. Therefore, a final operation direction and operation angle may be calculated by combining operation directions and operation angles of the ring-shaped extension apparatus 5 that are changed by the roll operation, pitch operation, and yaw operation.

Here, a plurality of obstruction objects H, etc., that obstruct the walk movement of the player character PC are disposed in the virtual game space. The obstruction objects H are disposed on the left and right sides of a path on which the player character PC walks and moves, and may hit the object OBJL at the left end or the object OBJR at the right end, depending on the tilt angle of the balance pole. Specifically, in order to avoid hitting the obstruction objects H, it is necessary to cause the player character PC to walk and move while adjusting the tilt angle of the balance pole so that the object OBJL at the left end and the object OBJR at the right end are prevented from hitting the obstruction objects H. Therefore, the user is required to perform an operation of continuing the walk movement of the player character PC while avoiding hitting the obstruction objects H by performing a roll operation of tilting the ring-shaped extension apparatus 5 to the left and right while causing the player character PC to walk and move by performing a stamping-foot operation using a leg with the belt-shaped extension apparatus 6 fastened thereto while performing an operation of pressing the ring-shaped extension apparatus 5.

Note that a reward object that can give game points may also be disposed on the left and right sides of a path on which the player character PC walks and moves. When the object OBJL at the left end or the object OBJR at the right end hits a reward object, game points set for the reward object can be obtained. Therefore, a lot of game points can be obtained by actively hitting reward objects with the object OBJL at the left end or the object OBJR at the right end. In that case, the user is required to perform an operation of continuing the walk movement of the player character PC while actively trying to hit reward objects by performing a roll operation of tilting the ring-shaped extension apparatus 5 to the left and right while causing the player character PC to walk and move by performing a stamping-foot operation using a leg with the belt-shaped extension apparatus 6 fastened thereto while performing an operation of pressing the ring-shaped extension apparatus 5.

Thus, in the second non-limiting example game, a process of changing the orientation of the player character PC according to the motion of the ring-shaped extension apparatus 5 is performed, and when the player character PC is moving in an orientation that causes the player character PC to hit an obstruction object H, the movement may be obstructed, and the game score is decreased, and when the player character PC is moving in an orientation that causes the player character PC to hit a reward object, the game score may be increased. In other words, in the second non-limiting example game, when the player character PC has a predetermined orientation at a predetermined location in the virtual game space, the user is given an in-game merit. Note that examples of the in-game merit include an increase and decrease in game score, the presence and absence of a movement obstruction, and in addition, an acceleration and deceleration of the movement velocity, an increase and decrease in challenge level of a game, and a success and failure in obtaining a game item. Various merits may be given to the user. Whether or not to give the in-game merits may be determined based on the distance or number of steps from the location of the start instead of the location of the player character PC. Alternatively, whether or not to give the in-game merits may be determined based on data indicating the motion of the ring-shaped extension apparatus 5, i.e., data detected by the inertial sensor of the right controller 4 itself, instead of the orientation of the player character PC.

Note that the player character PC's actions of walking and moving and tilting the balance pole may be allowed only when an operation of pressing the ring-shaped extension apparatus 5 is being performed. In that case, once the operation of pressing the ring-shaped extension apparatus 5 has been removed, then when an operation of pressing the ring-shaped portion 201 of the ring-shaped extension apparatus 5 is performed again, the player character PC's actions of walking and moving and tilting the balance pole are allowed.

The threshold (extension threshold) for determining the amount of deformation of the ring-shaped portion 201 of the ring-shaped extension apparatus 5 in order to determine that the pressing operation has been changed from the ineffective state (the pressing operation is not being performed) to the effective state (the pressing operation is effective), and the threshold (shortening threshold) for determining that the pressing operation has been changed from the effective state (the pressing operation is being performed) to the ineffective state (the pressing operation is ineffective), may be different from each other. For example, the shortening threshold may be smaller than the extension threshold. In that case, even in a state that the force exerted on the pressing operation is reduced due to a roll operation or stamping-foot operation performed on the ring-shaped extension apparatus 5 after the pressing operation, a situation that the balance pole is changed back to the shortened state, so that the player character PC's actions of walking and moving and/or tilting the balance pole are stopped, can be prevented to some extent. Note that the extension threshold corresponds to a non-limiting example of a first threshold, and the shortening threshold corresponds to a non-limiting example of a second threshold.

The user's stamping-foot operation may be determined using not only the motion of the belt-shaped extension apparatus 6 (the left controller 3) but also the motion of the ring-shaped extension apparatus 5 (the right controller 4) or the outputs of other input apparatuses. For example, at least one of determination of start of the user's stamping-foot operation, determination of stopping of the user's stamping-foot operation, and determination of upward and downward movement of the thigh during the user's stamping-foot operation, may be performed using an acceleration and/or angular velocity occurring on the ring-shaped extension apparatus 5 (the right controller 4) as well. The roll operation using the ring-shaped extension apparatus 5 may be determined using not only the output of the motion sensor included in the right controller 4 (the ring-shaped extension apparatus 5) but also the output of the left controller 3 or the outputs of other input apparatuses. The user's stamping-foot operation may be determined using the motion of the ring-shaped extension apparatus 5 (the right controller 4) or the outputs of other input apparatuses, instead of the motion of the belt-shaped extension apparatus 6 (the left controller 3). In the former case, in the second non-limiting example game, a game may be played by a gaming operation using only the belt-shaped extension apparatus 6.

Figure 24:
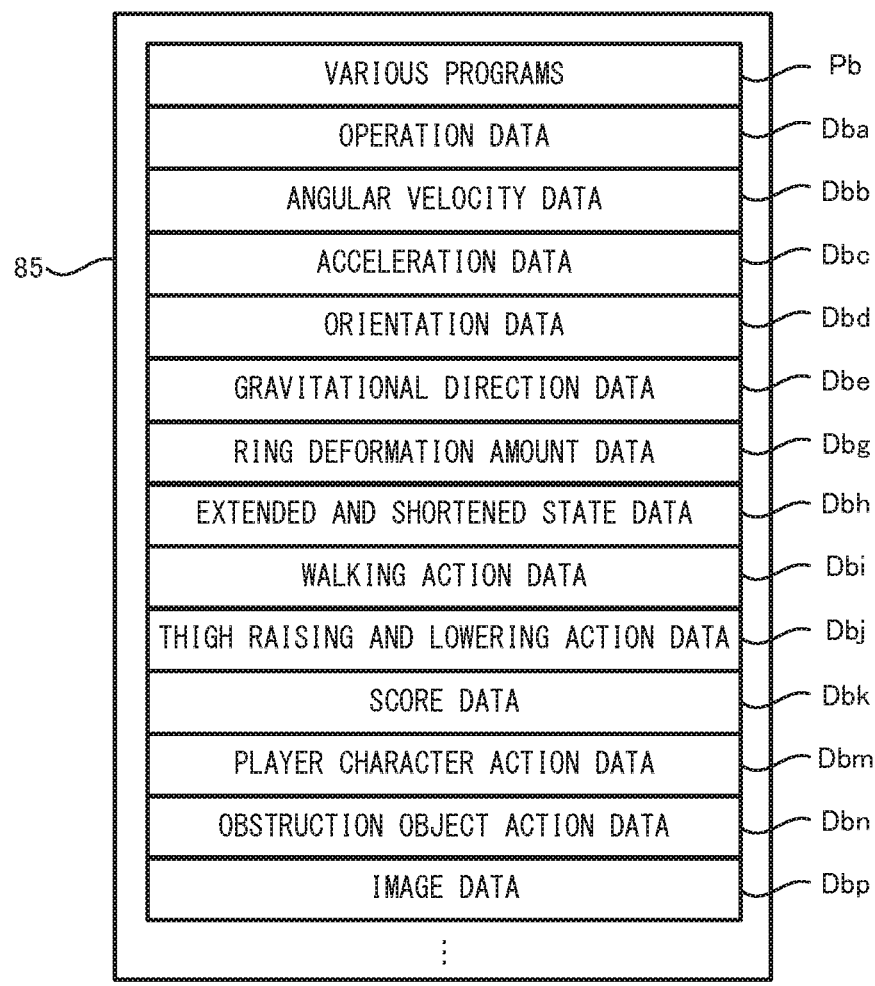
FIG. 24 is a diagram showing a non-limiting example of a data area contained in the DRAM 85 of the main body apparatus 2 in the second non-limiting example game.

Next, a non-limiting example of a specific process that is executed by the game system 1 in the second non-limiting example game will be described with reference to FIGS. 24-28. FIG. 24 is a diagram showing a non-limiting example of a data area contained in the DRAM 85 of the main body apparatus 2 in the second non-limiting example game. Note that in addition to the data of FIG. 24, the DRAM 85 also stores data that is used in other processes, which will not be described in detail.

In the second non-limiting example game, various programs Pb that are executed in the game system 1 are stored in a program storage area of the DRAM 85. In this non-limiting example, the programs Pb include a communication program for performing wireless communication with the right controller 4, an application program (e.g., a game program) for performing information processing based on data obtained from the right controller 4, etc. Note that the programs Pb may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pb stored in the DRAM 85.

In the second non-limiting example game, various kinds of data that are used in processes such as a communication process and an information process that are executed in the game system 1 are stored in a data storage area of the DRAM 85. In this non-limiting example, the DRAM 85 stores operation data Dba, angular velocity data Dbb, acceleration data Dbc, orientation data Dbd, gravitational direction data Dbe, ring deformation amount data Dbg, extended and shortened state data Dbh, walking action data Dbi, thigh raising/lowering action data Dbj, score data Dbk, player character action data Dbm, obstruction object action data Dbn, and image data Dbp, etc.

The operation data Dba is obtained from each of the left controller 3 and the right controller 4 as appropriate. As described above, the operation data transmitted from the left controller 3 and the right controller 4 includes information about an input from each input section (specifically, each button, an analog stick, or each sensor) (specifically, information about an operation, and the result of detection by each sensor), and a strain value indicating a state of deformation of the ring-shaped portion 201 of the ring-shaped extension apparatus 5. In this non-limiting example, operation data is transmitted from each of the left controller 3 and the right controller 4 at predetermined time intervals through wireless communication. The received operation data is used to update the operation data Dba as appropriate. Note that the operation data Dba may be updated for each frame that is the cycle of a process executed in the game system 1, or may be updated each time operation data is received through the wireless communication.

The angular velocity data Dbb indicates the history of angular velocities occurring on each of the left controller 3 and the right controller 4 that have been obtained during a period of time from the current time to a predetermined time before. The angular velocities are included in the operation data obtained from the left controller 3 and the right controller 4. For example, the angular velocity data Dbb includes the history of data indicating angular velocities about the x-, y-, and z-axes occurring on each of the left controller 3 and the right controller 4, etc.

The acceleration data Dbc indicates the history of accelerations occurring on each of the left controller 3 and the right controller 4 that have been obtained during a period of time from the current time to a predetermined time before. The accelerations are included in the operation data obtained from the left controller 3 and the right controller 4. For example, the acceleration data Dbc includes the history of data indicating accelerations in the x-, y-, and z-axis directions occurring on each of the left controller 3 and the right controller 4, etc.

The orientation data Dbd indicates an orientation of each of the left controller 3 and the right controller 4 in the real space, and indicates the history of orientations thereof that have been obtained during a period of time from the current time to a predetermined time before. In a non-limiting example, the orientation data Dbd indicates the history of the x-, y-, and z-axis directions (e.g., angles with respect to X, Y, and Z axes in the real space) of each of the left controller 3 and the right controller 4 in the real space.

The gravitational direction data Dbe indicates the direction of a gravitational acceleration acting on each of the left controller 3 and the right controller 4.

The ring deformation amount data Dbg indicates the direction and amount of deformation of the ring-shaped extension apparatus 5.

The extended and shortened state data Dbh indicates a state (e.g., the extended state or shortened state) of the balance pole. The walking action data Dbi indicates a walk state (e.g., the rest state or walking state) of the player character PC. The thigh raising/lowering action data Dbj indicates the times that the thigh is raised and lowered in the user's stamping-foot operation.

The score data Dbk indicates the current game score.

The player character action data Dbm indicates the location, state, orientation, action, etc., of the player character PC disposed in the virtual game space. The obstruction object action data Dbn indicates the location, state, orientation, action, etc., of an obstruction object H disposed in the virtual game space.

The image data Dbp is for displaying an image (e.g., an image of the player character PC, an image of the balance pole, an image of an obstruction object H, a field image, a background image, etc.) on a display screen.

Figure 26:
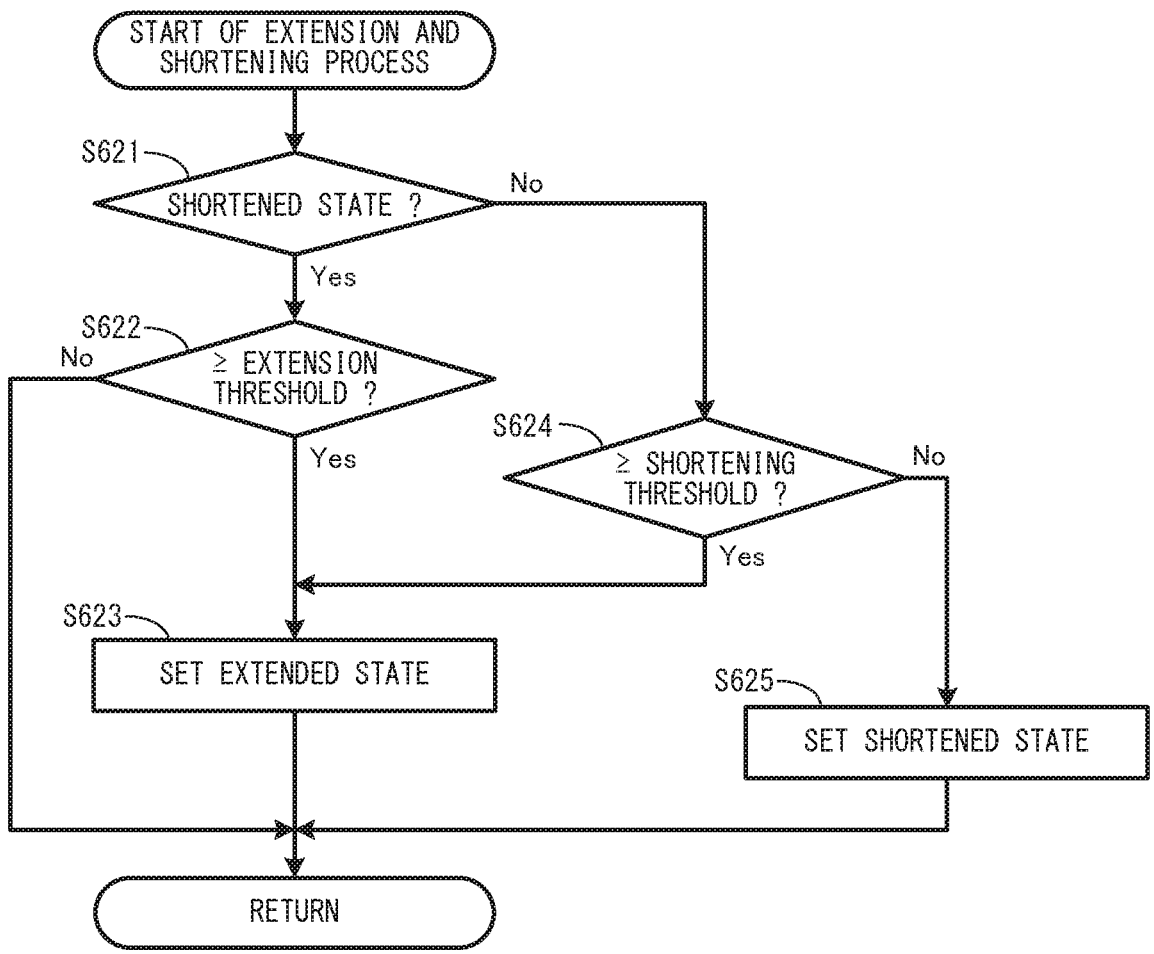
FIG. 26 is a subroutine showing a specific non-limiting example of an extension and shortening process that is performed in step S605 shown in FIG. 25.
Figure 27:
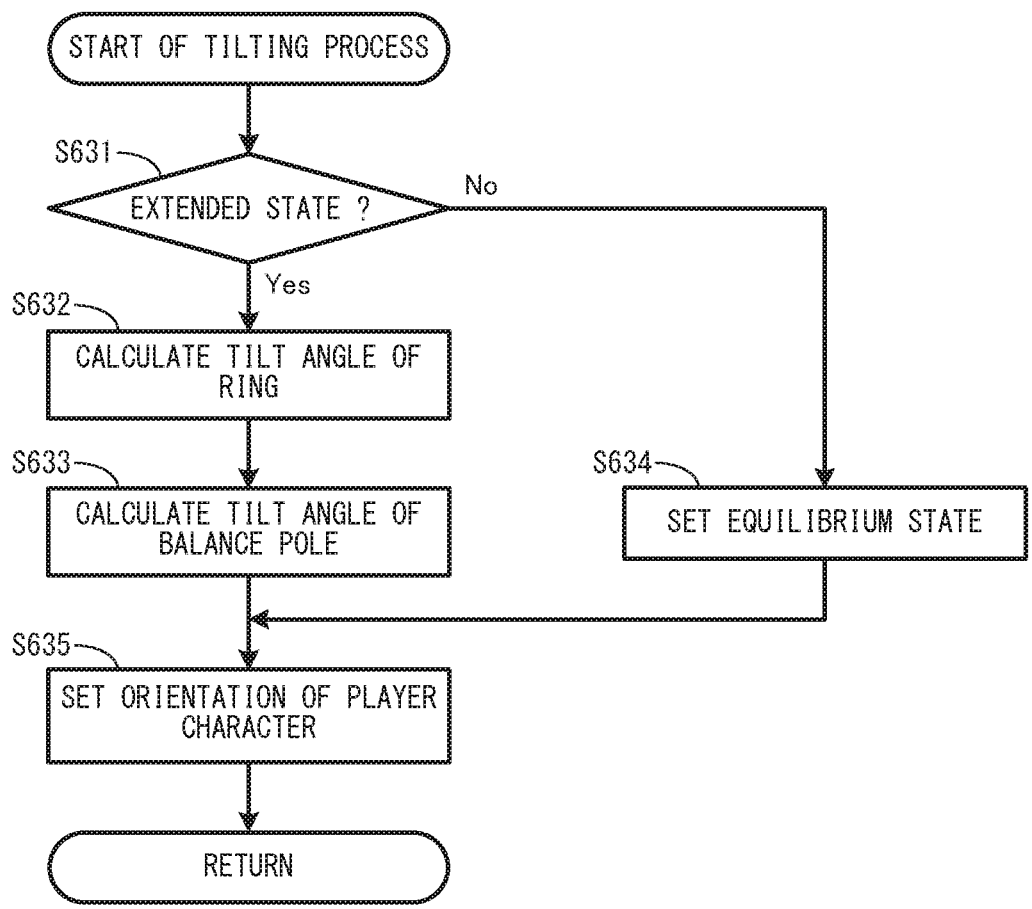
FIG. 27 is a subroutine of a specific non-limiting example of a tilting process that is performed in step S606 shown in FIG. 25.
Figure 28:
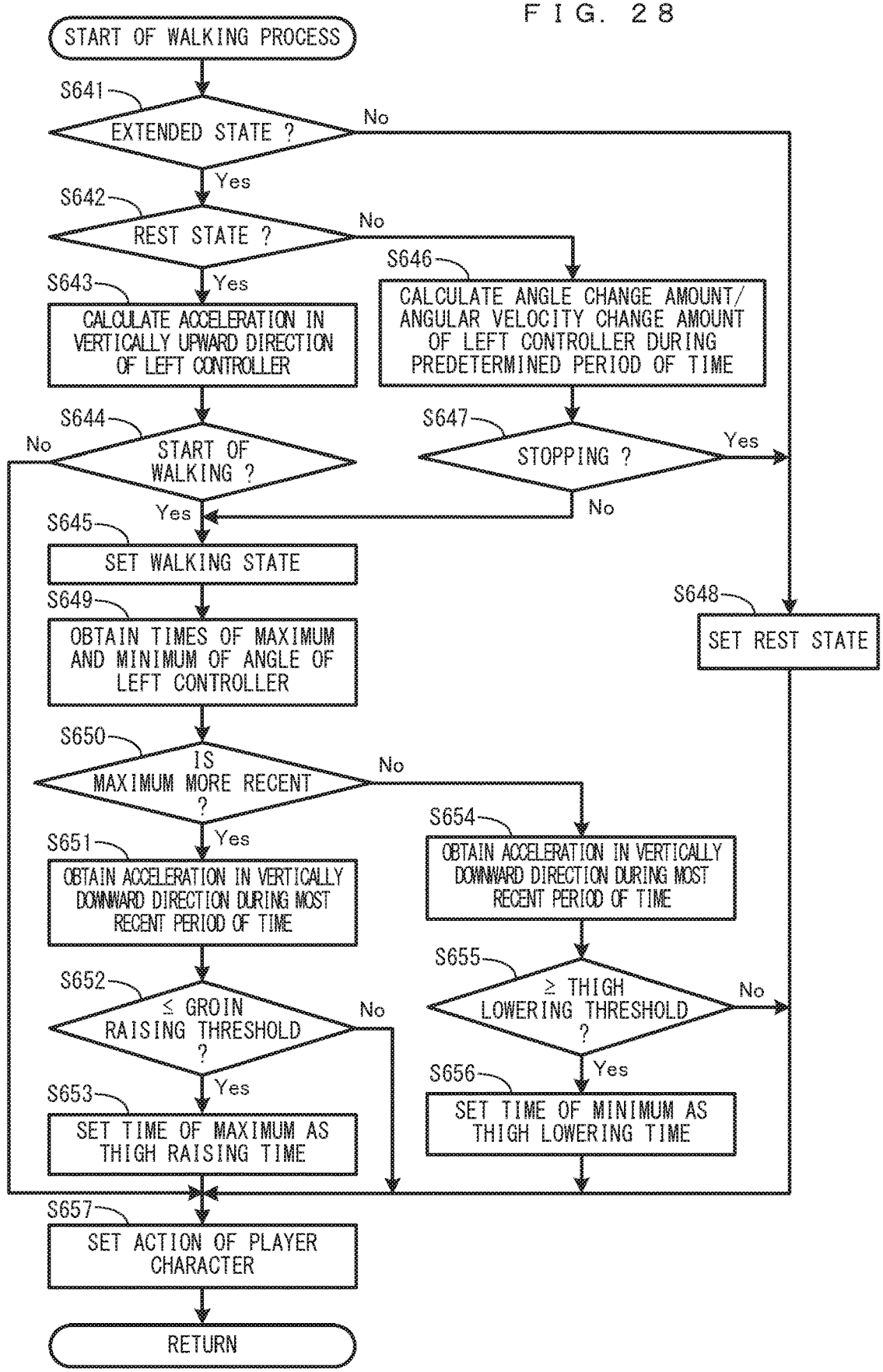
FIG. 28 is a subroutine of a specific non-limiting example of a walking process that is performed in step S607 shown in FIG. 25.

Next, a specific non-limiting example of an information process in the second non-limiting example game will be described with reference to FIGS. 25-28. FIG. 25 is a flowchart showing a non-limiting example of an information process that is executed by the game system 1 in the second non-limiting example game. FIG. 26 is a subroutine showing a specific non-limiting example of an extension and shortening process that is performed in step S605 shown in FIG. 25. FIG. 27 is a subroutine of a specific non-limiting example of a tilting process that is performed in step S606 shown in FIG. 25. FIG. 28 is a subroutine of a specific non-limiting example of a walking process that is performed in step S607 shown in FIG. 25. In the second non-limiting example game, a series of processes shown in FIGS. 25-28 are performed by the processor 81 executing a communication program and a predetermined application program (game program) included in the programs Pb. The information process of FIGS. 25-28 is started with any suitable timing.

Note that the steps in the flowchart of FIGS. 25-28, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 25-28 may be executed by a plurality of information processing apparatuses including the main body apparatus 2 cooperating with each other.

In FIG. 25, the processor 81 performs initial setting for the information process (step S601), and proceeds to the next step. For example, in the initial setting, the processor 81 initializes parameters for performing processes to be described below. For example, the processor 81 initially disposes, in the virtual game space, objects (including the player character PC holding the balance pole) to generate an initial state of the virtual game space, and updates the extended and shortened state data Dbh, the walking action data Dbi, the player character action data Dbm, and the obstruction object action data Dbn with the location, direction, state, and orientation, etc., of each object. Note that the processor 81 initially sets the state of the player character PC to a rest state in which the player character PC holds the balance pole in the shortened state.

Next, the processor 81 obtains operation data from each of the left controller 3 and the right controller 4 and updates the operation data Dba (step S602), and proceeds to the next step. Note that the processor 81 stores data indicating an angular velocity occurring on each of the left controller 3 and the right controller 4, which is included in the operation data obtained from each of the left controller 3 and the right controller 4 in step S602, into the angular velocity data Dbb. The processor 81 also stores data indicating an acceleration occurring on each of the left controller 3 and the right controller 4, which is included in the operation data obtained from each of the left controller 3 and the right controller 4 in step S602, into the acceleration data Dbc.

Next, the processor 81 calculates the orientation of each of the left controller 3 and the right controller 4 (step S603), and proceeds to the next step. For example, the processor 81 obtains the angular velocities about the x-, y-, and z-axes of each of the left controller 3 and the right controller 4 using angular velocity data stored in the angular velocity data Dbb. Thereafter, the processor 81 turns the x-, y-, and z-axes with reference to the gravitational acceleration direction of the orientation of each of the left controller 3 and the right controller 4 indicated by the orientation data Dbd, based on the respective angular velocities obtained, and stores the directions of the turned x-, y-, and z-axes with reference to the gravitational acceleration direction, as most recent data indicating the orientation of each of the left controller 3 and the right controller 4, into the orientation data Dbd. The processor 81 also calculates the direction of the gravitational acceleration acting on each of the left controller 3 and the right controller 4 using acceleration data stored in the acceleration data Dbc, and stores the calculated directions into the gravitational direction data Dbe. Note that the gravitational acceleration may be extracted using any suitable technique. For example, an acceleration component averagely occurring on each of the left controller 3 and the right controller 4 may be calculated and extracted as the gravitational acceleration. The processor 81 may also corrects, as appropriate, the most recent orientation of each of the left controller 3 and the right controller 3 indicated by the orientation data Dbd using the direction of the gravitational acceleration occurring on each of the left controller 3 and the right controller 4 indicated by the gravitational direction data Dbe.

Next, the processor 81 calculates the amount of deformation of the ring-shaped extension apparatus 5 (step S604), and proceeds to the next step. For example, the processor 81 calculates the amount and direction of deformation of the ring-shaped portion 201 of the ring-shaped extension apparatus 5 using a strain value indicated by the operation data Dba, and updates the ring deformation amount data Dbg with the calculation result.

Next, the processor 81 performs an extension and shortening process (step S605), and proceeds to step S606. The extension and shortening process performed in step S605 will now be described with reference to FIG. 26. Note that first control corresponds to a process that is executed on an object based on strain data, and in another non-limiting example, corresponds to the extension and shortening process performed by the processor 81.

In FIG. 26, the processor 81 determines whether or not the balance pole is in the shortened state (step S521). For example, the processor 81 determines, with reference to the extended and shortened state data Dbh, whether or not the balance pole is in the shortened state. If the balance pole is in the shortened state, the processor 81 proceeds to step S622. Otherwise, i.e., if the balance pole is in the extended state, the processor 81 proceeds to step S624.

In step S622, the processor 81 determines whether or not the amount of deformation calculated in step S604 is greater than or equal to an extension threshold. If the amount of deformation is greater than or equal to the extension threshold, the processor 81 proceeds to step S623. Otherwise, i.e., if the amount of deformation is smaller than the extension threshold, the processor 81 ends the process of the subroutine. Here, the extension threshold is used to determine the amount of deformation of the ring-shaped extension apparatus 5 in order to detect when a pressing operation performed on the ring-shaped extension apparatus 5 is started. If the amount of deformation of the ring-shaped extension apparatus 5 has reached the extension threshold or higher, it is determined that the pressing operation has been started.

In step S623, the processor 81 sets the state of the balance pole to the extended state, and ends the process of the subroutine. For example, the processor 81 sets the state of the balance pole to the extended state to update the extended and shortened state data Dbh.

Meanwhile, if it is determined in step S621 that the balance pole is in the extended state, the processor 81 determines whether or not the amount of deformation calculated in step S604 is greater than or equal to a shortening threshold. If the amount of deformation is greater than or equal to the shortening threshold, the processor 81 proceeds to step S623. Otherwise, i.e., if the amount of deformation is smaller than the shortening threshold, the processor 81 proceeds to step S625. Here, the shortening threshold is used for determining that the pressing operation is continued even when the pressing force exerted on the ring-shaped extension apparatus 5 is reduced after the start of the pressing operation performed on the ring-shaped extension apparatus 5, and therefore, is set to a value smaller than the extension threshold.

In step S625, the processor 81 sets the state of the balance pole to the shortened state, and ends the process of the subroutine. For example, the processor 81 sets the state of the balance pole to the shortened state to update the extended and shortened state data Dbh.

Referring back to FIG. 25, after the extension and shortening process in step S605, the processor 81 performs a tilting process (step S606), and proceeds to step S607. The tilting process performed in step S606 will now be described with reference to FIG. 27. Note that third control corresponds to a process of changing the orientation of an object based on motion data output from the first input apparatus, and in a non-limiting example, corresponds to the tilting process performed by the processor 81.

In FIG. 27, the processor 81 determines whether or not the balance pole is in the extended state (step S631). For example, the processor 81 determines, with reference to the extended and shortened state data Dbh, whether or not the balance pole is in the extended state. If the balance pole is in the extended state, the processor 81 proceeds to step S632. Otherwise, i.e., if the balance pole is in the shortened state, the processor 81 proceeds to step S634.

In step S632, the processor 81 calculates a tilt angle (operation angle) of the ring-shaped extension apparatus 5 in the real space, and proceeds to the next step. For example, the processor 81 calculates an operation direction and operation angle of a roll operation of tilting the ring-shaped extension apparatus 5 with respect to the direction of the gravitational acceleration (e.g., an angle difference between the direction of the gravitational acceleration and the x-axis direction or z-axis direction) using the orientation of the right controller 4 indicated by the orientation data Dbd.

Next, the processor 81 calculates the tilt angle of the balance pole (step S633), and proceeds to step S635. For example, the processor 81 calculates the tilt angle of the balance pole corresponding to the operation direction and operation angle of a roll operation performed on the ring-shaped extension apparatus 5 calculated in step S632 (e.g., the tilt angle by which the balance pole is tilted in the same direction as the operation direction of a roll operation performed on the ring-shaped extension apparatus 5 and at the same angle as the operation angle of the roll operation), and updates the player character action data Dbm with the tilt angle of the balance pole.

Meanwhile, if it is determined in step S631 that the balance pole is in the shortened state, the processor 81 sets the balance pole to the equilibrium state, and proceeds to step S635. For example, the processor 81 updates the player character action data Dbm with the set equilibrium state of the balance pole.

In step S635, the processor 81 sets the orientation of the player character PC, and ends the process of the subroutine. For example, the processor 81 sets the orientation of the player character PC based on the state (tilt angle) of the balance pole set in step S633 or S634, and updates the player character action data Dbm with the set orientation.

Referring back to FIG. 25, after the tilting process in step S606, the processor 81 performs a walking process (step S607), and proceeds to step S608. The walking process performed in step S607 will now be described with reference to FIG. 28. Note that second control is a process that is executed on an object based on motion data, and in another non-limiting example, corresponds to the walking process performed by the processor 81.

In FIG. 28, the processor 81 determines whether or not the balance pole is in the extended state (step S641). For example, the processor 81 determines, with reference to the extended and shortened state data Dbh, whether or not the balance pole is in the extended state. If the balance pole is in the extended state, the processor 81 proceeds to step S642. Otherwise, i.e., if the balance pole is in the shortened state, the processor 81 proceeds to step S648.

In step S642, the processor 81 determines whether or not the player character PC is in the rest state. For example, if the state indicated by the walking action data Dbi is the rest state, the result of determination in step S642 by the processor 81 is positive. If the player character PC is in the rest state, the processor 81 proceeds to step S643. If the player character PC is in the walking state, the processor 81 proceeds to step S646.

In step S643, the processor 81 calculates an acceleration occurring on the left controller 3 in the vertically upward direction of the real space excluding the gravitational acceleration, and proceeds to the next step. For example, the processor 81 obtains an acceleration occurring on the left controller 3 in the vertically upward direction of the real space (an acceleration in an opposite direction from the gravitational acceleration) using the acceleration data Dbc and the gravitational direction data Dbe, and subtracts the gravitational acceleration from the acceleration in the vertically upward direction.

Next, the processor 81 determines whether or not the user has performed an action of starting to walk (starting a stamping-foot operation) (step S644). For example, if the acceleration of the left controller 3 in the vertically upward direction that has been calculated in step S643 is greater than or equal to a predetermined threshold indicating the start of walking, the result of determination in step S644 by the processor 81 is positive. If the user has performed an action of starting to walk (starting a stamping-foot operation), the processor 81 proceeds to step S645. Otherwise, i.e., if the user has not performed an action of starting to walk (starting a stamping-foot operation), the processor 81 proceeds to step S657.

In step S645, the processor 81 sets the player character PC to the walking state, and proceeds to step S649. For example, the processor 81 sets the state indicated by the walking action data Dbi to the walking state to update the walking action data Dbi.

Meanwhile, if the processor 81 determines in step S642 that the player character PC is in the walking state, the processor 81 calculates an angle change amount and/or angular velocity change amount of the left controller 3 during a most recent predetermined period of time (step S646), and proceeds to the next step. For example, the processor 81 obtains angular velocities occurring on the left controller 3 during a most recent predetermined period of time using the angular velocity data Dbb, and calculates, using the angular velocities, the angle change amount of the left controller 3 during that predetermined period of time and/or the angular velocity change amount of the left controller 3 during that predetermined period of time.

Next, the processor 81 determines whether or not the user has performed an action of stopping the stamping-foot operation (step S647). For example, if the angle change amount calculated in step S646 is smaller than or equal to a predetermined threshold indicating stopping of a stamping-foot action, and/or if the angular velocity displace amount calculated in step S646 is smaller than or equal to a predetermined threshold indicating stopping of a stamping-foot action, the result of determination in step S647 by the processor 81 is positive. If the user has performed an action of stopping the stamping-foot operation, the processor 81 proceeds to step S648. Otherwise, i.e., if the user has not performed an action of stopping the stamping-foot operation, the processor 81 proceeds to step S645.

In step S648, the processor 81 sets the player character PC to the rest state, and proceeds to step S657. For example, the processor 81 sets the state indicated by the walking action data Dbi to the rest state to update the walking action data Dbi. Note that if it is determined in step S641 that the balance pole is in the shortened state as described above, or if the balance pole is in the shortened state as a result of step S648 as described above, the player character PC is set to the rest state, so that the player character PC is set to an action mode in which the player character PC is not allowed to move.

If the player character PC is in the walking state, the user's stamping-foot state is determined. After step S645, the processor 81 obtains a maximum value and minimum value of an angle of the left controller 3 in the front-back direction (e.g., around the x-axis direction) having occurred during a most recent predetermined period of time (step S649), and proceeds to the next step. For example, the processor 81 obtains an angular velocity of the left controller 3 in the user's front-back direction (e.g., around the x-axis direction) having occurred during a most recent predetermined period of time using the angular velocity data Dbb, and obtains a maximum value and minimum value of an angle in the front-back direction (the angle increases with an increase in the knee bending angle) calculated from the angular velocity.

Next, the processor 81 determines whether or not the time that the maximum value was obtained in step S649 is more recent than the time that the minimum value was obtained in step S649 (step S650). If the time that the maximum value was obtained is more recent, the processor 81 proceeds to step S651. Otherwise, i.e., if the time that the minimum value was obtained is more recent, the processor 81 proceeds to step S654.

In step S651, the processor 81 obtains an acceleration of the left controller 3 in the vertically downward direction having occurred during a most recent predetermined period of time, and proceeds to the next step. For example, the processor 81 obtains an acceleration of the left controller 3 in the vertically downward direction having occurred during a most recent predetermined period of time using the acceleration data Dbc.

Next, the processor 81 determines whether or not the acceleration obtained in step S651 is smaller than or equal to a thigh raising threshold for determining that the direction of an acceleration is the vertically upward direction of the real space (step S652). If the acceleration obtained in step S651 is smaller than or equal to the thigh raising threshold, the processor 81 determines that the left controller 3 is being accelerated in the vertically upward direction of the real space, and proceeds to step S653. Otherwise, i.e., if the acceleration obtained in step S651 is greater than the thigh raising threshold, the processor 81 determines that the left controller 3 is not being accelerated in the vertically upward direction of the real space, and proceeds to step S657.

In step S653, the processor 81 sets the time that the maximum value of the angle of the left controller 3 in the front-back direction (e.g., around the x-axis direction) was obtained, as a thigh raising time, and proceeds to step S657. For example, the processor 81 sets the time that the maximum value obtained in step S649 was obtained, as a thigh raising time, and if that thigh raising time is a most recent thigh raising time, updates the thigh raising/thigh lowering action data Dbn with that thigh raising time.

Meanwhile, in step S654, the processor 81 obtains an acceleration of the left controller 3 in the vertically downward direction having occurred during a most recent predetermined period of time, and proceeds to the next step. For example, the processor 81 obtains an acceleration of the left controller 3 in the vertically downward direction having occurred during a most recent predetermined period of time using the acceleration data Dbc.

Next, the processor 81 determines whether or not the acceleration obtained in step S654 is greater than or equal to a thigh lowering threshold for determining that the direction of an acceleration is the vertically downward direction of the real space (step S655). If the acceleration obtained in step S654 is greater than or equal to the thigh lowering threshold, the processor 81 determines that the left controller 3 is being accelerated in the vertically downward direction of the real space, and proceeds to step S656. Otherwise, i.e., if the acceleration obtained in step S654 is smaller than the thigh lowering threshold, the processor 81 determines that the left controller 3 is not being accelerated in the vertically downward direction of the real space, and proceeds to step S657.

In step S656, the processor 81 sets the time that the minimum value of the angle of the left controller 3 in the front-back direction (e.g., around the x-axis direction) as a thigh lowering time, and proceeds to step S657. For example, the processor 81 sets the time that the minimum value obtained in step S649 was obtained, as a thigh raising time, and if that thigh lowering time is a most recent thigh lowering time, updates the thigh raising/thigh lowering action data Dbn using that thigh lowering time.

In step S657, the processor 81 sets a walking action of the player character PC, and ends the process of the subroutine. For example, the processor 81 sets the player character PC to the walking state or rest state based on the state indicated by the walking action data Dbi to update the player character action data Dbm. If the player character PC is in the walking state, the processor 81 sets a state of the legs of the player character PC walking at the current time, based on the timing of the thigh raising time and thigh lowering time indicated by the thigh raising/thigh lowering action data Dbn, to update the player character action data Dbm.

Referring back to FIG. 25, after the walking process in step S607, the processor 81 performs an action control process on the player character PC (step S608), and proceeds to the next step. For example, the processor 81 disposes the player character PC in the virtual game space based on the locations, states, orientations, actions, etc., of the player character PC and the balance pole indicated by the player character action data Dbm.

Next, the processor 81 performs an action control process on an object (step S609), and proceeds to the next step. For example, if an obstruction object H has been hit by the balance pole, based on the location of the obstruction object H indicated by the obstruction object action data Dbp and the location of the balance pole (the object OBJL at the left end and the object OBJR at the right end) indicated by the player character action data Dbm, the processor 81 updates the obstruction object action data Dbp so as to display a scene that the obstruction object H performs an attack and disappears in the virtual game space, and changes a game score based on the attack to update the score data Dbk. The processor 81 also causes an obstruction object H to appear in the virtual game space, according to a predetermined algorithm (appearance pattern), and updates the obstruction object action data Dbp with the location of the obstruction object H after the appearance. The processor 81 disposes the obstruction object H in the virtual game space based on the location, state, orientation, action, etc., of the obstruction object H indicated by the obstruction object action data Dbp.

Next, the processor 81 performs an image generation and display control process (step S610), and proceeds to the next step. For example, the processor 81 disposes a virtual camera in the virtual game space in which the player character PC and the obstruction object H, etc., have been disposed in steps S608 and S609, generates an image of the virtual game space as viewed from the virtual camera, and outputs the virtual game space image to the stationary monitor 9. The processor 81 also causes an image indicating the game score indicated by the score data Dbk to overlay the virtual game space image at an appropriate position, and outputs the resultant image to the stationary monitor 9.

Next, the processor 81 determines whether or not to end the game process (step S611). The condition for ending the game process in step S611 is, for example, that the condition for ending the game process is satisfied, that the user has performed an operation of ending the game process, etc. If the processor 81 does not determine to end the game process, the processor 81 returns to step S602, and repeats the process. If the processor 81 determines to end the game process, the processor 81 ends the process of the flowchart. Thereafter, steps S602-S611 are repeatedly executed until the processor 81 determines, in step S611, to end the game process.

Thus, in the second non-limiting example game, the control of switching between the action mode in which the player character PC is allowed to move according to a pressing operation of deforming the ring-shaped extension apparatus 5, and the action mode in which the player character PC is not allowed to move, the control of changing the state of the balance pole, and the control of causing the player character PC to walk and move according to the motion of the belt-shaped extension apparatus 6 caused by a stamping-foot action, are performed. Therefore, the variety of user inputs using both of the ring-shaped extension apparatus 5 and the belt-shaped extension apparatus 6 can be increased.

(Third Non-Limiting Game Example)

Figure 29:
FIG. 29 is a diagram showing a non-limiting example of how, in a third non-limiting example game, the user operates the ring-shaped extension apparatus 5.

Next, before describing a specific process in a third non-limiting example game performed by the main body apparatus 2, the third non-limiting example game performed in the main body apparatus 2 will be outlined with reference to FIGS. 29-32. Note that FIG. 29 is a diagram showing a non-limiting example of how, in the third non-limiting example game, the user operates the ring-shaped extension apparatus 5. FIG. 30 is a diagram showing a first non-limiting example of a game image displayed on the stationary monitor 9 according to the user's operation in the third non-limiting example game. FIG. 31 is a diagram showing a second non-limiting example of a game image displayed on the stationary monitor 9 according to the user's operation in the third non-limiting example game. FIG. 32 is a diagram showing a third non-limiting example of a game image displayed on the stationary monitor 9 according to the user's operation in the third non-limiting example game.

As shown in FIG. 29, in the third non-limiting example game, the user holds one (e.g., the grip cover 203) of the grip covers of the ring-shaped extension apparatus 5 with both hands, and places the other grip cover (e.g., the grip cover 204) in contact with the user's abdomen. Then, the user performs an operation with the ring-shaped extension apparatus 5 sandwiched between both hands and the abdomen. Specifically, the user performs an operation of moving the ring-shaped extension apparatus 5 to the left and right, i.e., swinging the ring-shaped extension apparatus 5 from side to side, while deforming the ring-shaped extension apparatus 5 so that the grip covers 203 and 204 move toward each other in the ring-shaped extension apparatus 5 sandwiched between both hands and the abdomen. Here, in order to swing, to the left and right, the ring-shaped extension apparatus 5 with the ring-shaped extension apparatus 5 sandwiched between both hands and the abdomen of the user, the user turns the entire abdomen, i.e., the user's waist, to the left and right. Therefore, in the third non-limiting example game, the user is required to perform a gaming operation of twisting the waist while exerting a force so that both hands approach the abdomen.

As described above, in the game system 1 of this non-limiting example, the left controller 3 and the right controller 4 are removable from the main body apparatus 2. In addition, as shown in FIGS. 30-32, when the main body apparatus 2 alone is attached to the cradle 8, an image (and sound) can be output from the stationary monitor 9. The game system 1 will now be described, assuming the situation that the left controller 3 and the right controller 4 are removed from the main body apparatus 2, the main body apparatus 2 alone is attached to the cradle 8, and an image (and sound) is output from the stationary monitor 9 connected to the cradle 8. In a non-limiting example, the user performs a gaming operation using the right controller 4 attached to the ring-shaped extension apparatus 5. In a non-limiting example of a game process in the third non-limiting example game, a process is used in which a player character PC displayed on the stationary monitor 9 moves a left object OBJL and a right object OBJR according to the user's operation to knock down (attack) a target object T in a virtual game space.

For example, in FIG. 30, the player character PC is disposed in the virtual game space. The player character PC is equipped with the object OBJL on the left side thereof and the object OBJR on the right side thereof. The left and right objects OBJL and OBJR are changeable between an open state in which the player character PC can knock down a target object T and a closed state in which the player character PC cannot knock down a target object T. As shown in FIG. 30, when the ring-shaped portion 201 of the ring-shaped extension apparatus 5 is in the steady state that the ring-shaped portion 201 is not deformed, the left and right objects OBJL and OBJR are in the closed state.

Meanwhile, as shown in FIG. 31, when an operation of deforming the ring-shaped extension apparatus 5 so that the grip covers 203 and 204 are moved toward each other and thereby the ring-shaped portion 201 is changed from the steady state to at least a predetermined state (a pressing operation to deform the ring-shaped extension apparatus 5 in a B direction shown in FIG. 14) is performed, the left and right objects OBJL and OBJR are moved to the left and right of the player character PC to be open to the left and right, respectively, i.e., is changed to the open state that allows the player character PC to knock down a target object T. Such a pressing operation is detected based on a strain detected by the strain gauge provided in the ring-shaped extension apparatus 5. When the ring-shaped portion 201 of the ring-shaped extension apparatus 5 is deformed from the steady state, a strain of the base portion is detected by the strain gauge. Based on the detected strain, a direction in which the ring-shaped portion 201 is deformed (i.e., a direction in which the two grip covers 203 and 204 move away from each other or toward each other) and the amount of deformation can be calculated. If the direction in which the ring-shaped portion 201 is deformed is the direction in which the two grip covers 203 and 204 move toward each other, and the amount of deformation is greater than or equal to a preset threshold, it is determined that a pressing operation for obtaining the state that the left and right objects OBJL and OBJR are open has been performed. Note that when the pressing operation is stopped, the left and right objects OBJL and OBJR are moved backward relative to the player character PC to be closed, i.e., the left and right objects OBJL and OBJR are changed to the closed state that the player character PC cannot knock down a target object T. In this case, game points that could be obtained by knock downing a target object T cannot be obtained, and the degree of game achievement cannot be updated. Therefore, in a non-limiting example, when the left and right objects OBJL and OBJR are in the closed state, the user may be prompted to perform an operation of deforming the ring-shaped extension apparatus 5, by providing to the user a predetermined image or sound (e.g., a text image "press the ring-shaped extension apparatus 5" or a voice "press the ring-shaped extension apparatus 5"). In another non-limiting example, when the left and right objects OBJL and OBJR are in the closed state, then even if an operation of swinging the ring-shaped extension apparatus 5 to the left and right is performed, a scene may be created and displayed that the left and right objects OBJL and OBJR miss a target object T and therefore do not knock down the target object T, and thereby the user may be prompted to perform an operation of deforming the ring-shaped extension apparatus 5.

As shown in FIG. 32, a plurality of target objects T (in FIG. 32, target objects T1 and T2) to be attacked by the player character PC approach the player character PC from the front of the player character PC. The player character PC can strike a target object T with one of the left and right objects OBJL and OBJR to attack, i.e., knock down and eliminate, the target object T. By knocking down a target object T, the user can obtain a predetermined number of game points.

For example, as shown in FIG. 32, when an operation of swinging the ring-shaped extension apparatus 5 to the right while performing the above pressing operation is performed, the player character PC performs an action of turning both of the left and right objects OBJL and OBJR so that the left object OBJL in the open state is turned toward the front while the right object OBJR is turned toward the back. Here, the operation of swinging the ring-shaped extension apparatus 5 to the right is such that in the real space, while the pressing operation is performed with a circular-ring axis of the ring-shaped portion 201 of the ring-shaped extension apparatus 5 pointing in a vertically downward direction, i.e., in the vertical position (i.e., the ring-shaped portion 201 is horizontally disposed, i.e., in the horizontal position), the ring-shaped extension apparatus 5 is turned around the circular-ring axis to the right (a C direction in FIG. 15) with the circular-ring axis maintained in the vertical position and moving to the right. When an operation of swinging the ring-shaped extension apparatus 5 to the left is performed while performing the pressing operation, the player character PC performs an action of turning both of the left and right objects OBJL and OBJR so that the right object OBJR in the open state is turned toward the front while the left object OBJL is turned toward the back. Here, the operation of swinging the ring-shaped extension apparatus 5 to the left is such that in the real space, while the pressing operation is performed with the circular-ring axis of the ring-shaped portion 201 of the ring-shaped extension apparatus 5 in the vertical position, the ring-shaped extension apparatus 5 is turned around the circular-ring axis to the left with the circular-ring axis maintained in the vertical position and moving in the left.

Thus, when the operation of swinging the ring-shaped extension apparatus 5 to the left or right is performed, an acceleration occurs toward the horizontal direction of the real space and an angular velocity occurs around the z-axis direction (see FIG. 6), on the right controller 4 attached to the ring-shaped extension apparatus 5. Therefore, by using an acceleration detected by the acceleration sensor 114 of the right controller 4 and/or an angular velocity detected by the angular velocity sensor 115 of the right controller 4, a direction, angle, and speed, etc., of the operation of swinging the ring-shaped extension apparatus 5 to the left or right can be calculated. In the third non-limiting example game, when the ring-shaped extension apparatus 5 is swung by at least a predetermined operation angle while performing the pressing operation, it is determined that the operation of swinging toward that direction has been performed. Actually, the operation of swinging the ring-shaped extension apparatus 5 to the left or right may be a combination of a roll operation, pitch operation, and yaw operation on the ring-shaped extension apparatus 5. Therefore, a final operation angle or operation velocity may be calculated by combining directions of the ring-shaped extension apparatus 5 that are changed by the roll operation, pitch operation, and yaw operation.

Here, the operation angle for determining that a swinging operation has been performed may be the angle of rotation around the circular-ring axis of the ring-shaped extension apparatus 5 by which an orientation of the ring-shaped extension apparatus 5 is changed from a reference orientation that is an orientation of the ring-shaped extension apparatus 5 at the time that the pressing operation is performed, where the operation angle occurring when the ring-shaped extension apparatus 5 is in the reference orientation is zero. Thus, the user can reset the operation angle to zero by performing the pressing operation after returning the ring-shaped extension apparatus 5 to the steady state. Note that there may be some time difference between the time at which the pressing operation is performed and the time at which the reference orientation (i.e., the operation angle) of the ring-shaped extension apparatus 5 is set to zero. For example, the orientation of the ring-shaped extension apparatus 5 that occurs when a predetermined period of time has passed since the pressing operation may be set to the reference orientation, i.e., the operation angle occurring at that time may be set to zero. The angular velocity sensor 115 of the right controller 4 attached to the ring-shaped extension apparatus 5 has a tendency to accumulate noise when continuing detection, and eventually fails to detect an accurate angular velocity, resulting in a so-called "drift" in detected values. Even when errors are thus accumulated in the detection value of the angular velocity sensor 115, then if the operation angle is initialized to zero with the ring-shaped extension apparatus 5 returned to the steady state, the direction (e.g., the front direction) with an operation angle of zero can be reset while the errors are removed.

The operation of turning both of the left and right objects OBJL and OBJR may be allowed once for a single pressing operation. In a non-limiting example, after the action of swinging the left and right objects OBJL and OBJR has been performed, the left and right objects OBJL and OBJR may be moved toward the back of the player character PC to be closed and are thereby changed to the closed state in which the player character PC cannot knock down a target object T, even when the pressing operation is continued. In that case, when the user desires to move the left and right objects OBJL and OBJR in the open state several times, the user is required to return the ring-shaped portion 201 of the ring-shaped extension apparatus 5 once to the steady state and then perform the pressing operation again before next performing the operation of swinging the ring-shaped extension apparatus 5.

Note that the operation of providing a command to turn both of the left and right objects OBJL and OBJR may be input before displaying the player character PC's action. For example, when the player character PC is performing an action of swinging the left and right objects OBJL and OBJR, then if the pressing operation of the ring-shaped extension apparatus 5 is once stopped and then the pressing operation is newly performed, the operation of providing a command to turn both of the left and right objects OBJL and OBJR may be allowed to be input in response to the new pressing operation, in advance, even when the player character PC's action is still being displayed. The number of times the above operation can be input in advance during the player character PC's action may be limited (e.g., the number of times the operation can be input in advance is limited to once).

A threshold (first threshold) for determining the amount of deformation of the ring-shaped portion 201 of the ring-shaped extension apparatus 5 at which the pressing operation can be determined to be changed to the effective state from the state that the pressing operation is not being performed, may be different from a threshold (second threshold) for determining the amount of deformation of the ring-shaped portion 201 of the ring-shaped extension apparatus 5 at which the pressing operation can be determined to be changed to the ineffective state from the state that the pressing operation is being performed. For example, in the case where the second threshold is smaller than the first threshold, even when the force for the pressing operation is reduced due to the operation of swinging the ring-shaped extension apparatus 5 during the pressing operation, the situation that the left and right objects OBJL and OBJR are returned to the closed state can be prevented to some extent. In a non-limiting example, the second threshold may be set to the amount of deformation that the ring-shaped extension apparatus 5 is deformed from the steady state by about 20%, where the maximum amount of deformation of the ring-shaped extension apparatus 5 from the steady state is 100%.

A target object T may be knocked down and eliminated when either the left or right object OBJL or OBJR is swung toward the front of the player character PC, or when only a particular one of the left and right objects OBJL and OBJR is swung toward the front of the player character PC. In a first non-limiting example, for each target object T that appears, the characteristic that the target object T can be knocked down using both the left and right objects OBJL and OBJR, the characteristic that the target object T can be knocked down using only the left object OBJL, or the characteristic that the target object T can be knocked down using only the right object OBJR, may be set, and each characteristic may be displayed in a manner that allows the user to view that characteristic. In a second non-limiting example, one or both of the objects OBJL and OBJR that can be used to knock down a target object T may be determined, depending on the location of the target object T. For example, a target object T can be knocked down using both the left and right objects OBJL and OBJR when the target object T approaches the player character PC from the front of the player character PC, a target object T can be knocked down using only the left object OBJL when the target object T approaches the player character PC from the left of the player character PC, and a target object T can be knocked down using only the right object OBJR when the target object T approaches the player character PC from the right of the player character PC.

Thus, in the case where a target object T is set that is knocked down and eliminated only when one of the left and right objects OBJL and OBJR is swung toward the front of the player character PC, the direction in which the ring-shaped extension apparatus 5 is swung in order to knock down the target object T is limited. Specifically, the user who operates the ring-shaped extension apparatus 5 as shown in FIG. 29 is required to not only swing the ring-shaped extension apparatus 5 only in one direction, but also swing the ring-shaped extension apparatus 5 in both directions, depending on the type or location of a target object T. Note that in the case where the direction in which the ring-shaped extension apparatus 5 is swung in order to knock down the target object T is limited, the angle of determination for determining that the ring-shaped extension apparatus 5 has been swung may be set to a different angle for each direction. For example, the angle of determination for determining that the ring-shaped extension apparatus 5 has been swung to a direction (incorrect direction) that a target object T cannot be knocked down may be set to be larger than the angle of determination for determining that the ring-shaped extension apparatus 5 has been swung to a direction (correct direction) that a target object T can be knocked down. In that case, the user's operation that is not intended by the user, such as the operation of swinging the left and right objects OBJL and OBJR toward an incorrect direction in which a target object T cannot be knocked down, can be reduced.

Note that the operation performed using the ring-shaped extension apparatus 5 may be determined using an output from the left controller 3 or another input apparatus in addition to an output from a motion sensor included in the right controller 4 (the ring-shaped extension apparatus 5).

Although in the foregoing, the operation angle of the ring-shaped extension apparatus 5 is used to detect when the ring-shaped extension apparatus 5 is swung, the determination may be performed using other parameters. For example, the velocity or acceleration at which the ring-shaped extension apparatus 5 is swung to the left or right in the real space may be used, and if such a parameter exceeds a predetermined threshold, it may be determined that the ring-shaped extension apparatus 5 has been swung.

Figure 33:
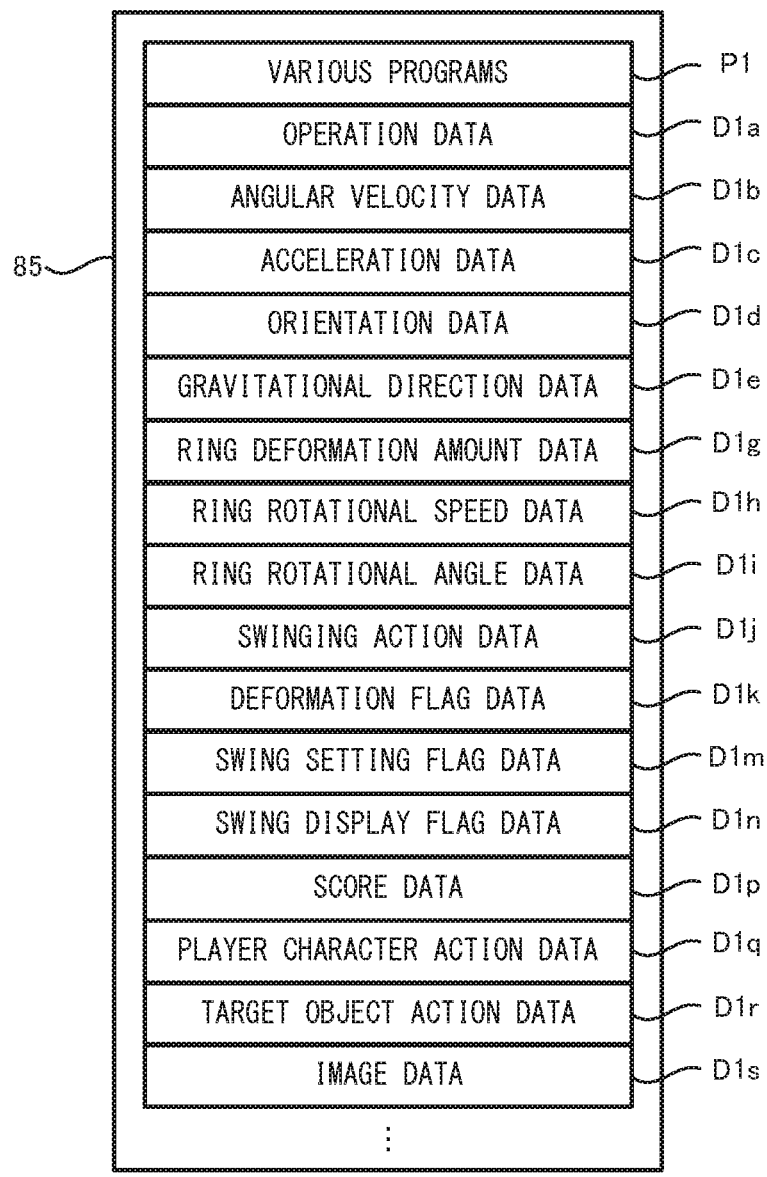
FIG. 33 is a diagram showing a non-limiting example of a data area contained in the DRAM 85 of the main body apparatus 2 in the third non-limiting example game.

Next, a non-limiting example of a specific process that is executed by the game system 1 in the third non-limiting example game will be described with reference to FIGS. 33-36. FIG. 33 is a diagram showing a non-limiting example of a data area contained in the DRAM 85 of the main body apparatus 2 in the third non-limiting example game. Note that in addition to the data of FIG. 33, the DRAM 85 also stores data that is used in other processes, which will not be described in detail.

In the third non-limiting example game, various programs P1 that are executed in the game system 1 are stored in a program storage area of the DRAM 85. In this non-limiting example, the programs P1 include a communication program for performing wireless communication with the right controller 4, an application program (e.g., a game program) for performing information processing based on data obtained from the right controller 4, etc. Note that the programs P1 may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs P1 stored in the DRAM 85.

In the third non-limiting example game, various kinds of data that are used in processes such as a communication process and an information process that are executed in the game system 1 are stored in a data storage area of the DRAM 85. In this non-limiting example, the DRAM 85 stores operation data D1$a$, angular velocity data D1$b$, acceleration data D1$c$, orientation data D1$d$, gravitational direction data D1$e$, ring deformation amount data D1$g$, ring rotational speed data D1$h$, ring rotational angle data D1$i$, swinging action data D1$j$, deformation flag data D1$k$, swing setting flag data D1$m$, swing display flag data D1$n$, score data D1$p$, player character action data D1$q$, target object action data D1$r$, and image data D1$s$, etc.

The operation data D1$a$ is obtained from the right controller 4 as appropriate. As described above, the operation data transmitted from the right controller 4 includes information about an input from each input section (specifically, each button, an analog stick, or each sensor) (specifically, information about an operation, and the result of detection by each sensor), and a strain value indicating a state of deformation of the ring-shaped portion 201 of the ring-shaped extension apparatus 5. In this non-limiting example, operation data is transmitted from the right controller 4 at predetermined time intervals through wireless communication. The received operation data is used to update the operation data D1$a$ as appropriate. Note that the operation data D1$a$ may be updated for each frame that is the cycle of a process executed in the game system 1, or may be updated each time operation data is received through the wireless communication.

The angular velocity data D1$b$ indicates the history of angular velocities occurring on the right controller 4 that have been obtained during a period of time from the current time to a predetermined time before. The angular velocities are included in the operation data obtained from the right controller 4. For example, the angular velocity data D1$b$ includes the history of data indicating angular velocities about the x-, y-, and z-axes occurring on the right controller 4, etc.

The acceleration data D1$c$ indicates the history of accelerations occurring on the right controller 4 that have been obtained during a period of time from the current time to a predetermined time before. The accelerations are included in the operation data obtained from the right controller 4. For example, the acceleration data D1$c$ includes the history of data indicating accelerations in the x-, y-, and z-axis directions occurring on the right controller 4, etc.

The orientation data D1$d$ indicates an orientation of the right controller 4 in the real space, i.e., data indicating the history of orientations that have occurred during a period of time from the current time to a predetermined time before.

In a non-limiting example, the orientation data D1$d$ indicates the history of orientations in the x-, y-, and z-axis directions (e.g., angles with respect to x-, y-, and z-axes in the real space) of the right controller 4 in the real space.

The gravitational direction data D1$e$ indicates the direction of a gravitational acceleration acting on the right controller 4.

The ring deformation amount data D1$g$ indicates the direction and amount of deformation of the ring-shaped extension apparatus 5. The ring rotational speed data D1$h$ indicates a velocity (operation velocity) at which the ring-shaped extension apparatus 5 is swung and turned. The ring rotational angle data D1$i$ indicates an angle (operation angle) by which the ring-shaped extension apparatus 5 is swung and turned.

The swinging action data D1$j$ indicates a swinging action that the player character PC is caused to perform, and is set based on an operation performed on the ring-shaped extension apparatus 5.

The deformation flag data D1$k$ indicates a deformation flag that is set "on" when the pressing operation is being performed on the ring-shaped extension apparatus 5. The swing setting flag data D1$m$ indicates a swing setting flag that is set "on" when a swinging action has been set by an operation performed on the ring-shaped extension apparatus 5. The swing display flag data D1$n$ indicates a swing display flag that is set "on" when the player character PC is performing a swinging action.

The score data D1$p$ indicates the current game score.

The player character action data D1$q$ indicates the location, state, orientation, action, etc., of the player character PC disposed in the virtual game space. The target object action data D1$r$ indicates the location, state, orientation, action, etc., of a target object T.

The image data D1$s$ is for displaying an image (e.g., an image of the player character PC, an image of a target object T, a field image, a background image, etc.) on a display screen.

Figure 34:
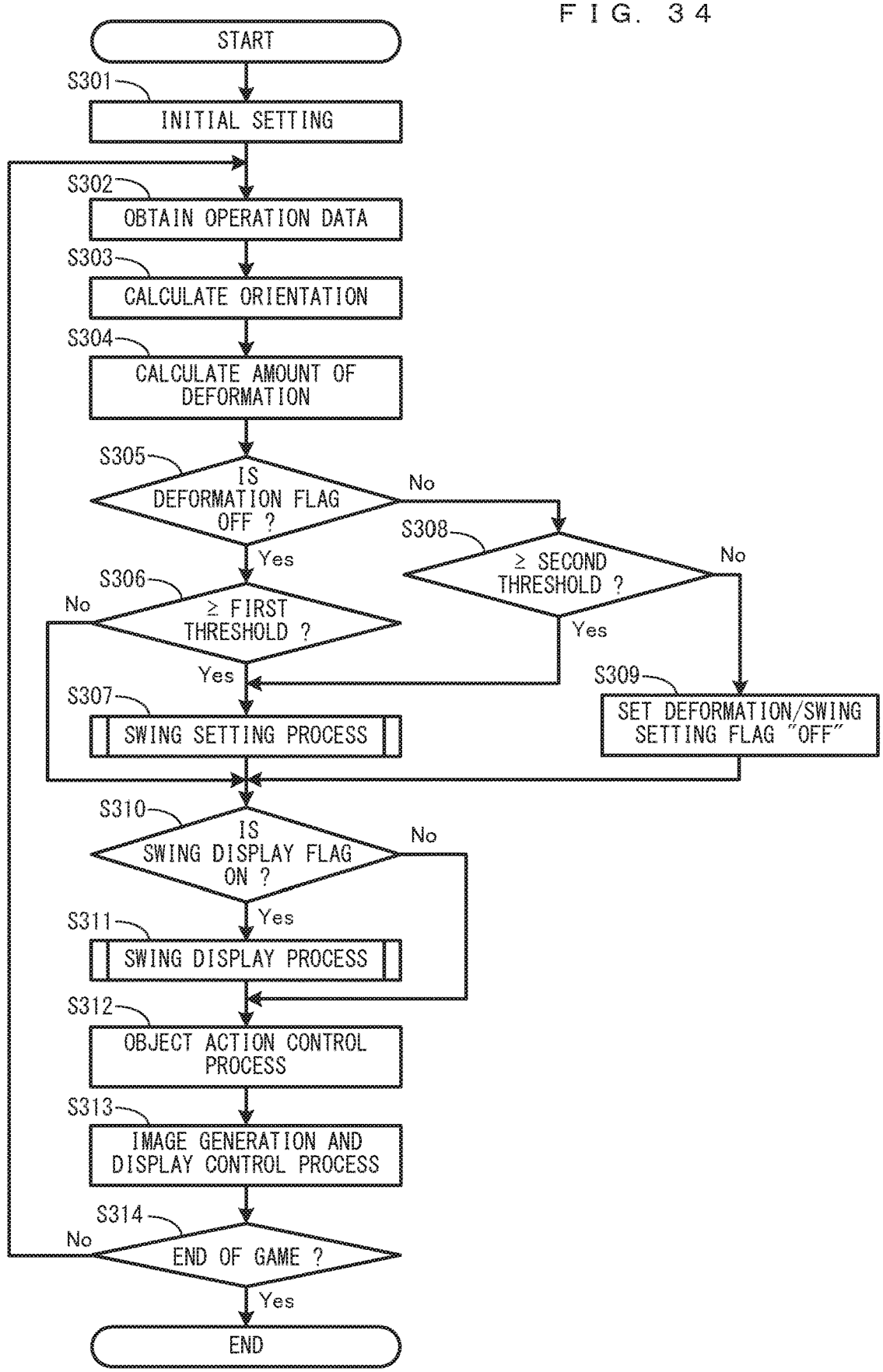
FIG. 34 is a flowchart showing a non-limiting example of an information process that is executed by the game system 1 in the third non-limiting example game.
Figure 35:
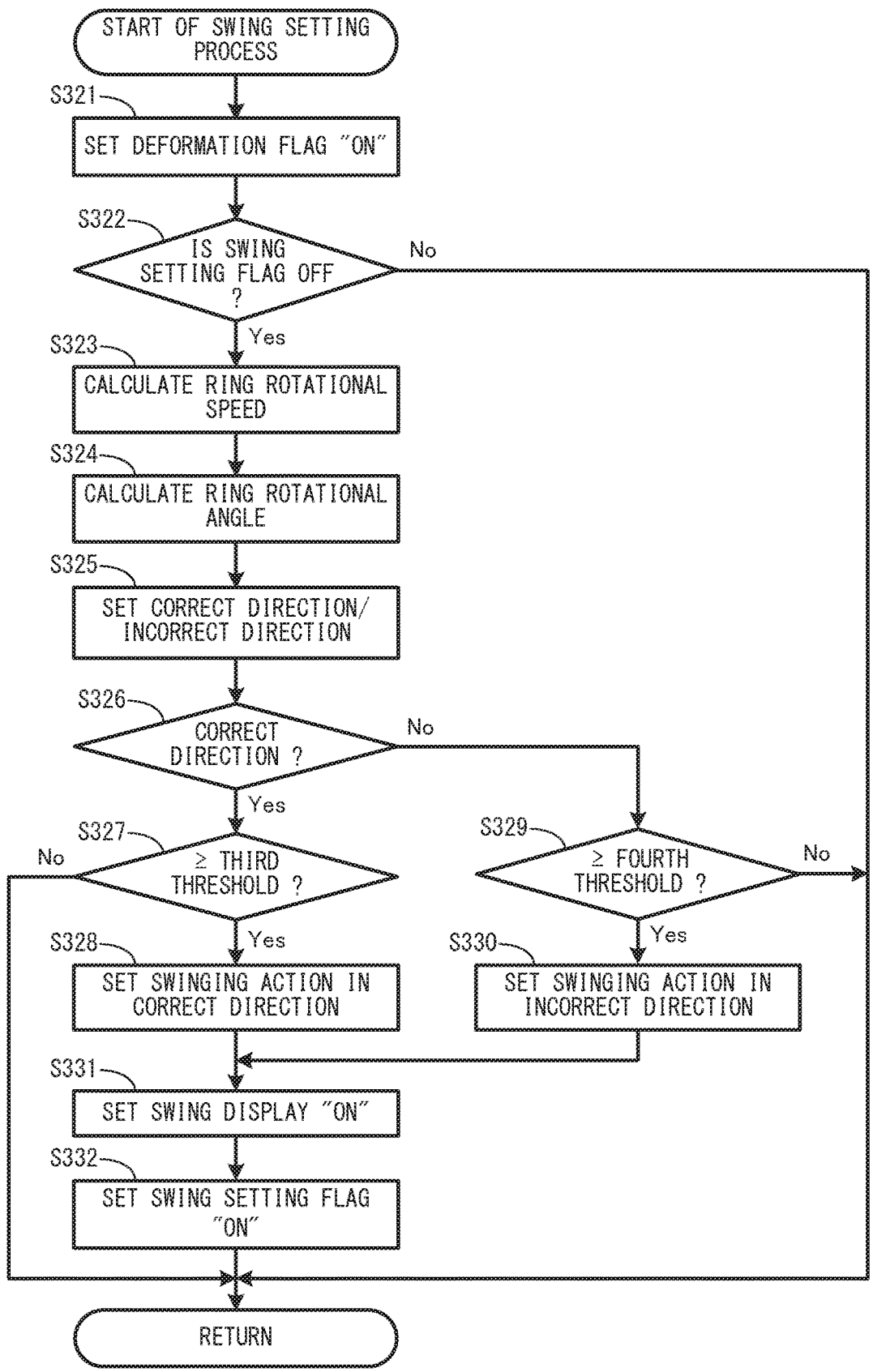
FIG. 35 is a subroutine showing a specific non-limiting example of a swing setting process performed in step S307 shown in FIG. 34.
Figure 36:
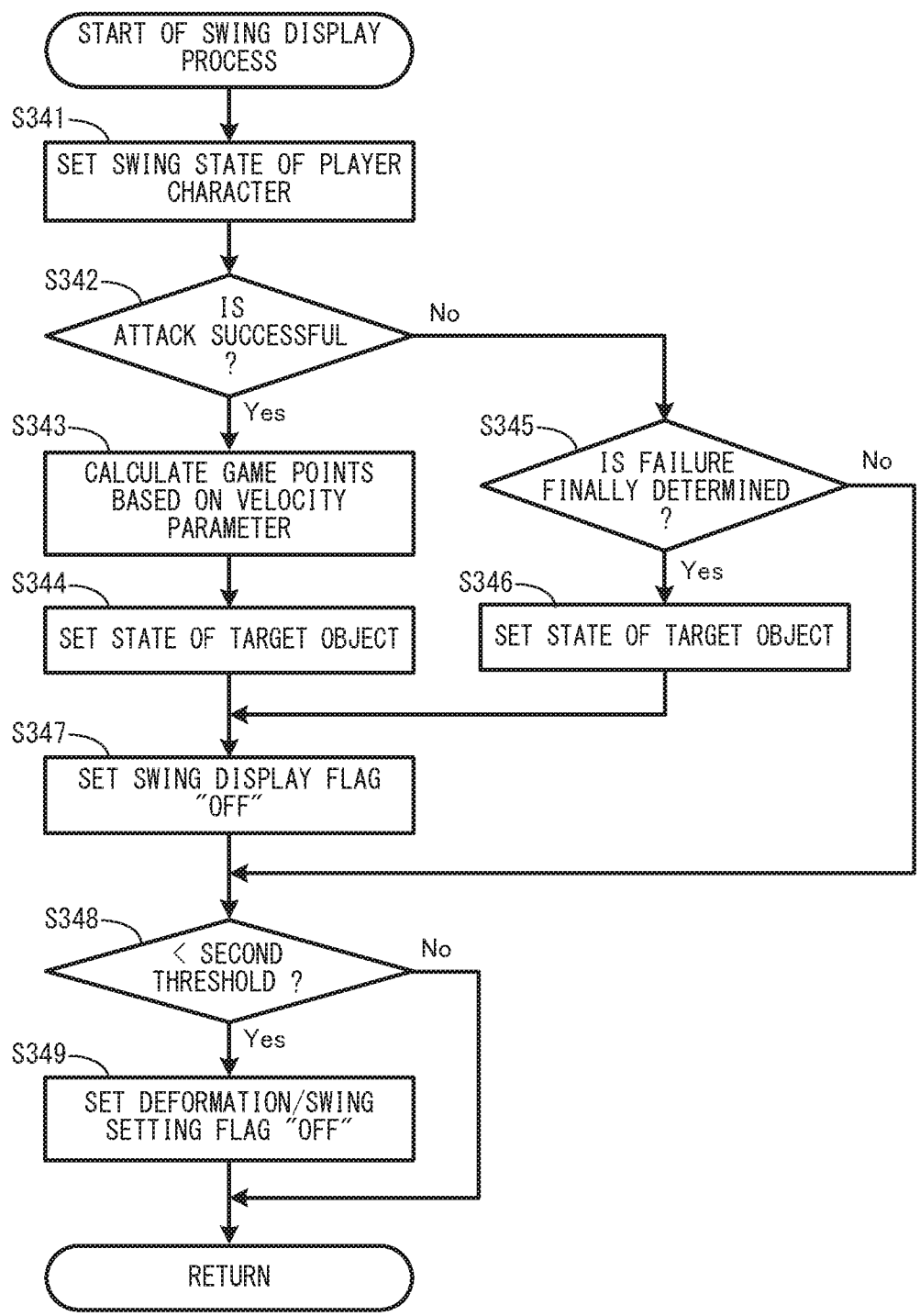
FIG. 36 is a subroutine of a specific non-limiting example of a swing display process performed in step S311 shown in FIG. 34.

Next, a specific non-limiting example of an information process in the third non-limiting example game will be described with reference to FIGS. 34-36. FIG. 34 is a flowchart showing a non-limiting example of an information process that is executed by the game system 1 in the third non-limiting example game. FIG. 35 is a subroutine showing a specific non-limiting example of a swing setting process performed in step S307 shown in FIG. 34. FIG. 36 is a subroutine of a specific non-limiting example of a swing display process performed in step S311 shown in FIG. 34. In the third non-limiting example game, a series of processes shown in FIGS. 34-36 are performed by the processor 81 executing a communication program and a predetermined application program (game program) included in the programs P1. The information process of FIGS. 34-36 is started with any suitable timing.

Note that the steps in the flowchart of FIGS. 34-36, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or a dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 34-36 may be executed by a plurality of information processing apparatuses including the main body apparatus 2 cooperating with each other.

In FIG. 34, the processor 81 performs initial setting for the information process (step S301), and proceeds to the next step. For example, in the initial setting, the processor 81 initializes parameters for performing processes to be described below. For example, the processor 81 initially disposes, in the virtual game space, objects (including the player character PC equipped with the objects OBJL and OBJR) to generate an initial state of the virtual game space, and updates the player character action data D1$q$ with the location, direction, state (the closed states of the left and right objects OBJL and OBJR), and orientation, etc., of the player character PC.

Next, the processor 81 obtains operation data from the right controller 4 and updates the operation data D1$a$ (step S302), and proceeds to the next step. Note that the processor 81 stores data indicating an angular velocity occurring on the right controller 4, which is included in the operation data obtained from the right controller 4 in step S302, into the angular velocity data D1$b$. The processor 81 also stores data indicating an acceleration occurring on the right controller 4, which is included in the operation data obtained from the right controller 4 in step S302, into the acceleration data D1$c$.

Next, the processor 81 calculates the orientation of the right controller 4 (step S303), and proceeds to the next step. For example, the processor 81 obtains the angular velocities about the x-, y-, and z-axes of the right controller 4 using angular velocity data stored in the angular velocity data D1$b$. Thereafter, the processor 81 turns the x-, y-, and z-axes with reference to the gravitational acceleration direction of the orientation of the right controller 4 indicated by the orientation data D1$d$, based on the respective angular velocities obtained, and stores, into the orientation data D1$d$, the directions of the turned x-, y-, and z-axes with reference to the gravitational acceleration direction, as most recent data indicating the orientation of the right controller 4. The processor 81 also calculates the direction of the gravitational acceleration acting on the right controller 4 using acceleration data stored in the acceleration data D1$c$, and stores the calculated direction into the gravitational direction data D1$e$. Note that the gravitational acceleration may be extracted using any suitable technique. For example, an acceleration component averagely occurring on the right controller 4 may be calculated and extracted as the gravitational acceleration. The processor 81 also corrects, as appropriate, the most recent orientation of the right controller 4 indicated by the orientation data D1$d$ using the direction of the gravitational acceleration occurring on the right controller 4 indicated by the gravitational direction data D1$e$.

Next, the processor 81 calculates the amount of deformation of the ring-shaped extension apparatus 5 (step S304), and proceeds to the next step. For example, the processor 81 calculates the amount and direction of deformation of the ring-shaped portion 201 of the ring-shaped extension apparatus 5 using a strain value indicated by the operation data D1$a$, and updates the ring deformation amount data D1$g$ with the calculation result.

Next, the processor 81 determines whether or not the deformation flag is off (step S305). For example, if the deformation flag indicated by the deformation flag data D1$k$ is off, the result of determination in step S305 by the processor 81 is positive. If the deformation flag is off, the processor 81 proceeds to step S306. Otherwise, i.e., if the deformation flag is on, the processor 81 proceeds to step S308.

In step S306, the processor 81 determines whether or not the amount of deformation calculated in step S304 is greater than or equal to a first threshold. If the amount of deformation is greater than or equal to the first threshold, the processor 81 proceeds to step S307. Otherwise, i.e., if the amount of deformation is smaller than the first threshold, the processor 81 proceeds to step S310. Here, the first threshold is used for determining the amount of deformation of the ring-shaped extension apparatus 5 in order to detect when the pressing operation is started on the ring-shaped extension apparatus 5. If the amount of deformation of the ring-shaped extension apparatus 5 has reached the first threshold or greater, it is determined that a pressing operation has been started.

In step S307, the processor 81 performs a swing setting process, and proceeds to step S310. The swing setting process performed in step S307 will now be described with reference to FIG. 35.

In FIG. 35, the processor 81 sets the deformation flag "on" (step S321), and proceeds to the next step. For example, the processor 81 sets "on" the deformation flag indicated by the deformation flag data D1$k$ to update the deformation flag data D1$k$.

Next, the processor 81 determines whether or not the swing setting flag is off (step S322). For example, if the swing setting flag indicated by the swing setting flag data D1$m$ is off, the result of determination in step S322 by the processor 81 is positive. If the swing setting flag is off, the processor 81 proceeds to step S323. Otherwise, i.e., if the swing setting flag is on, the processor 81 ends the process of the subroutine.

In step S323, the processor 81 calculates a velocity (operation velocity) at which the ring-shaped extension apparatus 5 has been swung and turned in the real space, and proceeds to the next step. For example, the processor 81 calculates the operation velocity with reference to the acceleration data D1$c$, and updates the ring rotational speed data D1$h$. Note that the operation velocity may be a velocity at which the ring-shaped extension apparatus 5 (the right controller 4) is moved in a horizontal direction in the real space, and is calculated based on the most recent orientation indicated by the orientation data D1$d$, or a velocity at which the ring-shaped extension apparatus 5 (the right controller 4) is moved in a direction perpendicular to the circular-ring axis of the ring-shaped portion 201 of the ring-shaped extension apparatus 5 (i.e., a direction perpendicular to the z-axis direction of the right controller 4).

Next, the processor 81 calculates an angle (operation angle) and operation direction in which the ring-shaped extension apparatus 5 has been swung and turned in the real space, and proceeds to the next step. For example, with reference to the angular velocity data D1$c$ and the orientation data D1$d$, the processor 81 calculates an angle of the ring-shaped extension apparatus 5 turned from a reference orientation, as the operation angle, and updates the ring rotational angle data D1$i$ with the operation angle and operation direction, where the reference operation is the orientation of the ring-shaped extension apparatus 5 at the time that the deformation flag is changed from off to on. Note that the operation angle may be an angle by which the ring-shaped extension apparatus 5 (the right controller 4) in the reference orientation is turned around the vertically downward direction of the real space, or an angle by which the ring-shaped extension apparatus 5 (the right controller 4)

is turned around the circular-ring axis of the ring-shaped portion 201 of the ring-shaped extension apparatus 5 (i.e., around the z-axis direction of the right controller 4).

Next, the processor 81 sets a correct direction/incorrect direction (step S325), and proceeds to the next step. Here, as described above, the correct direction is such that a target object T can be knocked down by the left or right object OBJL or OBJR, and the incorrect direction is such that a target object T cannot be knocked down by the left or right object OBJL or OBJR. The processor 81 sets the correct direction/incorrect direction based on the type of a target object T that is currently located closest to the player character PC in the virtual game space.

Next, the processor 81 determines whether or not a direction in which the left or right object OBJL or OBJR has been swung in the virtual game space according to the operation direction calculated in step S324 is a correct direction (step S326). If the swinging direction is a correct direction, the processor 81 proceeds to step S327. Otherwise, i.e., if the swinging direction is an incorrect direction, the processor 81 proceeds to step S329. Note that if the correct direction/incorrect direction has not been set in step S325 or if the operation direction has not been calculated in step S324 (i.e., the operation angle is zero), the result of determination in step S326 by the processor 81 is positive.

In step S327, the processor 81 determines whether or not the operation angle calculated in step S324 is greater than or equal to a third threshold. If the operation angle is greater than or equal to the third threshold, the processor 81 proceeds to step S328. Otherwise, i.e., if the operation angle is smaller than the third threshold, the processor 81 ends the process of the subroutine. Here, the third threshold is for determining the operation angle of the ring-shaped extension apparatus 5 in order to detect when the ring-shaped extension apparatus 5 is swung in a correct direction, and is set to, for example, 45 degrees. When the operation angle of the ring-shaped extension apparatus 5 in a correct direction has reached the third threshold or greater, it is determined that the operation of swinging the ring-shaped extension apparatus 5 in a correct direction has been performed.

In step S328, the processor 81 sets a swinging action in a correct direction for the player character PC, and proceeds to step S331. For example, the processor 81 sets an action of swinging the left and right objects OBJL and OBJR so that the player character PC swings the left or right object OBJL or OBJR in a correct direction at a predetermined velocity to a predetermined angle, and updates the swinging action data D1*j* using the set action. Note that the swinging action may be set so that the swinging velocity is increased with an increase in the operation velocity calculated in step S323.

Meanwhile, in step S329, the processor 81 determines whether or not the operation angle calculated in step S324 is greater than or equal to a fourth threshold. If the operation angle is greater than or equal to the fourth threshold, the processor 81 proceeds to step S330. Otherwise, i.e., if the operation angle is smaller than the fourth threshold, the processor 81 ends the process of the subroutine. Here, the fourth threshold is for determining the operation angle of the ring-shaped extension apparatus 5 in order to detect when the ring-shaped extension apparatus 5 is swung in an incorrect direction, and may be set to a value (e.g., 60 degrees) greater than the third threshold.

In step S330, the processor 81 sets a swinging action in an incorrect direction for the player character PC, and proceeds to step S331. For example, the processor 81 sets an action of swinging the left and right objects OBJL and OBJR so that the player character PC swings the left or right object OBJL or OBJR in an incorrect direction at a predetermined velocity to a predetermined angle, and updates the swinging action data D1*j* with the set action.

In step S331, the processor 81 sets the swing display flag "on," and proceeds to the next step. For example, the processor 81 sets "on" the swing display flag indicated by the swing display flag data D1*n* to update the swing display flag data D1*n*.

Next, the processor 81 sets the swing setting flag "on" (step S332), and ends the process of the subroutine. For example, the processor 81 sets "on" the swing setting flag indicated by the swing setting flag data D1*m* to update the swing setting flag data D1*m*. Thus, when a swinging action in a correct or incorrect direction is set according to an operation performed on the ring-shaped extension apparatus 5, the swing setting flag is set "on," and therefore, even when the pressing operation performed on the ring-shaped extension apparatus 5 is continued after the swinging action is set, the result of determination in step S322 is negative, and a new swinging action is not set.

Referring back to FIG. 34, if it is determined in step S305 that the deformation flag is on, the processor 81 determines whether or not the amount of deformation calculated in step S308 is greater than or equal to a second threshold. If the amount of deformation is greater than or equal to the second threshold, the processor 81 proceeds to step S307. Otherwise, i.e., if the amount of deformation is smaller than the second threshold, the processor 81 proceeds to step S309. Here, the second threshold is for determining that the pressing operation on the ring-shaped extension apparatus 5 is continued even when the force applied to the ring-shaped extension apparatus 5 is reduced after the start of the pressing operation, and is set to be smaller than the first threshold.

In step S309, the processor 81 sets "off" the deformation flag and the swing setting flag, and proceeds to step S310. For example, the processor 81 sets "off" each of the deformation flag indicated by the deformation flag data D1*k* and the swing setting flag indicated by the swing setting flag data D1*m* to update each of the deformation flag data D1*k* and the swing setting flag data D1*m*. Thus, when the pressing operation performed on the ring-shaped extension apparatus 5 is reduced to the amount of deformation that is smaller than the second threshold, it is determined that the pressing operation has been stopped, and sets the deformation flag "off" and the swing setting flag "off," and therefore, a new swinging action can be set.

In step S310, the processor 81 determines whether or not the swing display flag is on. For example, if the swing display flag indicated by the swing display flag data D1*n* is on, the result of determination in step S310 by the processor 81 is positive. If the swing display flag is on, the processor 81 proceeds to step S311. Otherwise, i.e., if the swing display flag is off, the processor 81 proceeds to step S312.

In step S311, the processor 81 performs a swing display process, and proceeds to step S312. The swing display process performed in step S311 will now be described with reference to FIG. 36.

In FIG. 36, the processor 81 sets a swing state of the player character PC (step S341), and proceeds to the next step. For example, the processor 81 sets a current orientation in which the player character PC swings the left and right objects OBJL and OBJR (e.g., current angles at which the left and right objects OBJL and OBJR are swung or a current orientation of the player character PC), based on a swinging action indicated by the swinging action data D1*j*, to update the player character action data D1*q*.

Next, the processor 81 determines whether or not the player character PC's attack against a target object T is successful (step S342). For example, if the swing state set in step S341 indicates collision with a target object T, and also indicates that the player character PC swings the left and right objects OBJL and OBJR in a correct direction, the processor 81 determines that the attack against the target object T is successful. If the player character PC's attack against the target object T is successful, the processor 81 proceeds to step S343. Otherwise, i.e., if the player character PC's attack against the target object T is unsuccessful, the processor 81 proceeds to step S345.

In step S343, the processor 81 calculates game points based on a velocity parameter, and proceeds to the next step. For example, the processor 81 calculates game points for the successful attack against the target object T, based on attack power depending on a velocity parameter (a velocity, acceleration, angular velocity, etc.) acting on the ring-shaped extension apparatus 5 at the start of swinging, and updates the score data D1*p* by adding the game points. Specifically, the processor 81 may calculate game points based on an acceleration or angular velocity at which the ring-shaped extension apparatus 5 is swung to the left or right, a velocity indicated by the ring rotational speed data D1*h*, etc., at the start of swinging. In a non-limiting example, the velocity parameter may be rated on a scale including several levels, and the game parameter may be calculated based on the levels. Note that a predetermined number of game points may be obtained for a successful attack against a target object T. In that case, game points are added irrespective of the velocity parameter.

Next, the processor 81 sets a state of the attacked target object T (step S344), and proceeds to step S347. For example, the processor 81 sets a state in which the attacked target object T is knocked down by the attack, and displays a scene that the target object T disappears from the virtual game space, and updates the target object action data D1*r* based on the scene.

Meanwhile, if it is determined in step S342 that the attack against the target object T is unsuccessful, the processor 81 determines whether or not the player character PC's unsuccessful attack against the target object T has been finally determined as a failure (step S345). For example, if the swing state determined in step S341 indicates collision with the target object T, and also indicates that the player character PC swings the left and right objects OBJL and OBJR in an incorrect direction, or if the swing state determined in step S341 indicates the player character PC swings the left and right objects OBJL and OBJR all the way down without collision with the target object T, the processor 81 determines that the attack against the target object T has been finally determined as a failure. If the player character PC's unsuccessful attack against the target object T has been finally determined as a failure, the processor 81 proceeds to step S346. Otherwise, i.e., if the player character PC's unsuccessful attack against the target object T has not been finally determined as a failure, the processor 81 proceeds to step S348.

In step S346, the processor 81 sets a state of the target object T for which the attack has been determined as a failure (step S346), and proceeds to step S347. For example, the processor 81 displays a scene that the target object T for which the attack has been determined a failure has won against the player character PC, and thereafter, displays a scene that the target object T disappears from the virtual game space, and updates the target object action data D1*r* based on the scenes.

In step S347, the processor 81 sets the swing display flag "off," and proceeds to step S348. For example, the processor 81 sets "off" the swing display flag indicated by the swing display flag data D1*n* to update the swing display flag data D1*n*.

In step S348, the processor 81 determines whether or not the amount of deformation calculated in step S304 is smaller than the second threshold. If the amount of deformation is smaller than the second threshold, the processor 81 proceeds to step S349. Otherwise, i.e., if the amount of deformation is greater than or equal to the second threshold, the processor 81 ends the process of the subroutine.

In step S349, the processor 81 sets "off" the deformation flag and the swing setting flag, and ends the process of the subroutine. For example, the processor 81 sets "off" each of the deformation flag indicated by the deformation flag data D1*k* and the swing setting flag indicated by the swing setting flag data D1*m* to update each of the deformation flag data D1*k* and the swing setting flag data D1*m*. Thus, even during the swing display process, i.e., even when a scene that the player character PC is swinging the left and right objects OBJL and OBJR is being displayed, then if a pressing operation performed on the ring-shaped extension apparatus 5 is reduced, so that the amount of deformation is smaller than the second threshold, it is determined that the pressing operation has been stopped, and the deformation flag is set "off." If the swing setting flag is thus set "off," a new swinging action can be set. Note that there may be a limitation on the process of changing the deformation flag and the swing setting flag to "off" during swing display. For example, the number of times the process of changing the deformation flag and the swing setting flag to "off" during single swing display, may limited to once or less.

Referring back to FIG. 34, in step S312, the processor 81 performs the process of controlling the action of an object (the player character PC, a target object T, etc.), and proceeds to the next step. For example, the processor 81 disposes the player character PC in the virtual game space based on the location, state, orientation, action, etc., of the player character PC indicated by the player character action data D1*q*. The processor 81 also causes a target object T to appear in the virtual game space and move toward the player character PC, based on a predetermined algorithm (appearance pattern), and updates the target object action data D1*r* based on the location after the appearance and movement.

Next, the processor 81 performs an image generation and display control process (step S313), and proceeds to the next step. For example, the processor 81 disposes a plurality of objects (the player character PC equipped with the object OBJL and OBJR, a target object T, etc.) in the virtual game space based on the settings provided by steps S311 and S312, to generate the virtual game space. The processor 81 also disposes a virtual camera in the virtual game space, generates an image of the virtual game space as viewed from the virtual camera, and outputs the virtual game space image to the stationary monitor 9. The processor 81 also causes an image indicating the game score indicated by the score data D1*p* to overlay the virtual game space image at an appropriate position, and outputs the resultant image to the stationary monitor 9.

Next, the processor 81 determines whether or not to end the game process (step S314). In step S314, a condition for ending the game process is, for example, that a condition for ending the game process is satisfied, that the user has performed an operation of ending the game process, etc. If the processor 81 determines not to end the game process, the processor 81 returns to step S302, and repeats the process.

Otherwise, i.e., if the processor 81 determines to end the game process, the processor 81 ends the process of the flowchart. Thereafter, steps S302-S314 are repeatedly executed until the processor 81 determines to end the game process in step S314.

Thus, in the third non-limiting example game, a predetermined game process is performed by swinging the ring-shaped extension apparatus 5 while deforming the ring-shaped extension apparatus 5, resulting in an improvement in the user's bodily sensation in an operation using the ring-shaped extension apparatus 5. In addition, in the third non-limiting example game, when the ring-shaped extension apparatus 5 is not deformed, or when the ring-shaped extension apparatus 5 is deformed and is not swung, the execution of a predetermined game process is limited, and therefore, the predetermined game process is limited by the user's particular operation.

Note that in the third non-limiting example game, the user's operation is performed using the ring-shaped extension apparatus 5. Alternatively, as in the first and second non-limiting example games, the user's operation may be performed using the ring-shaped extension apparatus 5 as well as the belt-shaped extension apparatus 6 with the left controller 3 attached thereto. In that case, the process using the output of the motion sensor (the acceleration sensor 114 and/or the angular velocity sensor 115 of the right controller 4) of the ring-shaped extension apparatus 5 may be replaced by a process using the output of the motion sensor (the acceleration sensor 104 and/or the angular velocity sensor 105 of the left controller 3) of the belt-shaped extension apparatus 6. Thus, the user's operation is also performed using the belt-shaped extension apparatus 6 with the left controller 3 attached thereto, and therefore, in the third non-limiting example game, the control of switching between the action mode in which the player character PC is allowed to attach a target object T and the action mode in which the player character PC is not allowed to attach a target object T, and the control of changing the states of the left and right objects OBJL and OBJR, are performed according to a pressing operation of deforming the ring-shaped extension apparatus 5, and the action control of swinging the left and right objects OBJL and OBJR to the left and right is performed according to the motion of the belt-shaped extension apparatus 6 caused by the motion of the user's leg. Therefore, the variety of user inputs using both of the ring-shaped extension apparatus 5 and the belt-shaped extension apparatus 6 can be increased.

(Fourth Non-Limiting Example Game)

Figure 37:
FIG. 37 is a diagram showing a non-limiting example of how, in a fourth non-limiting example game, the user operates the ring-shaped extension apparatus 5.

Next, before describing a specific process in a fourth non-limiting example game performed by the main body apparatus 2, the fourth non-limiting example game performed in the main body apparatus 2 will be outlined with reference to FIGS. 37-40. Note that FIG. 37 is a diagram showing a non-limiting example of how, in the fourth non-limiting example game, the user operates the ring-shaped extension apparatus 5. FIG. 38 is a diagram showing a first non-limiting example of a game image displayed on the stationary monitor 9 according to the user's operation in the fourth non-limiting example game. FIG. 39 is a diagram showing a second non-limiting example of a game image displayed on the stationary monitor 9 according to the user's operation in the fourth non-limiting example game. FIG. 40 is a diagram showing a third non-limiting example of a game image displayed on the stationary monitor 9 according to the user's operation in the fourth non-limiting example game.

As shown in FIG. 37, in the fourth non-limiting example game, the user holds both of the grip covers 203 and 204 of the ring-shaped extension apparatus 5 using both hands (each grip cover is held by one hand), and in this state, performs an operation of moving and swinging down the ring-shaped extension apparatus 5 from above to near the user's abdomen while deforming the ring-shaped extension apparatus 5 using both hands so that the two grip covers 203 and 204 of the ring-shaped extension apparatus 5 move toward each other. Here, in order to swinging down the ring-shaped extension apparatus 5 from above while deforming the ring-shaped extension apparatus 5 so that the two grip covers 203 and 204 move toward each other, the user performs an action similar to a motion of the upper body occurring when the user jumps while applying a force to both hands, i.e., the user is required to perform a gaming operation imitating jumping.

In the fourth non-limiting example game, the game system will be described, assuming the situation that the left controller 3 and the right controller 4 are removed from the main body apparatus 2, and the main body apparatus 2 alone is attached to the cradle 8, and an image (and sound) is output from the stationary monitor 9 connected to the cradle 8. In a non-limiting example, the user performs a gaming operation using the right controller 4 attached to the ring-shaped extension apparatus 5. In a non-limiting example of a game process in the fourth non-limiting example game, a process is used in which a player character PC displayed on the stationary monitor 9 moves (jump) in the virtual game space according to the user's operation.

For example, in FIG. 38, the player character PC is disposed in the virtual game space. The player character PC is disposed along a wall extending upward in the virtual game space. As shown in FIG. 38, when the ring-shaped portion 201 of the ring-shaped extension apparatus 5 is in the steady state in which the ring-shaped portion 201 is not deformed, the player character PC is not moving along the wall.

Meanwhile, as shown in FIG. 39, when the user performs an operation of deforming the ring-shaped extension apparatus 5 so that the ring-shaped portion 201 is changed from the steady state to at least a predetermined state and thereby the grip covers 203 and 204 move toward each other (a pressing operation of deforming the ring-shaped portion 201 in a B direction shown in FIG. 22), a label M indicating a height that the player character PC can reach when jumping and moving, is displayed above the player character PC along the wall. Such a pressing operation is detected based on a strain detected by the strain gauge included in the ring-shaped extension apparatus 5 as in the third non-limiting example game. In addition, when the ring-shaped portion 201 of the ring-shaped extension apparatus 5 is deformed from the steady state, a strain of the base portion is detected by the strain gauge, and based on the detected strain, a direction in which the ring-shaped portion 201 is deformed (i.e., a direction in which the two grip covers 203 and 204 move away from each other, or a direction in which the two grip covers 203 and 204 move toward each other), and the amount of deformation, can be calculated. If the ring-shaped portion 201 is deformed in the direction in which the two grip covers 203 and 204 move toward each other, the label M indicating a reachable height corresponding to the calculated amount of deformation is displayed. When the pressing operation is stopped, a scene is displayed that the reachable height indicated by the label M gradually decreases, and the label M finally disappears. Note that the label M corresponds to a non-limiting example of an image indicating the amount of deformation of the first input apparatus.

As shown in FIG. 40, when an operation of swinging the ring-shaped extension apparatus 5 downward (D direction in FIG. 23) in the real space is performed together with the pressing operation, the player character PC performs an action of jumping along the wall to try to reach the reachable height indicated by the label M immediately before the swinging operation. Here, the operation of swinging the ring-shaped extension apparatus 5 downward is a pitch operation that causes the ring-shaped extension apparatus 5 to move in a vertically downward direction in the real space with the pressing operation applied to the ring-shaped extension apparatus 5. When the operation of swinging the ring-shaped extension apparatus 5 downward is performed together with the pressing operation, the player character PC performs an action of moving in the virtual game space, i.e., jump along the wall. A predetermined number of game points can be given to the user based on the location that the player character PC has reached. Specifically, if the player character PC jumps too high, no game points may not be obtained, and therefore, the user is required to cause the player character PC to jump using an appropriate level of jump power.

Thus, when the pitch operation of swinging the ring-shaped extension apparatus 5 downward is performed, an acceleration downward in the real space and an angular velocity around the y-axis direction (see FIG. 6) occur on the right controller 4 attached to the ring-shaped extension apparatus 5. Therefore, an acceleration detected by the acceleration sensor 114 of the right controller 4 and/or an angular velocity detected by the angular velocity sensor 115 of the right controller 4 can be used to calculate the operation direction, operation angle, and operation velocity, etc., of the pitch operation of swinging the ring-shaped extension apparatus 5 downward. In the fourth non-limiting example game, when the pitch operation of swinging the ring-shaped extension apparatus 5 downward is performed together with the pressing operation, the process of causing the player character PC to jump and move to a reachable height depending on the amount of deformation caused by the pressing operation is performed. Actually, the pitch operation of swinging the ring-shaped extension apparatus 5 downward may be accompanied by a roll operation or yaw operation of the ring-shaped extension apparatus 5. Therefore, the presence or absence of a final pitch operation of swinging downward may be determined by combining changes in respective directions of the ring-shaped extension apparatus 5 by the roll operation, pitch operation, and yaw operation.

Note that the operation of causing the player character PC to jump and move may be allowed only once for each pressing operation. In a non-limiting example, after the player character PC has jumped and moved, the label M may no longer be displayed even when the pressing operation is continued. In that case, the user is required to perform a pressing operation again after returning the ring-shaped portion 201 of the ring-shaped extension apparatus 5 to the steady state, and perform an operation of swinging and moving the ring-shaped extension apparatus 5, in order to cause the label M to be displayed again, and cause the player character PC to jump and move again.

In the pitch operation of swinging the ring-shaped extension apparatus 5 downward together with the pressing operation, the force for performing the pressing operation may be reduced by the pitch operation. In that case, the player character PC may fail to jump to the reachable height indicated by the label M displayed before the pitch operation. In order to prevent such an unintended reduction in jump power due to the reduction of the force for performing the pressing operation, the reachable height for the player character PC may be calculated based on the amount of deformation of the ring-shaped extension apparatus 5 that has occurred a predetermined time (e.g., five frames) before the pitch operation, or the greatest amount of deformation of the ring-shaped extension apparatus 5 that has occurred during a period of time from the current time to a predetermined time before.

When the pitch operation of swinging the ring-shaped extension apparatus 5 downward is performed without the pressing operation, jump power may not be calculated, and therefore, a scene that the player character PC does not jump may be displayed. In that case, game points that could be obtained by causing the player character PC to jump are not obtained, and the degree of game achievement cannot be updated. Therefore, when the pitch operation of swinging the ring-shaped extension apparatus 5 downward is performed without the pressing operation performed on the ring-shaped extension apparatus 5, in a non-limiting example the user may be prompted to perform an operation of deforming the ring-shaped extension apparatus 5, by providing to the user a predetermined image or sound (e.g., a text image "press the ring-shaped extension apparatus 5" or a voice "press the ring-shaped extension apparatus 5").

The jump power by which the player character PC is caused to jump may be determined based on another parameter in addition to the amount of deformation of the ring-shaped extension apparatus 5. For example, the jump power may be calculated using both a velocity parameter (a velocity, acceleration, angular velocity, etc.) at which the ring-shaped extension apparatus 5 is swung downward during jumping, and the amount of deformation.

When the user operates the ring-shaped extension apparatus 5 with the ring-shaped extension apparatus 5 held in an incorrect orientation, the scene that the player character PC jumps may not be displayed even when the operation of swinging the ring-shaped extension apparatus 5 downward is performed while deforming the ring-shaped extension apparatus 5. Here, as shown in FIG. 37, the correct orientation of the ring-shaped extension apparatus 5 when held is such that the user holds the grip covers 203 and 204 with both hands, with the right controller 4 located at a highest position and the two grip covers 203 and 204 aligned substantially horizontally; the pressing operation and the downward-swinging operation are performed on the ring-shaped extension apparatus 5 with the circular-ring axis of the ring-shaped portion 201 pointing in substantially the horizontal direction, i.e., in substantially the horizontal position. The determination of whether or not an operation has been performed in such a correct orientation can be achieved by analyzing the orientation of the ring-shaped extension apparatus 5 at the time that it is determined that the ring-shaped extension apparatus 5 has been swung downward.

Figure 41:
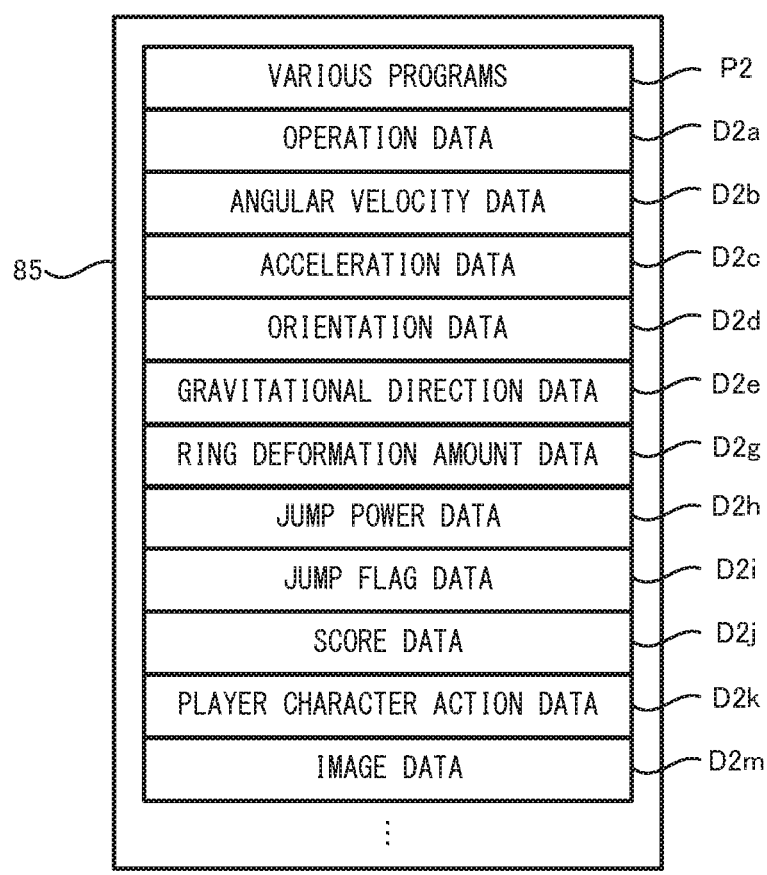
FIG. 41 is a diagram showing a non-limiting example of a data area contained in the DRAM 85 of the main body apparatus 2 in the fourth non-limiting example game.

Next, a non-limiting example of a specific process that is executed by the game system 1 in the fourth non-limiting example game will be described with reference to FIGS. 41-43. FIG. 41 is a diagram showing a non-limiting example of a data area contained in the DRAM 85 of the main body apparatus 2 in the fourth non-limiting example game. Note that the DRAM 85 stores, in addition to the data shown in FIG. 41, data used in other processes, which will not be described in detail.

In the fourth non-limiting example game, various programs P2 that are executed in the game system 1 are stored in a program storage area of the DRAM 85. In this non-limiting example, the programs P2 include a communication program for performing wireless communication with the right controller 4, an application program (e.g., a game program) for performing information processing based on data obtained from the right controller 4, etc. Note that the programs P2 may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs P2 stored in the DRAM 85.

In the fourth non-limiting example game, various kinds of data that are used in processes such as communication processing and information processing that are executed in the game system 1 are stored in a data storage area of the DRAM 85. In this non-limiting example, the DRAM 85 stores operation data D2$a$, angular velocity data D2$b$, acceleration data D2$c$, orientation data D2$d$, gravitational direction data D2$e$, ring deformation amount data D2$g$, jump power data D2$h$, jump flag data D2$i$, score data D2$j$, player character action data D2$k$, and image data D2$m$, etc.

The operation data D2$a$ is data indicating an operation that is obtained from the right controller 4 as appropriate. As described above, the operation data transmitted from the right controller 4 includes information about an input from each input section (specifically, each button, an analog stick, and each sensor) (specifically, information about an operation, and the result of detection by each sensor), and a strain value indicating the state of deformation of the ring-shaped portion 201 of the ring-shaped extension apparatus 5. In this non-limiting example, operation data is transmitted from the right controller 4 at predetermined time intervals through wireless communication. The received operation data is used to update the operation data D2$a$ as appropriate. Note that the operation data D2$a$ may be updated for each frame that is the cycle of a process executed in the game system 1, or may be updated each time operation data is received through the wireless communication.

The angular velocity data D2$b$ indicates the history of angular velocities occurring on the right controller 4 that have been obtained during a period of time from the current time to a predetermined time before. The angular velocities are included in the operation data obtained from the right controller 4. For example, the angular velocity data D2$b$ includes the history of data indicating angular velocities about the x-, y-, and z-axes occurring on the right controller 4, etc.

The acceleration data D2$c$ indicates the history of accelerations occurring on the right controller 4 that have been obtained during a period of time from the current time to a predetermined time before. The accelerations are included in the operation data obtained from the right controller 4. For example, the acceleration data D2$c$ includes the history of data indicating accelerations in the x-, y-, and z-axis directions occurring on the right controller 4, etc.

The orientation data D2$d$ indicates an orientation of the right controller 4 in the real space, i.e., data indicating the history of orientations that have occurred during a period of time from the current time to a predetermined time before. In a non-limiting example, the orientation data D2$d$ indicates the history of orientations in the x-, y-, and z-axis directions (e.g., angles with respect to x-, y-, and z-axes in the real space) of the right controller 4 in the real space.

The gravitational direction data D2$e$ indicates the direction of a gravitational acceleration acting on the right controller 4.

The ring deformation amount data D2$g$ indicates the history of the directions and amounts of deformation of the ring-shaped extension apparatus 5 that have been calculated during a period of time from the current time to a predetermined time before.

The jump power data D2$h$ indicates jump power for causing the player character PC to move, which is set according to an operation performed on the ring-shaped extension apparatus 5.

The jump flag data D2$i$ indicates a jump flag that is set "on" when the scene that the player character PC jumps is displayed.

The score data D2$j$ indicates the current game score.

The player character action data D2$k$ indicates the location, state, orientation, action, etc., of the player character PC disposed in the virtual game space.

The image data D2$m$ is for displaying an image (e.g., an image of the player character PC, a field image, a background image, etc.) on a display screen.

Next, a specific non-limiting example of information processing in the fourth non-limiting example game will be described with reference to FIGS. 42 and 43. FIG. 42 is a flowchart showing a non-limiting example of an information process that is executed by the game system 1 in the fourth non-limiting example game. FIG. 43 is a subroutine showing a specific non-limiting example of a jump display process performed in step S410 shown in FIG. 42. In the fourth non-limiting example game, a series of processes shown in FIGS. 42 and 43 are performed by the processor 81 executing a communication program and a predetermined application program (game program) included in the programs P2. The information processing of FIGS. 42 and 43 is started with any suitable timing.

Figure 42:
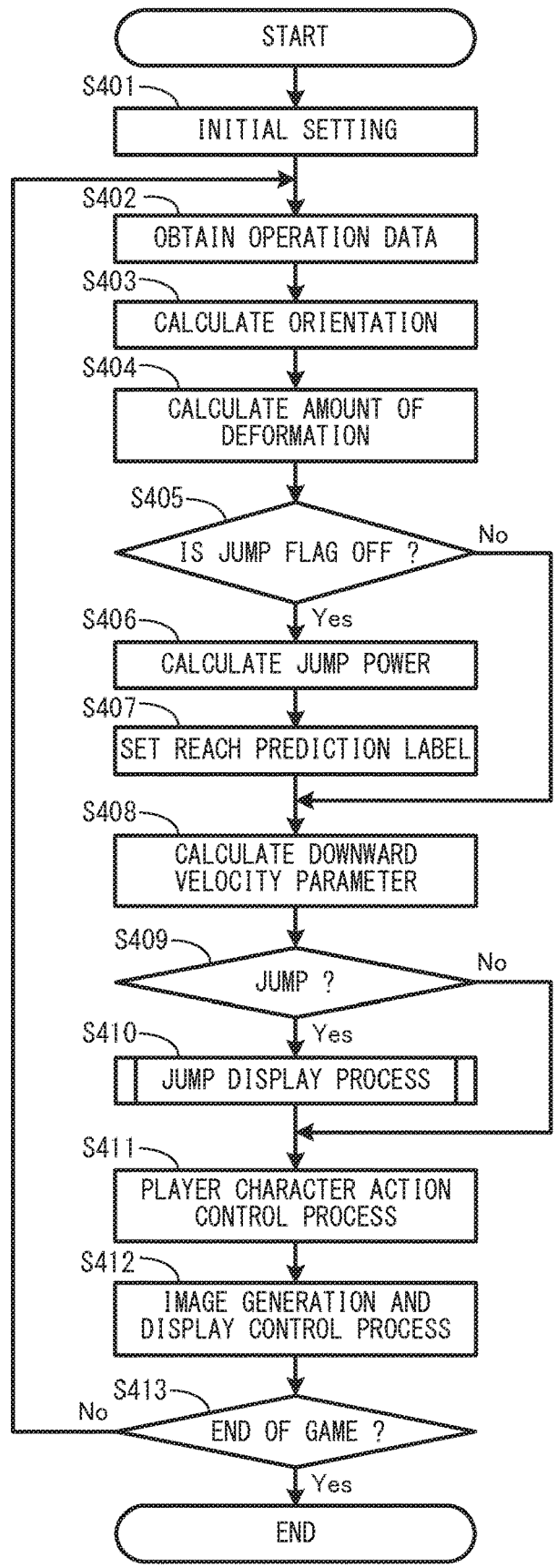
FIG. 42 is a flowchart showing a non-limiting example of an information process that is executed by the game system 1 in the fourth non-limiting example game.
Figure 43:
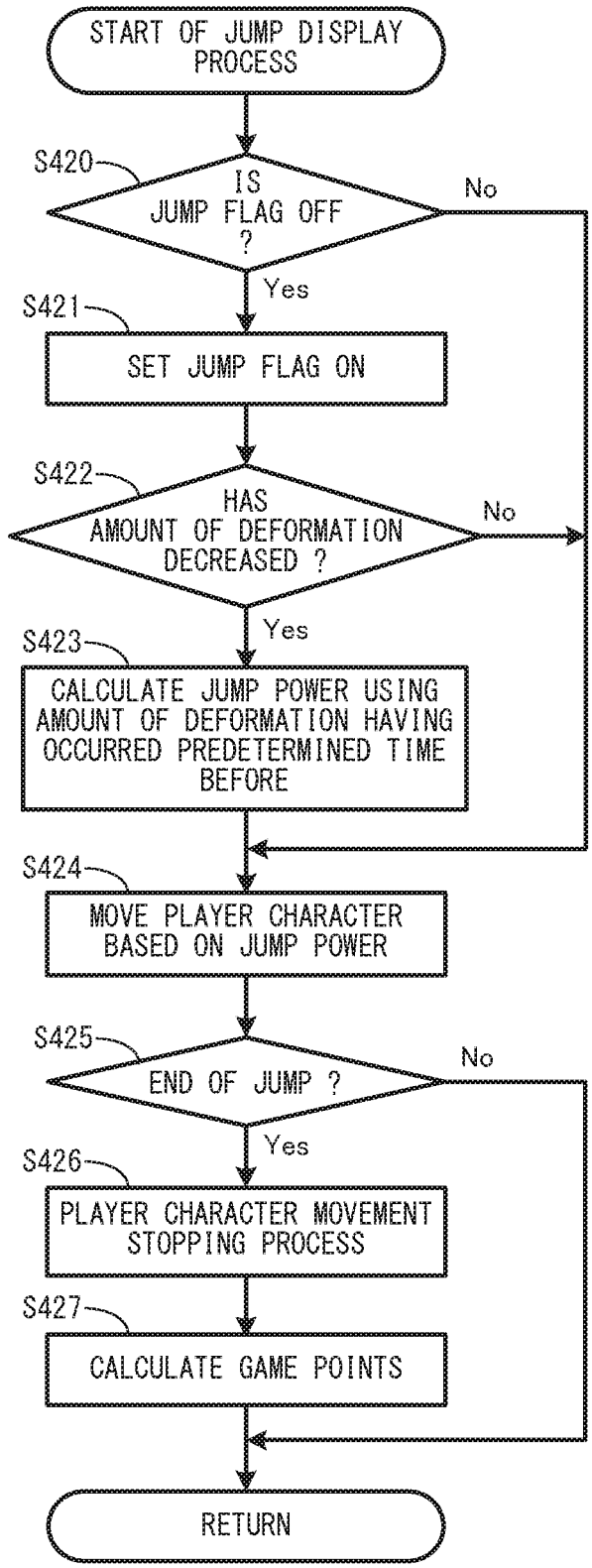
FIG. 43 is a subroutine showing a specific non-limiting example of a jump display process performed in step S410 shown in FIG. 42.

Note that the steps in the flowchart of FIGS. 42 and 43, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or a dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 42 and 43 may be executed by a plurality of information processing apparatuses including the main body apparatus 2 cooperating with each other.

In FIG. 42, the processor 81 performs initial setting for information processing (step S401), and proceeds to the next step. For example, in the initial setting, the processor 81 initializes parameters for performing processes to be described below. For example, the processor 81 initially disposes the player character PC in the virtual game space to generate an initial state of the virtual game space, and updates the player character action data D2$k$ with the location, direction, state, and orientation, etc., of the player character PC.

Next, the processor 81 obtains the operation data from the right controller 4 and updates the operation data D2$a$ (step S402), and proceeds to the next step. Note that the processor 81 stores data indicating an angular velocity occurring on the right controller 4, which is included in the operation data obtained from the right controller 4 in step S402, into the angular velocity data D2b. The processor 81 also stores data indicating an acceleration occurring on the right controller 4, which is included in the operation data obtained from the right controller 4 in step S402, into the acceleration data D2c.

Next, the processor 81 calculates the orientation of the right controller 4 (step S403), and proceeds to the next step. For example, the processor 81 obtains the angular velocities about the x-, y-, and z-axes of the right controller 4 using the angular velocity data stored in the angular velocity data D2b. Thereafter, the processor 81 turns the x-, y-, and z-axes with reference to the gravitational acceleration direction of the orientation of the right controller 4 indicated by the orientation data D2d, based on the obtained angular velocities, and stores, into the orientation data D2d, the directions of the turned x-, y-, and z-axes with reference to the gravitational acceleration direction, as most recent data indicating the orientation of the right controller 4. The processor 81 also calculates the direction of the gravitational acceleration acting on the right controller 4 using the acceleration data stored in the acceleration data D2c, and stores the calculated direction into the gravitational direction data D2e. Note that the gravitational acceleration may be extracted using any suitable technique. For example, an acceleration component averagely occurring on the right controller 4 may be calculated and extracted as the gravitational acceleration. The processor 81 also corrects, as appropriate, the most recent orientation of the right controller 4 indicated by the orientation data D2d using the direction of the gravitational acceleration occurring on the right controller 4 indicated by the gravitational direction data D2e.

Next, the processor 81 calculates the amount of deformation of the ring-shaped extension apparatus 5 (step S404), and proceeds to the next step. For example, the processor 81 calculates the amount and direction of deformation of the ring-shaped portion 201 of the ring-shaped extension apparatus 5 using the strain value indicated by the operation data D2a, and adds the calculation result to the history of the amounts of deformation indicated by the ring deformation amount data D2g.

Next, the processor 81 determines whether or not the jump flag is off (step S405). For example, if the jump flag indicated by the jump flag data D2i is off, the result of determination in step S405 by the processor 81 is positive. If the jump flag is off, the processor 81 proceeds to step S406. Otherwise, i.e., if the jump flag is on, the processor 81 proceeds to step S408.

In step S406, the processor 81 calculates jump power based on the amount of deformation calculated in step S404, and proceeds to the next step. For example, the processor 81 calculates jump power based on the most recent amount of deformation in the history of the amounts of deformation indicated by the ring deformation amount data D2g, and updates the jump power data D2h with the jump power.

Next, the processor 81 sets the label M corresponding to a predicted reach height which depends on the jump power calculated in step S406 (step S407), and proceeds to step S408. For example, the processor 81 calculates a height that the player character PC can reach when the player character PC jumps with the jump power indicated by the jump power data D2h, and sets the label M corresponding to the reachable height.

In step S408, the processor 81 calculates a velocity parameter (e.g., an acceleration, velocity, angular velocity) at which the ring-shaped extension apparatus 5 is moved downward in the real space, and proceeds to the next step. For example, the processor 81 calculates an acceleration, velocity, or angular velocity at which the ring-shaped extension apparatus 5 is moved downward in the real space as a velocity parameter, with reference to the acceleration data D2c. In a first non-limiting example, the velocity parameter may be an acceleration or velocity at which the ring-shaped extension apparatus 5 (the right controller 4) is moved downward in the real space, or an angular velocity at which a pitch operation around the horizontal direction is performed on the ring-shaped extension apparatus 5. These parameters are calculated based on the most recent orientation indicated by the orientation data D2d. In a second non-limiting example, the velocity parameter may be an acceleration or velocity at which the ring-shaped extension apparatus 5 is moved in a direction from the right controller 4 toward the circular-ring axis of the ring-shaped portion 201 (i.e., a direction perpendicular to the z-axis direction of the right controller 4 (the negative direction of the x-axis)), or an angular velocity at which a pitch operation is performed (i.e., an operation of turning the right controller 4 around the y-axis direction).

Next, the processor 81 determines whether or not to display a scene that the player character PC jumps (step S409). For example, if the velocity parameter calculated in step S408 is greater than or equal to a predetermined threshold for determining that the operation of swinging the ring-shaped extension apparatus 5 downward has been started, the result of determination in step S409 by the processor 81 is positive. If the jump flag indicated by the jump flag data D2i is on, the result of determination in step S409 by the processor 81 is positive. If the result of determination in step S409 by the processor 81 is positive, the processor 81 proceeds to step S410. Otherwise, i.e., if the result of determination in step S409 by the processor 81 is negative, the processor 81 proceeds to step S411.

Note that when it is determined that the user has operated the ring-shaped extension apparatus 5 with the ring-shaped extension apparatus 5 held in an incorrect orientation, the result of determination in step S409 may be negative. Here, as shown in FIG. 37, the correct orientation of the ring-shaped extension apparatus 5 when held is such that the user holds the grip covers 203 and 204 with both hands, with the right controller 4 located at a highest position and the two grip covers 203 and 204 aligned substantially horizontally; the pressing operation and the downward-swinging operation are performed on the ring-shaped extension apparatus 5 with the circular-ring axis of the ring-shaped portion 201 in substantially the horizontal position. The determination of whether or not an operation has been performed in such a correct orientation can be achieved by analyzing the orientation of the ring-shaped extension apparatus 5 indicated by the orientation data D2d.

In step S410, the processor 81 performs a jump display process, and proceeds to step S411. The jump display process performed in step S410 will now be described with reference to FIG. 43.

In FIG. 43, the processor 81 determines whether or not the jump flag indicated by the jump flag data D2i is off (step S420). If the jump flag is off, the processor 81 proceeds to step S421. Otherwise, i.e., if the jump flag is on, the processor 81 proceeds to step S424.

In step S421, the processor 81 sets the jump flag "on," and proceeds to the next step. For example, the processor 81 sets "on" the jump flag indicated by the jump flag data D2i to update the jump flag data D2i. The processor 81 also removes the setting of the label M set in step S407.

Next, the processor 81 determines whether or not the amount of deformation of the ring-shaped extension apparatus 5 has gradually decreased (step S422). For example, the processor 81 determines whether or not the amount of deformation has gradually decreased, with reference to the history of the amounts of deformation indicated by the ring deformation amount data D2g. If the amount of deformation of the ring-shaped extension apparatus 5 has gradually decreased, the processor 81 proceeds to step S423. Otherwise, i.e., if the amount of deformation of the ring-shaped extension apparatus 5 has not gradually decreased, the processor 81 proceeds to step S424.

In step S423, the processor 81 newly calculates jump power using the amount of deformation of the ring-shaped extension apparatus 5 that has occurred a predetermined time before, and proceeds to step S424. In a non-limiting example, the processor 81 newly calculates jump power based on the amount of deformation that has occurred a predetermined time (e.g., five frames) before in the history of the amounts of deformation indicated by the ring deformation amount data D2g, and updates the jump power data D2h with the new jump power. In another non-limiting example, the processor 81 calculates new jump power based on the greatest amount of deformation in the history of the amounts of deformation that have occurred during a period of time from the current time to a predetermined time before indicated by the ring deformation amount data D2g, and updates the jump power data D2h using the new jump power.

In step S424, the processor 81 performs a process of moving the player character PC according to the set jump power, and proceeds to the next step. For example, the processor 81 causes the player character PC to move upward in the virtual game space, based on jump power indicated by the jump power data D2h, and updates the player character action data D2k based on the location and state of the moved player character PC.

Next, the processor 81 determines whether or not to end the displaying of the scene that the player character PC jumps (step S425). For example, if the player character PC has reached a location where the jump ends (the player character PC has reached the target reach height of the jump, the jump ends due to collision with another object, etc.), the result of determination in step S425 by the processor 81 is positive. If the processor 81 determines to end the displaying of the scene that the player character PC jumps, the processor 81 proceeds to step S426. Otherwise, i.e., if the processor 81 determines not to end the displaying of the scene that the player character PC jumps, the processor 81 ends the process of the subroutine.

In step S426, the processor 81 performs a process of stopping the process of causing the player character PC to jump and move, and proceeds to the next step. For example, the processor 81 sets a state of the player character PC that stops jumping and does not move from the current location to update the player character action data D2k. The processor 81 also sets "off" the jump flag indicated by the jump flag data D2i to update the jump flag data D2i.

Next, the processor 81 calculates game points, and ends the process of the subroutine. For example, the processor 81 calculates game points based on the location that the player character PC has reached by the jump, and updates the score data D2j by adding the game points.

Referring back to FIG. 42, in step S411, the processor 81 performs the process of controlling the action of the player character PC, and proceeds to the next step. For example, the processor 81 disposes the player character PC in the virtual game space based on the location, state, orientation, action, etc., of the player character PC indicated by the player character action data D2k.

Next, the processor 81 performs an image generation and display control process (step S412), and proceeds to the next step. For example, the processor 81 disposes the player character PC in the virtual game space based on the settings provided by step S411. If the label M has been set in step S407, the processor 81 disposes an image indicating the label M in the virtual game space. The processor 81 also disposes a virtual camera in the virtual game space, generates an image of the virtual game space as viewed from the virtual camera, and outputs the virtual game space image to the stationary monitor 9. The processor 81 also causes an image indicating the game score indicated by the score data D2j to overlay the virtual game space image at an appropriate position, and outputs the resultant image to the stationary monitor 9.

Next, the processor 81 determines whether or not to end the game process (step S413). In step S413, a condition for ending the game process is, for example, that a condition for ending the game process is satisfied, that the user has performed an operation of ending the game process, etc. If the processor 81 determines not to end the game process, the processor 81 returns to step S402, and repeats the process. Otherwise, i.e., if the processor 81 determines to end the game process, the processor 81 ends the process of the flowchart. Thereafter, steps S402-S413 are repeatedly executed until the processor 81 determines to end the game process in step S413.

Thus, in the fourth non-limiting example game, a predetermined game process is performed by swinging the ring-shaped extension apparatus 5 while deforming the ring-shaped extension apparatus 5, resulting in an improvement in the user's bodily sensation in an operation using the ring-shaped extension apparatus 5. In addition, in the fourth non-limiting example game, when the ring-shaped extension apparatus 5 is not deformed, or when the ring-shaped extension apparatus 5 is deformed and is not swung, the execution of a predetermined game process is limited, and therefore, the predetermined game process is limited by the user's particular operation.

Note that in the fourth non-limiting example game, the user's operation is performed using the ring-shaped extension apparatus 5. Alternatively, as in the first and second non-limiting example games, the user's operation may be performed using the ring-shaped extension apparatus 5 as well as the belt-shaped extension apparatus 6 with the left controller 3 attached thereto. In that case, the process using the output of the motion sensor (the acceleration sensor 114 and/or the angular velocity sensor 115 of the right controller 4) of the ring-shaped extension apparatus 5 may be replaced by a process using the output of the motion sensor (the acceleration sensor 104 and/or the angular velocity sensor 105 of the left controller 3) of the belt-shaped extension apparatus 6. Thus, the user's operation is also performed using the belt-shaped extension apparatus 6 with the left controller 3 attached thereto, and therefore, in the fourth non-limiting example game, the control of the jump power of the player character PC is performed according to a pressing operation of deforming the ring-shaped extension apparatus 5, and the action control of causing the player character PC to jump is performed according to the motion of the belt-shaped extension apparatus 6 caused by the motion of the user's leg. Therefore, the variety of user inputs using both of the ring-shaped extension apparatus 5 and the belt-shaped extension apparatus 6 can be increased.

Note that in the above non-limiting examples, the ring-shaped extension apparatus 5 includes the ring-shaped portion 201 made of an elastically deformable material, and a process is performed according to an operation of elastically deforming the ring-shaped portion 201. By thus allowing an operation of causing a main portion of an input apparatus to undergo elastic deformation, the following effects can be expected: the user can easily continuously perform a pressing operation; the pressing operation involving elastic deformation improves the user's feeling of operation; the pressing operation involving elastic deformation allows the user to easily bodily sense the motion of the player object OBJ; the requirement of a pressing operation motivates the user to perform a physical exercise (e.g., an exercise of moving the arms); etc.

In the above non-limiting examples, as a non-limiting example of an operation of deforming the ring-shaped extension apparatus 5, a pressing operation is used in which the ring-shaped portion 201 of the ring-shaped extension apparatus 5 is deformed from the steady state so that the grip covers 203 and 204 move toward each other. An operation of deforming the ring-shaped extension apparatus 5 may be performed in other ways. For example, a pulling operation of deforming the ring-shaped portion 201 of the ring-shaped extension apparatus 5 from the steady state so that the grip covers 203 and 204 move away from each other, may be performed.

The operation of deforming the ring-shaped extension apparatus 5 in the above non-limiting examples includes various embodiments. For example, when a small change occurs in the ring-shaped portion 201 of the ring-shaped extension apparatus 5 from the steady state, it may be determined that an operation of deforming the ring-shaped extension apparatus 5 has been performed. In another non-limiting example, when the ring-shaped portion 201 of the ring-shaped extension apparatus 5 is deformed from the steady state and the amount of deformation is greater than or equal to a threshold set for each game, it may be determined that an operation of deforming the ring-shaped extension apparatus 5 has been performed.

Although in the above non-limiting examples, the first control is performed on an object according to an operation of deforming the ring-shaped extension apparatus 5, the first control may be performed according to other operations performed on the ring-shaped extension apparatus 5. For example, even when an operational force applied to the ring-shaped extension apparatus 5 so that the grip covers 203 and 204 move toward each other or away from each other, is not strong enough to deform the ring-shaped portion 201 from the steady state, the first control may be performed according to that operational force. Thus, even when the ring-shaped portion 201 is not deformed, the amount of a force applied to the ring-shaped extension apparatus 5 can be calculated using a strain value obtained from the right controller 4, and a process can be performed using the amount of a force applied to the ring-shaped extension apparatus 5, instead of the above amount of deformation.

In the above non-limiting examples, the main body apparatus 2 and the right controller 4 wirelessly communicate with each other so that the operation data of the right controller 4 is transmitted to the main body apparatus 2. The operation data may be transmitted to the main body apparatus 2 in other ways. For example, the operation data of the right controller 4 may be transmitted to the left controller 3, and thereafter, both of the operation data (or processed operation data) of the right controller 4 and the operation data (or processed operation data) of the left controller 3 may be transmitted together from the left controller 3 to the main body apparatus 2.

In the above non-limiting examples, the methods for detecting the orientation and motion of the right controller 4 (the orientation and motion of the ring-shaped extension apparatus 5) are merely illustrative, and the orientation and motion may be detected using other methods and other data. The above acceleration sensor and/or angular velocity sensor are a non-limiting example of a sensor that outputs data for calculating the orientation and motion of the right controller 4. For example, in another non-limiting example, the right controller 4 may include a magnetic sensor instead of or in addition to the acceleration sensor and/or angular velocity sensor, and a magnetism detected by the magnetic sensor may be used to calculate the orientation and motion of the right controller 4. The methods for calculating the orientation and motion of the right controller 4 are not particularly limited. For example, in another non-limiting example, the main body apparatus 2 may capture an image of the right controller 4 (the ring-shaped extension apparatus 5) using an imaging device, and may use the captured image to calculate the orientation of the right controller 4 (the ring-shaped extension apparatus 5). Alternatively, data detected by an acceleration sensor and/or angular velocity sensor included in the right controller 4 may be used in the right controller 4 to calculate the orientation and motion of the right controller 4. In that case, operation data additionally including the data calculated in the right controller 4 and indicating the orientation and motion of the right controller 4 is transmitted from the right controller 4 to the main body apparatus 2.

The game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of moving an object may be, instead of the left controller 3 or the right controller 4, another controller, mouse, touchpad, touch panel, trackball, keyboard, directional pad, slidepad, etc.

In the above non-limiting examples, the ring-shaped extension apparatus 5, when the right controller 4 is attached thereto, functions as an input apparatus equipped with an inertial sensor (e.g., an acceleration sensor or an angular velocity sensor). This function may be implemented in other ways. For example, the ring-shaped extension apparatus 5 itself has the inertial sensor function. In a non-limiting example, the main portion 202 may include an acceleration sensor for detecting an acceleration along the direction of at least one axis occurring on the ring-shaped extension apparatus 5 and/or an angular velocity sensor for detecting an angular velocity about at least one axis occurring on the ring-shaped extension apparatus 5.

In the above non-limiting examples, all the process steps are performed in the game system 1. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting examples, the information process can be performed by the processor 81 of the game system 1 executing a predetermined program. Alternatively, all or a portion of the above process may be performed by a dedicated circuit included in the game system 1.

Here, according to the above non-limiting variation, this non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and this non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement this non-limiting example.

The above program may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertain. If there is any inconsistency or conflict, the present specification (including the definitions) shall prevail.

As described above, this non-limiting example is applicable as an information processing system, information processing program, information processing apparatus, and information processing method, etc., that can increase the variety of user input methods.

What is claimed is:

1. An information processing system comprising a first input apparatus including a strain sensor, a second input apparatus including a motion sensor and different from the first input apparatus, and an information processing apparatus, wherein:
   the first input apparatus is configured to be hand-held, and the second input apparatus, in use, is physically spaced away from the first input apparatus and configured to be mounted to a portion of a user's body;
   the strain sensor provides an output corresponding to a force applied to at least a portion of the first input apparatus,
   the motion sensor provides an output corresponding to a motion of the second input apparatus, and
   the information processing apparatus includes a computer that executes
      obtaining strain data corresponding to the output of the strain sensor and motion data corresponding to the output of the motion sensor, and
      executing first control on an object disposed in a virtual space based on the strain data, and second control on the object based on the motion data, the second control being different from the first control.

2. The information processing system according to claim 1, wherein
   the first input apparatus further includes a holding portion, and
   the strain sensor outputs the strain data corresponding to a force applied to the holding portion of the first input apparatus.

3. The information processing system according to claim 1, wherein
   the first input apparatus is at least partially elastically deformable in response to an external force applied thereto,
   the strain sensor provides an output corresponding to deformation of the first input apparatus, and
   the first control is executed based on deformation of the first input apparatus indicated by the strain data, and the second control is executed based on the motion data while the deformation of the first input apparatus is detected based on the strain data.

4. The information processing system according to claim 1, wherein
   the second control is executed in different ways between when the force applied to the first input apparatus satisfies a predetermined condition and when the force applied to the first input apparatus does not satisfy the predetermined condition.

5. The information processing system according to claim 4, wherein
   the second control is performed so that the object is moved based on the motion data when the force applied to the first input apparatus satisfies the predetermined condition, and the object is not moved, irrespective of the motion data having been obtained, when the force applied to the first input apparatus does not satisfy the predetermined condition.

6. The information processing system according to claim 5, wherein
   the first input apparatus further includes a motion sensor which outputs motion data corresponding to a motion of the first input apparatus, a process of changing an orientation of the object based on the motion data output from the first input apparatus, is executed as third control, and
an in-game merit is given to a user when the object has a predetermined orientation at a predetermined location in the virtual space.

7. The information processing system according to claim 1, wherein
the motion sensor outputs the motion data corresponding to a motion of the second input apparatus caused by the user's stamping-foot action, and
a process of moving the object in the virtual space based on the motion data corresponding to a motion of the second input apparatus caused by the user's stamping-foot action, is executed as the second control.

8. The information processing system according to claim 1, wherein
a deformation process of deforming the object based on the strain data, is executed as the first control, and
a process of changing a way of deforming the object based on the motion data output from the second input apparatus, is executed as the second control.

9. The information processing system according to claim 1, wherein
a process of moving the object in a first direction based on the strain data, is executed as the first control, and
a process of moving the object in a second direction different from the first direction, based on the motion data, is executed as the second control.

10. The information processing system according to claim 9, wherein
the first input apparatus further includes a holding portion,
the second input apparatus is attached to a portion of a user's body,
the strain sensor outputs the strain data corresponding to a force applied to the holding portion of the first input apparatus, and
the motion sensor outputs the motion data corresponding to a motion of the portion of the user's body to which the second input apparatus is attached.

11. The information processing system according to claim 9, wherein
a shape of a target object disposed in the virtual space is changed based on a positional relationship between the object and the target object.

12. The information processing system according to claim 11, wherein
a process of moving the object along an outer periphery of the target object, based on the motion data, is executed as the second control,
a process of moving the object in a direction including at least a directional component toward inside of the target object, based on the strain data, is executed as the first control, and
a process of changing the shape of the target object is executed based on the positional relationship between the object and the target object.

13. The information processing system according to claim 11, wherein
the executing the first control and the second control includes assessing the shape of the target object at the end of a predetermined time limit.

14. The information processing system according to claim 9, wherein
a process of continuing to move the object in the first direction, based on the amount of a force applied to the holding portion of the first input apparatus indicated by the strain data, is executed as the first control.

15. The information processing system according to claim 1, wherein
the first control is executed when the strain data indicates that the amount of the force applied to the first input apparatus is greater than a first threshold, and the first control is executed when the strain data does not indicate that the amount of the force applied to the first input apparatus is greater than the first threshold, and indicates that the amount of the force applied to the first input apparatus is greater than a second threshold smaller than the first threshold after the amount of the force applied to the first input apparatus has exceeded the first threshold.

16. The information processing system according to claim 1, wherein
the first control is executed on the object, based on the amount of a force applied to the first input apparatus at a timing that a motion occurs on the motion sensor of the second input apparatus.

17. The information processing system according to claim 16, wherein
the first control is executed, based on the amount of a force having been applied to the first input apparatus during a period of time from a timing that a motion occurs on the motion sensor of the second input apparatus to a predetermined time before, when the amount of a force applied to the first input apparatus at the timing that a motion occurs on the motion sensor of the second input apparatus is smaller than the amount of deformation of the first input apparatus having occurred during the period of time from the timing that a motion occurs on the motion sensor of the second input apparatus to the predetermined time before.

18. The information processing system according to claim 1, wherein the first input apparatus includes:
a ring-shaped portion including at least one body engaging portion configured to engage with a body portion of the user's body, the ring-shaped portion forming a ring having a central axis, the ring-shaped portion having a part that is elastically deformable in a radial direction relative to the central axis due to application of a radial force applied to the ring-shaped portion.

19. A non-transitory computer-readable storage medium having stored therein an information processing program executable by a computer of an information processing apparatus for performing a process using an output of a first input apparatus including a strain sensor, and an output of a second input apparatus including a motion sensor and different from the first input apparatus, wherein:
the first input apparatus is configured to be hand-held, and the second input apparatus, in use, is physically spaced away from the first input apparatus and configured to be mounted to a portion of a user's body,
the strain sensor provides an output corresponding to a force applied to at least a portion of the first input apparatus,
the motion sensor provides an output corresponding to a motion of the second input apparatus, and
the information processing program causes the computer to execute
obtaining strain data corresponding to the output of the strain sensor and motion data corresponding to the output of the motion sensor, and
executing first control on an object disposed in a virtual space based on the strain data, and second control on the object based on the motion data, the second control being different from the first control.

20. An information processing apparatus for performing a process using an output of a first input apparatus including a strain sensor, and an output of a second input apparatus including a motion sensor and different from the first input apparatus, wherein:

the first input apparatus is configured to be hand-held, and the second input apparatus, in use, is physically spaced away from the first input apparatus and configured to be mounted to a portion of a user's body, the strain sensor provides an output corresponding to a force applied to at least a portion of the first input apparatus, the motion sensor provides an output corresponding to a motion of the second input apparatus, and the information processing apparatus executes obtaining strain data corresponding to the output of the strain sensor and motion data corresponding to the output of the motion sensor, and executing first control on an object disposed in a virtual space based on the strain data, and second control on the object based on the motion data, the second control being different from the first control.

21. An information processing method for performing a process using an output of a first input apparatus including a strain sensor, and an output of a second input apparatus including a motion sensor and different from the first input apparatus, wherein:

the first input apparatus is configured to be hand-held, and the second input apparatus, in use, is physically spaced away from the first input apparatus and configured to be mounted to a portion of a user's body;

the strain sensor provides an output corresponding to a force applied to at least a portion of the first input apparatus;

the motion sensor provides an output corresponding to a motion of the second input apparatus; and the method comprises obtaining strain data corresponding to the output of the strain sensor and motion data corresponding to the output of the motion sensor; and executing first control on an object disposed in a virtual space based on the strain data, and second control on the object based on the motion data, the second control being different from the first control.

\* \* \* \* \*